US007193642B2

(12) United States Patent
Hirai et al.

(10) Patent No.: US 7,193,642 B2
(45) Date of Patent: Mar. 20, 2007

(54) IMAGE QUALITY DETECTING APPARATUS, IMAGE FORMING APPARATUS AND METHOD, AND IMAGE QUALITY CONTROLLING APPARATUS AND METHOD

(75) Inventors: Shuji Hirai, Tokyo (JP); Takeo Tsukamoto, Tokyo (JP)

(73) Assignee: Ricoh Company. Ltd., Tokyo (JP)

( * ) Notice: Subject to any disclaimer, the term of this patent is extended or adjusted under 35 U.S.C. 154(b) by 0 days.

(21) Appl. No.: 11/255,870

(22) Filed: Oct. 24, 2005

(65) Prior Publication Data

US 2006/0038873 A1 Feb. 23, 2006

Related U.S. Application Data

(63) Continuation of application No. 10/448,029, filed on May 30, 2003, now Pat. No. 6,975,338.

(30) Foreign Application Priority Data

May 31, 2002 (JP) ............................ 2002-160013
Jul. 19, 2002 (JP) ............................ 2002-211502
Sep. 4, 2002 (JP) ............................ 2002-259131

(51) Int. Cl.
*G06T 5/00* (2006.01)
*G06T 7/00* (2006.01)

(52) U.S. Cl. ......................... 347/236; 347/246; 399/49

(58) Field of Classification Search ................ 347/236, 347/246; 399/49
See application file for complete search history.

(56) References Cited

U.S. PATENT DOCUMENTS 5,778,280 A * 7/1998 Komiya et al. ............... 399/49
6,809,854 B2 * 10/2004 Yamamoto et al. ......... 359/296
6,975,338 B2 * 12/2005 Hirai et al. ................. 347/133

FOREIGN PATENT DOCUMENTS

| | | |
|---|---|---|
| JP | 62-145266 | 6/1987 |
| JP | 63-056645 | 3/1988 |
| JP | 5-161013 | 6/1993 |
| JP | 05-165295 | 7/1993 |
| JP | 5-265297 | 10/1993 |
| JP | 05-297673 | 11/1993 |

(Continued)

OTHER PUBLICATIONS

Translation of Amano (JP 2001-78027).*

*Primary Examiner*—Huan Tran
(74) *Attorney, Agent, or Firm*—Oblon, Spivak, McClelland, Maier & Neustadt, P.C.

(57) ABSTRACT

An image quality detecting apparatus detects image quality based on a specified image pattern formed on an image carrier. This apparatus includes a light-emitting device that radiates a spotlight on the image carrier, a lens, a scanning unit that scans the image pattern with the spotlight, and a photoelectric conversion element that detects a quantity of light reflected from the image pattern and the image carrier or light transmitted through the image pattern and the image carrier during the scanning. The image quality is detected by setting a diameter of the spotlight at least in a scanning direction to the reciprocal number of a spatial frequency or smaller in which human eyesight is the most sensitive, for example, to 1000 μm or less.

21 Claims, 55 Drawing Sheets

FOREIGN PATENT DOCUMENTS

| | | |
|---|---|---|
| JP | 6-27776 | 2/1994 |
| JP | 6-124031 | 5/1994 |
| JP | 7-78027 | 3/1995 |
| JP | 08-258340 | 10/1996 |
| JP | 09-068872 | 3/1997 |
| JP | 09-218956 | 8/1997 |
| JP | 09-233235 | 9/1997 |
| JP | 10-198088 | 7/1998 |
| JP | 11-084914 | 3/1999 |
| JP | 2000-98708 | 4/2000 |
| JP | 2001-78027 | 3/2001 |
| JP | 2001-136314 | 5/2001 |
| JP | 2002-013992 | 1/2002 |
| JP | 2002-040724 | 2/2002 |

* cited by examiner

IMAGE QUALITY DETECTING APPARATUS, IMAGE FORMING APPARATUS AND METHOD, AND IMAGE QUALITY CONTROLLING APPARATUS AND METHOD

CROSS-REFERENCE TO RELATED APPLICATIONS

The present continuation application claims the benefit under 35 U.S.C. §120 of utility application Ser. No. 10/448,029, now U.S. Pat. No. 6,975,338, filed May 30, 2003, and also claims the benefit under 35 U.S.C. §119 of Japanese Applications Nos. 2002-160013, filed May 31, 2002, 2002-211502, filed Jul. 19, 2002, and 2002-259131, filed Sep. 4, 2002, the entire contents of which are incorporated herein by reference.

BACKGROUND OF THE INVENTION

1) Field of the Invention

The present invention relates to a technology for detecting deterioration of the quality of an image when the image is written with a laser beam, controlling an image forming process based on detection and evaluation of graininess of a formed image, and controlling the image quality according to the detected deterioration.

2) Description of the Related Art

It is widely known that an amount of toner adhering to patch patterns can be detected by detecting reflected light quantity when a relatively large spotlight (a diameter of the spotlight is several millimeters or larger) is radiated onto the patch patterns formed on an image carrier. Furthermore, a method of controlling such image forming conditions as electrostatic latent image forming conditions and developing conditions based on a result of detection of the toner amount is also well known. This method is applied to actual products. If this detection method is used, by detecting toner adhesion quantity in each density patch of a gradation pattern, it is possible to get to know gradation characteristics and a solid density in the image forming conditions when the image is formed. Therefore, if values of the gradation characteristics and the solid density are beyond specified value ranges, the gradation characteristics and solid density can be changed in accordance with the detection result and by controlling the image forming conditions so s to obtain appropriate gradation characteristics and solid density.

Meanwhile, it is well known that the image quality has many factors such as the gradation characteristics, the solid density, and many other elements. Among the elements that influence the image quality greatly, "graininess" (a sense of roughness of the image that visually appeals to a human) can be pointed out. It has become essential to keep the graininess in a low level to realize a high quality image in an electrographic process. The graininess is largely determined by an initial image forming condition, however, in addition it is well known that the graininess deteriorates with time. Causes of the deterioration with time are attributed to environmental fluctuations such as fluctuations in temperature or humidity, or to deterioration of developer or photoreceptors. Therefore, it is necessary to detect the graininess or the image quality which is closely related to the graininess by adopting some measures in order to maintain the high quality image for a long period of time, and to change the image forming conditions based on results of the detection.

However, there have been no reports on measures to detect the image quality focusing on the graininess so far. The graininess is density unevenness on a plane space where the image is formed. In the case when human visual characteristics are taken into consideration, making approximately 1 cycle/mm as a peak, the graininess is determined by the density unevenness having space frequencies in a range of 0 cycle/mm to approximately 10 "cycle/mm, especially, making approximately 1 cycle/mm as a peak, particularly, the density unevenness having space frequencies in a range of 0.2 cycle/mm to approximately 4 cycle/mm becomes a problem.

Therefore, it is necessary to provide unit to detect the density unevenness in the range of the space frequencies mentioned above and unit to convert the detected density unevenness signals into a spatial frequency response.

On the other hand, as a unit to detect fine density unevenness in a patch pattern, an invention disclosed in Japanese Patent Application Laid-Open ("JPA") No. H6-27776 is well known. The invention disclosed is provided to irradiate a wide range of the patch pattern with an illumination light to scan the light reflected from the patch pattern by a high-resolution charge coupled device (CCD), and to obtain signals related to fine image defects, based on the light reflected from the patch pattern. Further, even though the invention disclosed in JPA No. H6-27776 is provided with a process to compute space modulation transfer function (MTF) in a computing process, it is impossible to obtain information related to the space frequencies of image unevenness in this computation, consequently it is impossible to obtain information related to the graininess or information that has a strong correlation with the graininess. Further, in the invention disclosed here, the image forming condition is controlled based on a detection of an abnormal image such as lack of an image in the middle due to faulty transfer or on a detection of sharpness, but is not always controlled in consideration of the graininess.

Further, there are some other known inventions disclosed in JPA No. H5-161013, JPA No. H7-78027, JPA No. 2000-98708, or JPA No. 2001-78027. However, none of the inventions mentioned here controls the image forming conditions based on information for the graininess (density unevenness) of the image.

As explained above, in the conventional technology, the image forming conditions are not controlled in consideration of the graininess of toner, and therefore it is impossible to take countermeasures against deterioration of the graininess. In other words, the conventional technology is not provided to have such image quality detecting unit and image quality restoration unit, thus the developer or photoreceptors have to be inevitably replaced after reaching a certain operating hours estimated during a stage of development of the image forming apparatus. The replacement time had to be set shorter than an actually necessary time in consideration of a safety factor. In actual cases, however, running conditions of the image forming apparatuses differ from users to users, and therefore the replacement time of the developer and the photoreceptors that can guarantee the image quality should largely differ accordingly.

Furthermore, in the conventional technology, only settings and changes of the image forming conditions are proposed so that gradation characteristics (halftone density) and solid density become predetermined values. As mentioned above, the image forming conditions to be controlled have been developer toner concentration (in the case of a two-component developing process), a developing bias, and a developing roller speed. For example, if the image density is declined, no steps other than changes of optionally combined image forming conditions as shown below that are commonplace in electrographic process have been implemented:

Raising developer toner concentration
Raising developing bias (developing potential)
Raising linear velocity of developing rollers.

SUMMARY OF THE INVENTION

It is an object of the present invention to solve at least the problems in the conventional technology.

The image quality detecting apparatus according to one aspect of this invention includes a light-emitting unit that radiates a spotlight having a diameter in a scanning direction that is a reciprocal number of a spatial frequency or smaller, wherein the reciprocal number is a number in which human eyesight is the most sensitive. The image quality detecting apparatus also includes a scanning unit that scans a specified image pattern formed on an image carrier with the spotlight, and a light-receiving unit that detects a quantity of either of light reflected from the image pattern and the image carrier and light transmitted through the image pattern and the image carrier during the scanning.

The image quality detecting apparatus according to another aspect of this invention includes a light-emitting unit that radiates a spotlight having a diameter in a scanning direction that is a reciprocal number of a spatial frequency or smaller, wherein the reciprocal number is a number in which human eyesight is the most sensitive. The diameter is defined as a distance between both points of a beam of the spotlight where power of the beam per unit area on a light radiated surface is decreased to 1/e of maximum power of the beam. The image quality detecting apparatus also includes a scanning unit that scans a specified image pattern formed on an image carrier with the spotlight, and a light-receiving unit that detects a quantity of either of light reflected from the image pattern and the image carrier and light transmitted through the image pattern and the image carrier during the scanning.

The image quality detecting apparatus according to still another aspect of this invention includes a light-emitting unit that radiates a spotlight having a diameter in a scanning direction that is 1000 μm or less. The image quality detecting apparatus also includes a scanning unit that scans a specified image pattern formed on an image carrier with the spotlight, and a light-receiving unit that detects a quantity of either of light reflected from the image pattern and the image carrier and light transmitted through the image pattern and the image carrier during the scanning.

The image forming apparatus according to still another aspect of this invention includes a light-emitting unit that radiates a spotlight having a diameter in a scanning direction that is a reciprocal number of a spatial frequency or smaller, wherein the reciprocal number is a number in which human eyesight is the most sensitive. The image forming apparatus also includes a scanning unit that scans a specified image pattern formed on an image carrier with the spotlight, a light-receiving unit that detects a quantity of either of light reflected from the image pattern and the image carrier and light transmitted through the image pattern and the image carrier during the scanning, and an arithmetic unit that performs an arithmetical analysis on a fluctuation value of a quantity of light received from the light-receiving unit. The image forming apparatus further includes a signal generating unit that generates signals to change an image forming condition based on a result of the arithmetical analysis, and a control unit that sets an image forming condition based on the signals. The image forming apparatus further includes an optical writing unit that performs an optical writing to form an electrostatic latent image on the image carrier based on image information input, and an image forming unit that forms a visual image on a recording medium based on the electrostatic latent image and the image forming condition.

The image forming apparatus according to still another aspect of this invention includes a light-emitting unit that radiates a spotlight having a diameter at least in a scanning direction that is a reciprocal number of a spatial frequency or smaller, wherein the reciprocal number is a number in which human eyesight is the most sensitive, and the diameter is defined as a distance between both points of a beam of the spotlight where power of the beam per unit area on a light radiated surface is decreased to 1/e of maximum power of the beam. The image forming apparatus also includes a scanning unit that scans a specified image pattern formed on an image carrier with the spotlight, and a light-receiving unit that detects a quantity of either of light reflected from the image pattern and the image carrier and light transmitted through the image pattern and the image carrier during the scanning. The image forming apparatus further includes an arithmetic unit that performs an arithmetical analysis on a fluctuation value of a quantity of light received from the light-receiving unit, and a signal generating unit that generates signals to change an image forming condition based on a result of the arithmetical analysis. The image forming apparatus further includes a control unit that sets an image forming condition based on the signals, an optical writing unit that performs an optical writing to form an electrostatic latent image on the image carrier based on image information input, and an image forming unit that forms a visual image on a recording medium based on the electrostatic latent image and the image forming condition.

The image forming apparatus according to still another aspect of this invention includes a light-emitting unit that radiates a spotlight having a diameter in a scanning direction that is 1000 μm or less. The image forming apparatus also includes a scanning unit that scans a specified image pattern formed on an image carrier with the spotlight, and a light-receiving unit that detects a quantity of either of light reflected from the image pattern and the image carrier and light transmitted through the image pattern and the image carrier during the scanning. The image forming apparatus further includes an arithmetic unit that performs an arithmetical analysis on a fluctuation value of a quantity of light received from the light-receiving unit, and a signal generating unit that generates signals to change an image forming condition based on a result of the arithmetical analysis. The image forming apparatus further includes a control unit that sets an image forming condition based on the signals, an optical writing unit that performs an optical writing to form an electrostatic latent image on the image carrier based on image information input, and an image forming unit that forms a visual image on a recording medium based on the electrostatic latent image and the image forming condition.

The image quality controlling apparatus according to still another aspect of this invention includes an image pattern forming unit that forms a specified image pattern on an image carrier, and a light-emitting unit that radiates a spotlight having a diameter at least in a scanning direction that is a reciprocal number of a spatial frequency or smaller, wherein the reciprocal number is a number in which human eyesight is the most sensitive. The image quality controlling apparatus also includes a light quantity detecting unit that scans the image pattern with the spotlight radiated from the light-emitting unit to detect a quantity either of light reflected from the image pattern and the image carrier and light transmitted through the image pattern and the image carrier during the scanning. The image quality controlling apparatus further includes a control unit that controls an image forming process based on the detected light quantity and controls so that image quality is maintained at a predetermined level or higher.

The image quality controlling method according to still another aspect of this invention includes forming a specified image pattern on an image carrier, and radiating a spotlight having a diameter at least in a scanning direction that is a reciprocal number of a spatial frequency or smaller, wherein the reciprocal number is a number in which human eyesight is the most sensitive. The image quality controlling method also includes scanning the image pattern with the spotlight, detecting a quantity of either of light reflected from the image pattern and the image carrier and light transmitted through the image pattern and the image carrier during the scanning, and controlling an image forming process based on the detected light quantity to control so that image quality is maintained at a predetermined level or higher.

The image forming method according to still another aspect of this invention includes toner-developing a latent image formed on an image carrier to obtain a toner-developed image, obtaining information for image density unevenness in a spatial frequency range including a spatial frequency in which human eyesight is the most sensitive, and information for an average image density of the image, in which the information is obtained from the toner-developed image. The image forming method also includes changing at least one of image forming conditions when an image is formed using an electrophotographic method, based on the obtained information to form the image.

The image forming method according to still another aspect of this invention includes toner-developing a latent image formed on an image carrier to obtain a toner-developed image. The image forming method also includes obtaining information for image density unevenness in a spatial frequency range including a spatial frequency in which human eyesight is the most sensitive, and information for an average image density of the image, in which the information is obtained from the toner-developed image. The image forming method further includes changing image forming conditions that affect image density unevenness and image density when an image is formed using an electrophotographic method, based on the obtained information.

The image forming apparatus according to still another aspect of this invention includes an image carrier, a developer carrier that carries a developer for developing an image formed on the image carrier to make the image visible, and a density unevenness detecting unit that detects density unevenness of the image in a spatial frequency range including a spatial frequency in which human eyesight is the most sensitive. The image forming apparatus also includes a density detecting unit that detects an average density of the image, and a control unit that changes at least one of toner density of the developer and developing potential so as to reduce the density unevenness, based on detection results obtained from the density unevenness detecting unit and the density detecting unit.

The image forming apparatus according to still another aspect of this invention includes an image carrier, a developer carrier that carries developer for developing an image formed on the image carrier to make the image visible, and a density unevenness detecting unit that detects density unevenness of the image in a spatial frequency range including a spatial frequency in which human eyesight is the most sensitive. The image forming apparatus also includes a density detecting unit that detects an average density of the image, and a control unit that changes at least one of a linear velocity ratio of the developer carrier to the image carrier and developing potential so as to reduce the density unevenness, based on detection results obtained from the density unevenness detecting unit and the density detecting unit.

The image forming apparatus according to still another aspect of this invention includes an image carrier, a toner carrier that carries toner for developing an image formed on the image carrier to make the image visible, and a density unevenness detecting unit that detects density unevenness of the image in a spatial frequency range including a spatial frequency in which human eyesight is the most sensitive. The image forming apparatus also includes a density detecting unit that detects an average density of the image, and a control unit that changes at least one of a linear velocity ratio of the toner carrier to the image carrier and developing potential so as to reduce the density unevenness, based on detection results obtained from the density unevenness detecting unit and the density detecting unit.

The image forming apparatus according to still another aspect of this invention includes an image carrier, a developer carrier that carries developer for developing an image formed on the image carrier to make the image visible, and a density unevenness detecting unit that detects density unevenness of the image in a spatial frequency range including a spatial frequency in which human eyesight is the most sensitive. The image forming apparatus also includes a density detecting unit that detects an average density of the image, a developer supply unit that supplies developer to the developer carrier, and a developer disposing unit that disposes deteriorated developer. The image forming apparatus further includes a control unit that controls the developer disposing unit so as to dispose at least a portion of the developer, and controls the developer supply unit so as to supply new developer, based on detection results obtained from the density unevenness detecting unit and the density detecting unit.

The image forming apparatus according to still another aspect of this invention includes an image carrier, a toner carrier that carries toner for developing an image formed on the image carrier to make the image visible, and a density unevenness detecting unit that detects density unevenness of the image in a spatial frequency range including a spatial frequency in which human eyesight is the most sensitive. The image forming apparatus also includes a density detecting unit that detects an average density of the image, a toner supply unit that supplies toner to the toner carrier, and a toner disposing unit that disposes deteriorated toner. The image forming apparatus further includes a control unit that controls the toner disposing unit so as to dispose at least a portion of the toner, and controls the toner supply unit so as to supply new toner, based on detection results obtained from the density unevenness detecting unit and the density detecting unit.

The other objects, features and advantages of the present invention are specifically set forth in or will become apparent from the following detailed descriptions of the invention when read in conjunction with the accompanying drawings.

Figure 42:
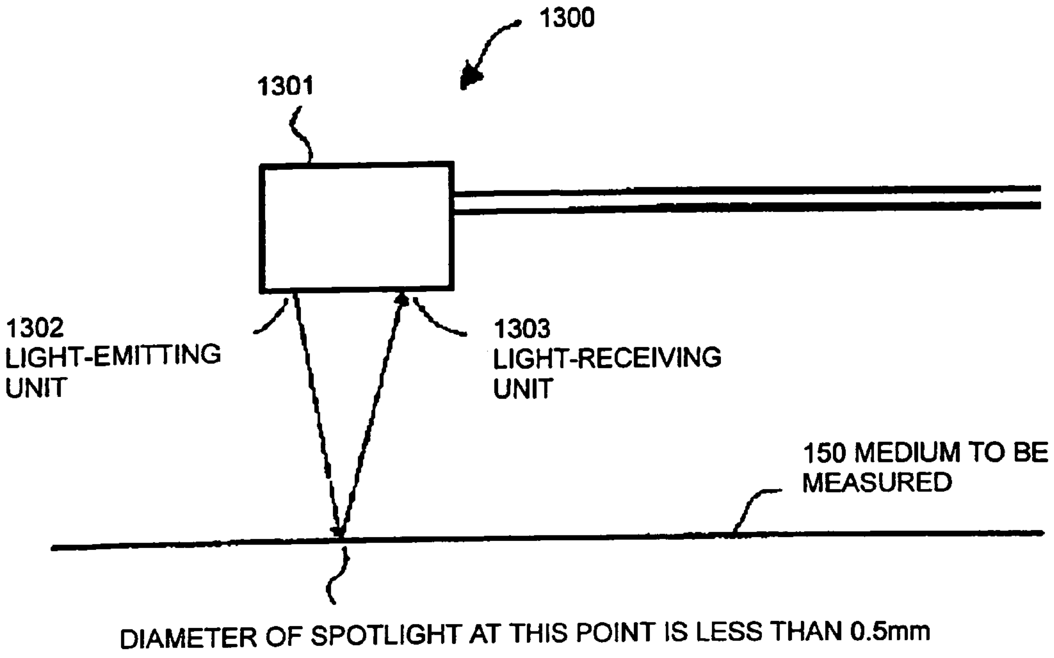
Figure 43:
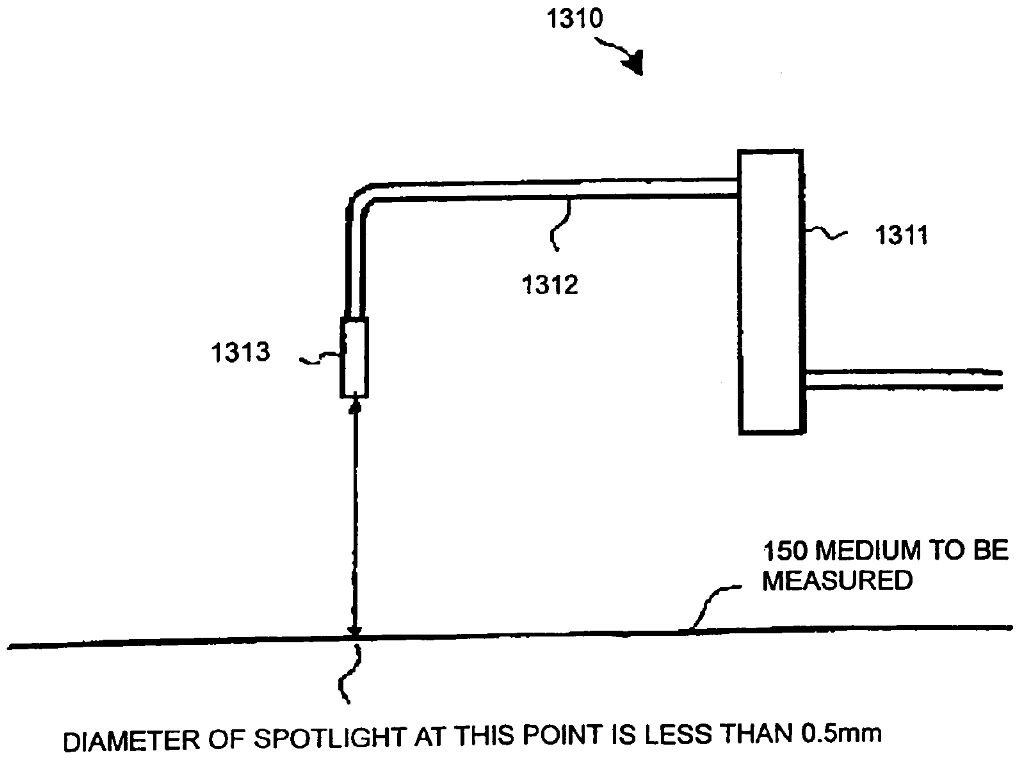
Figure 44:
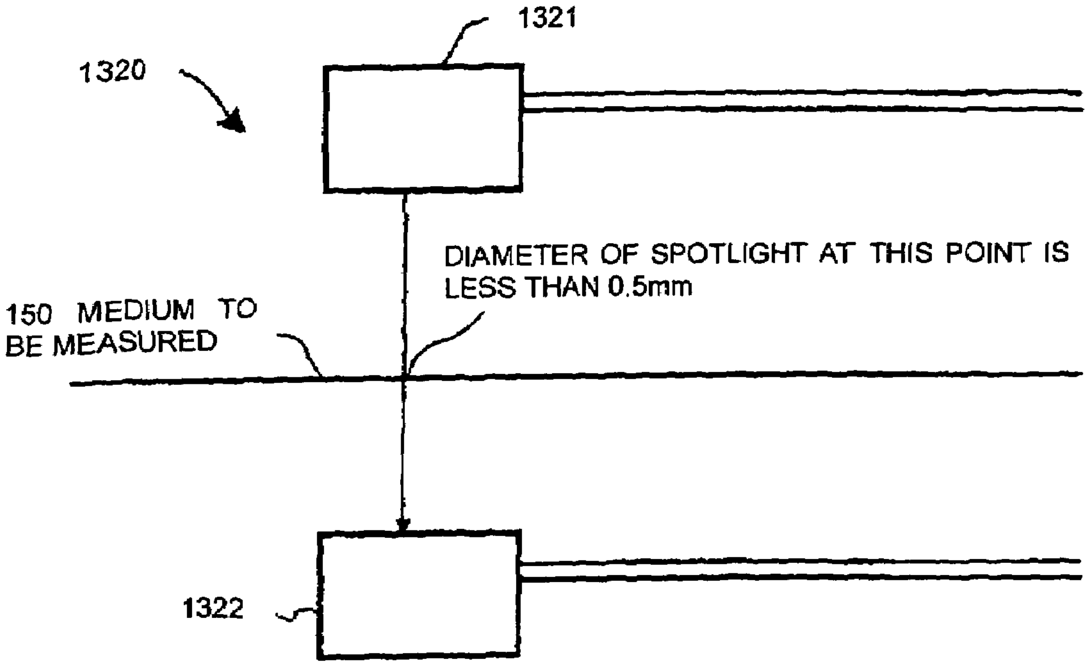
Figure 45A:
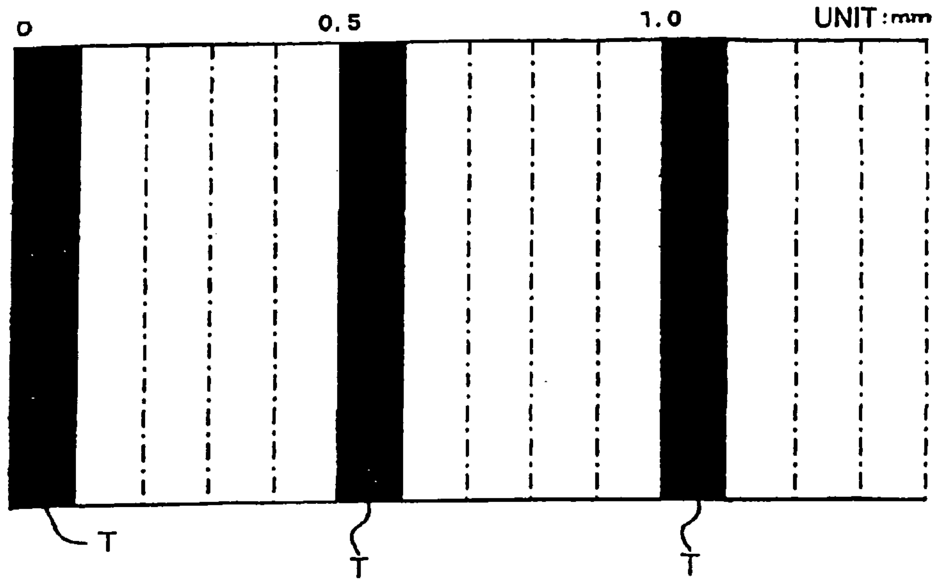
Figure 45B:
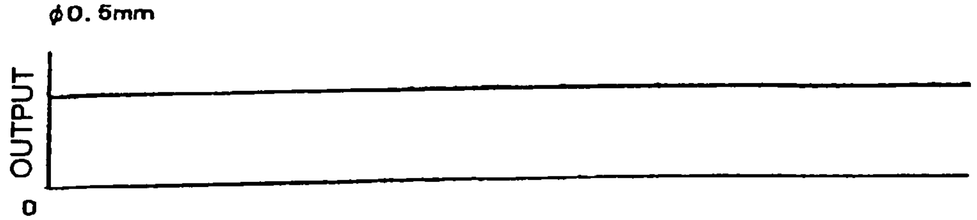
Figure 45C:
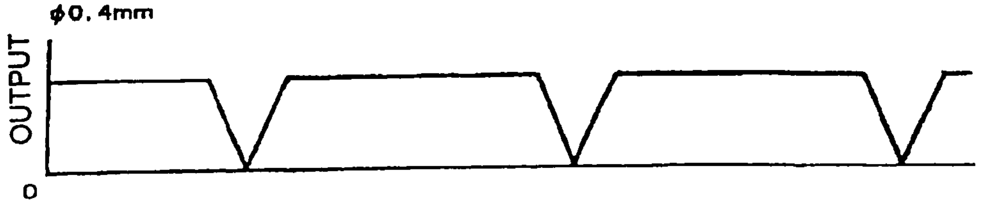
Figure 45D:
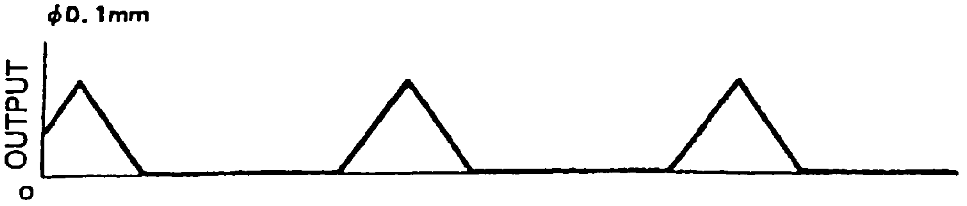
Figure 46:
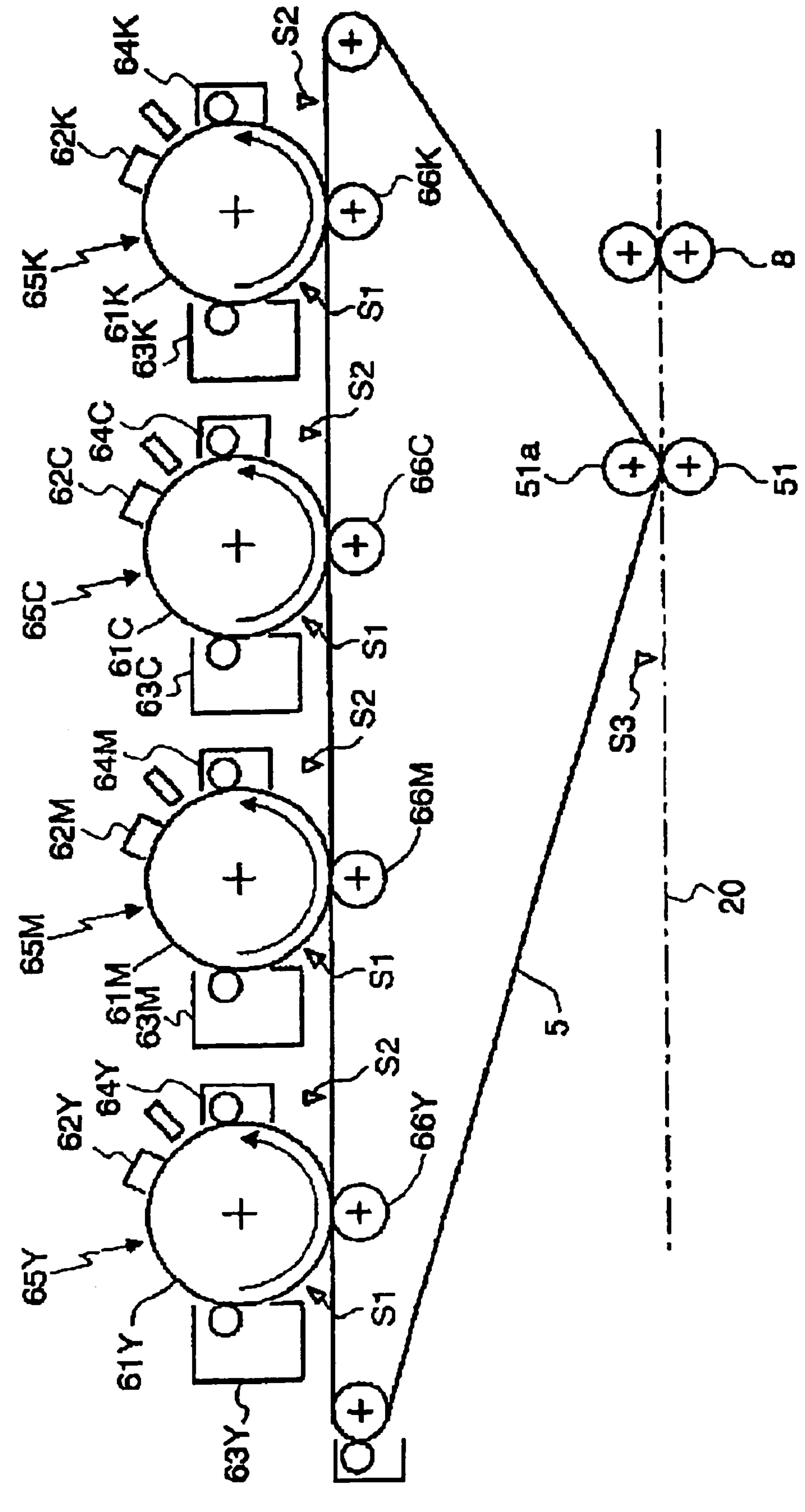
Figure 47:
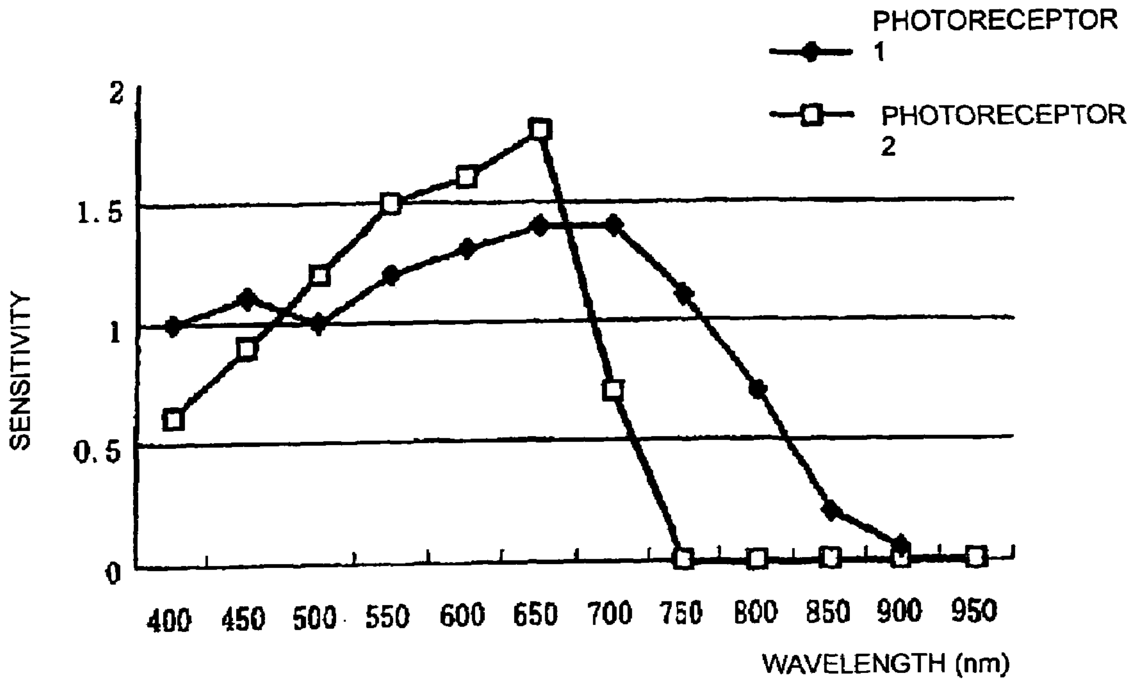
Figure 48:
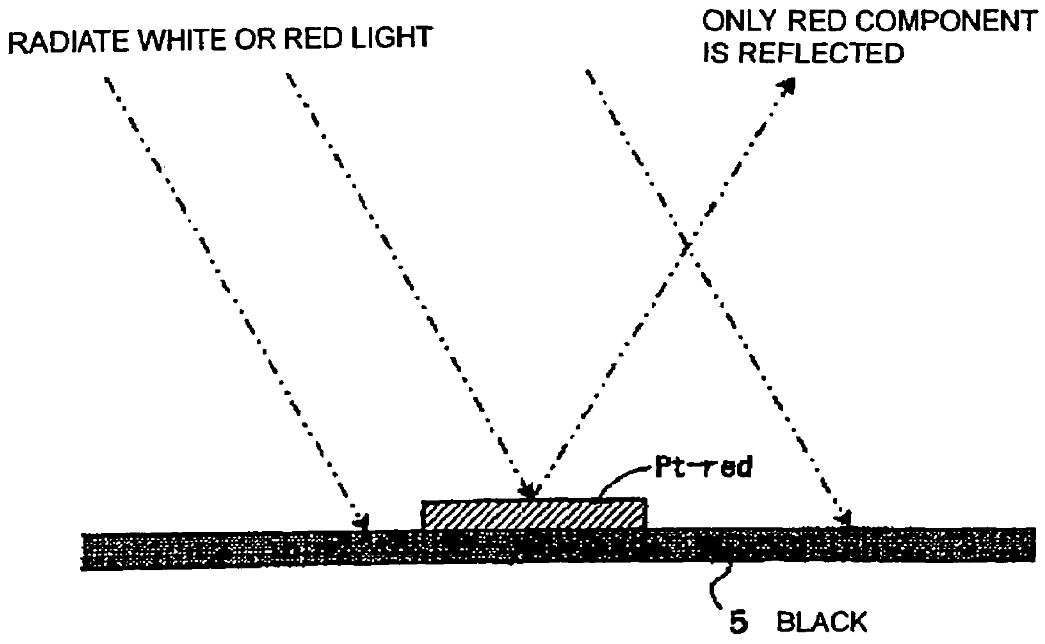
Figure 49:
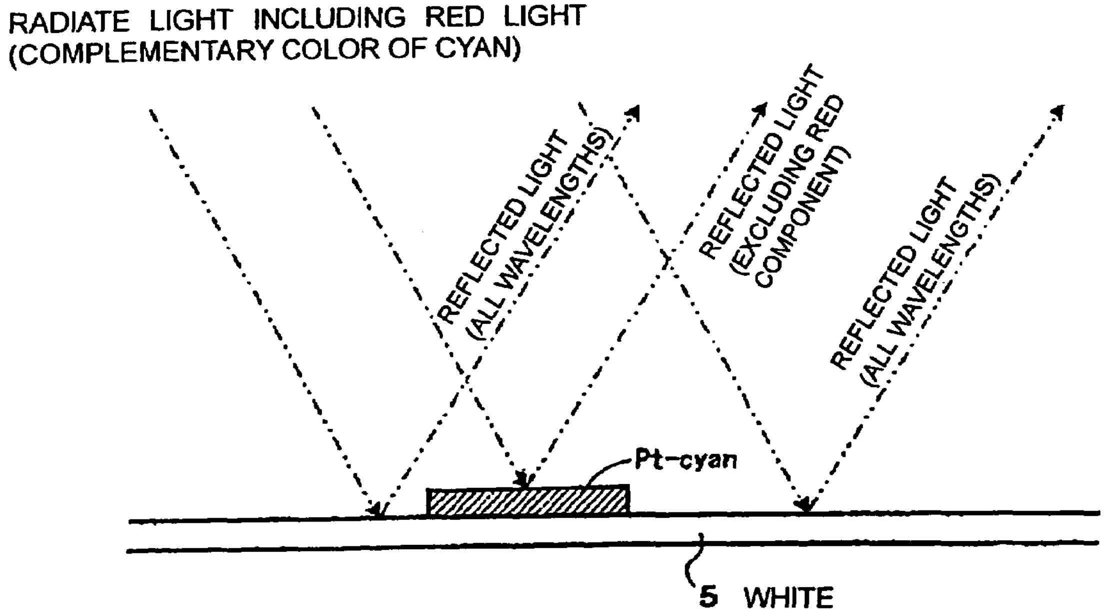
Figure 50:
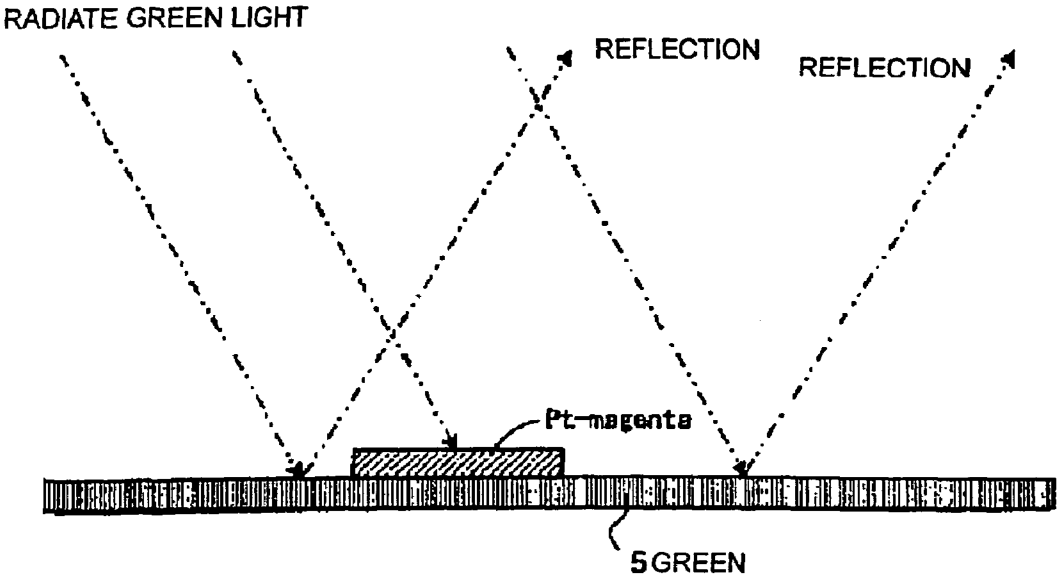
Figure 51:
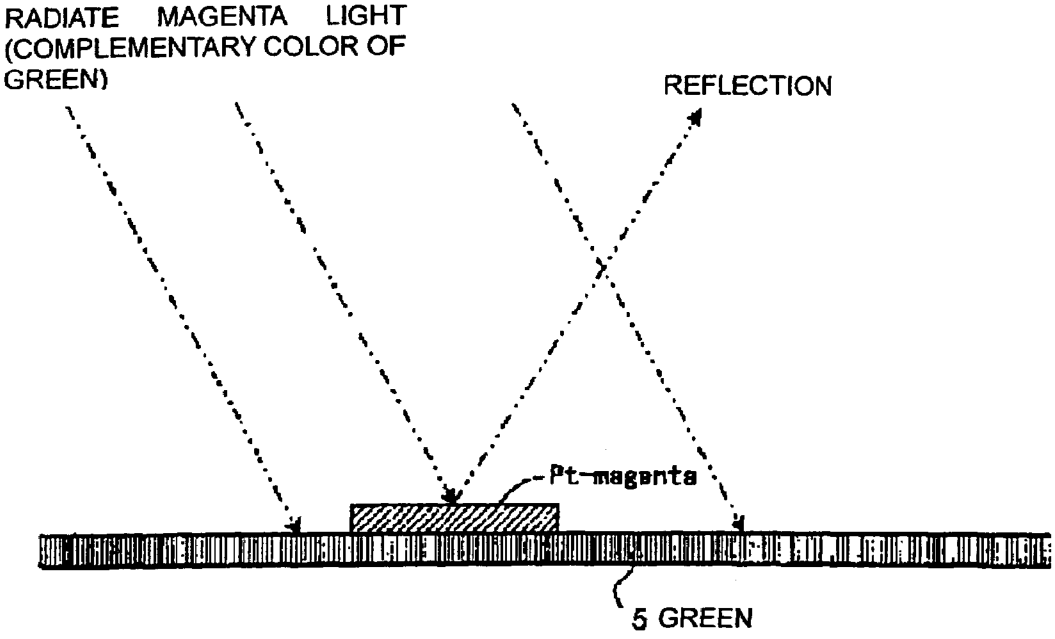
Figure 52:
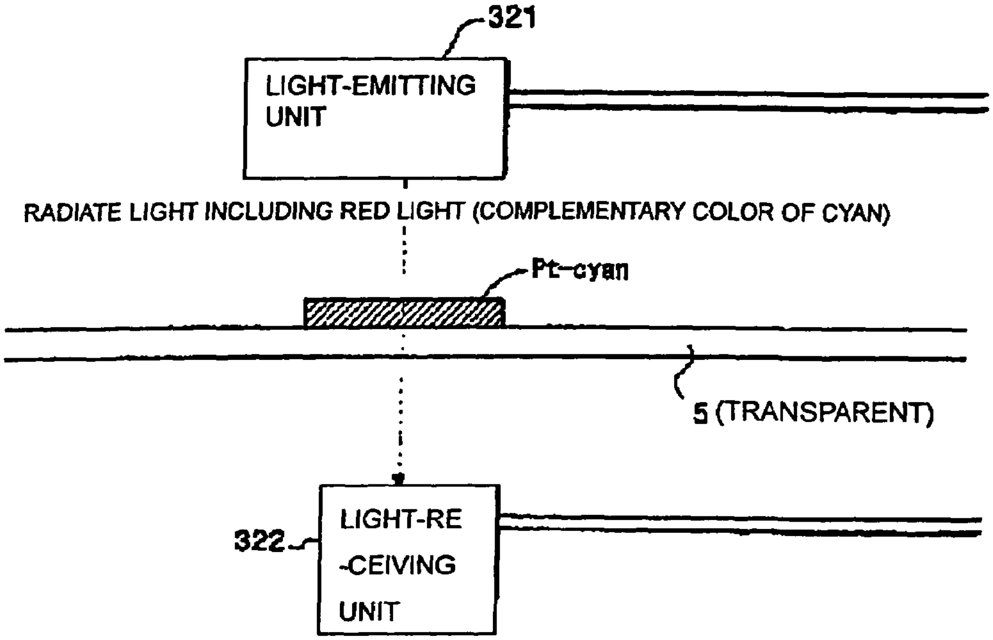
Figure 53:
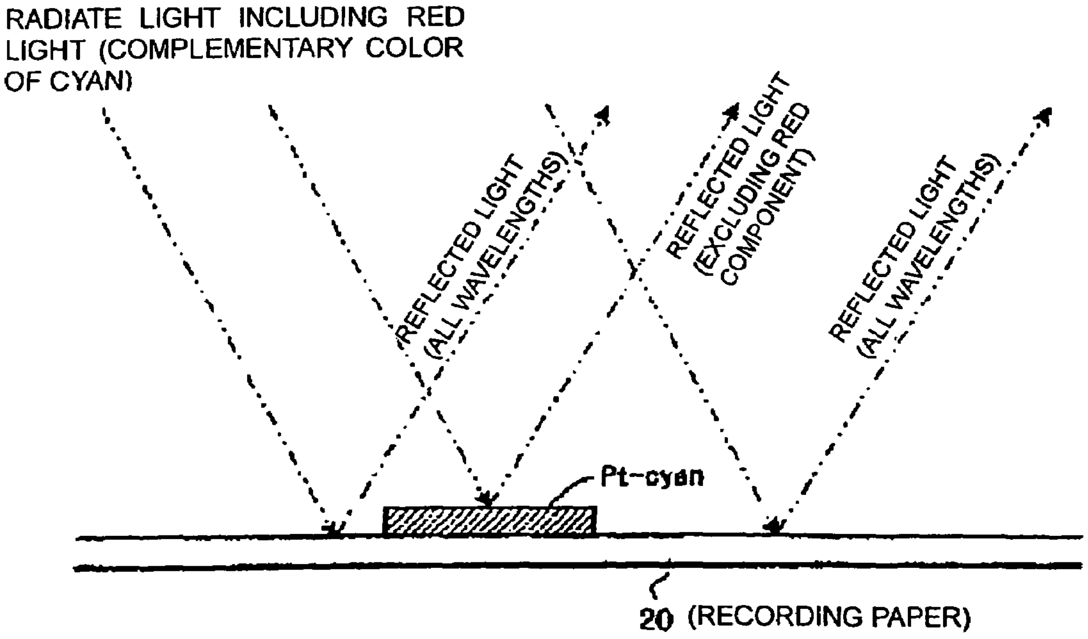
Figure 54:
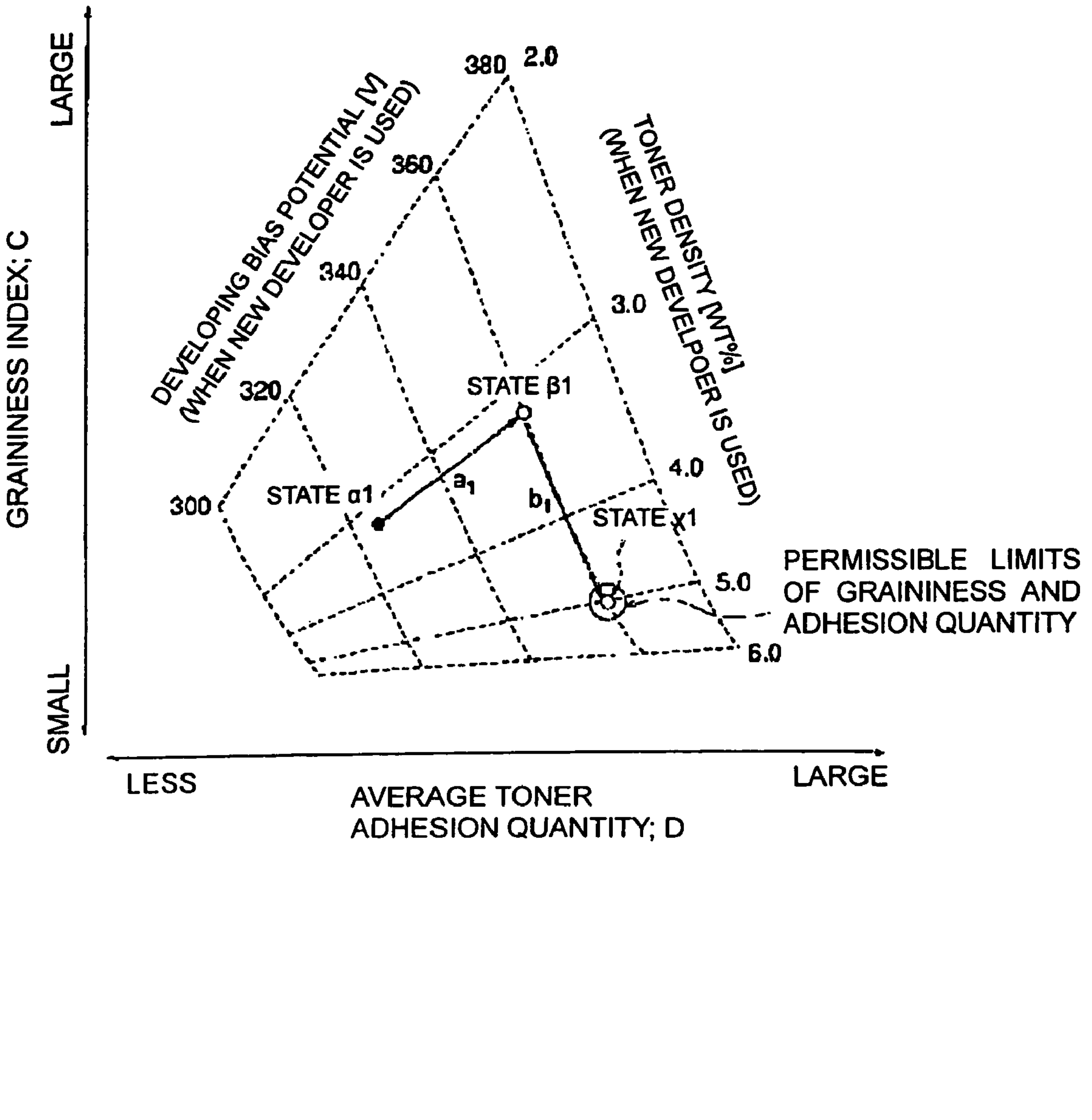
Figure 55:
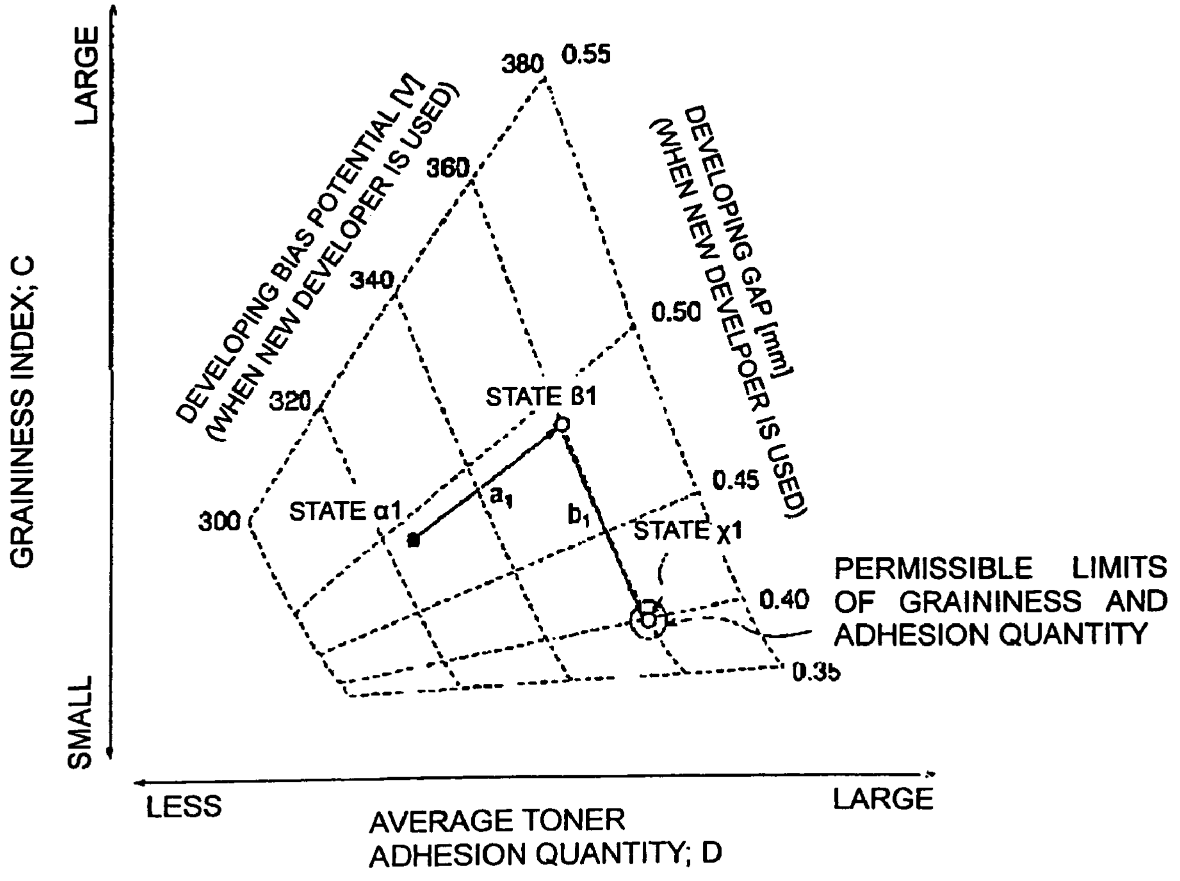
Figure 56:
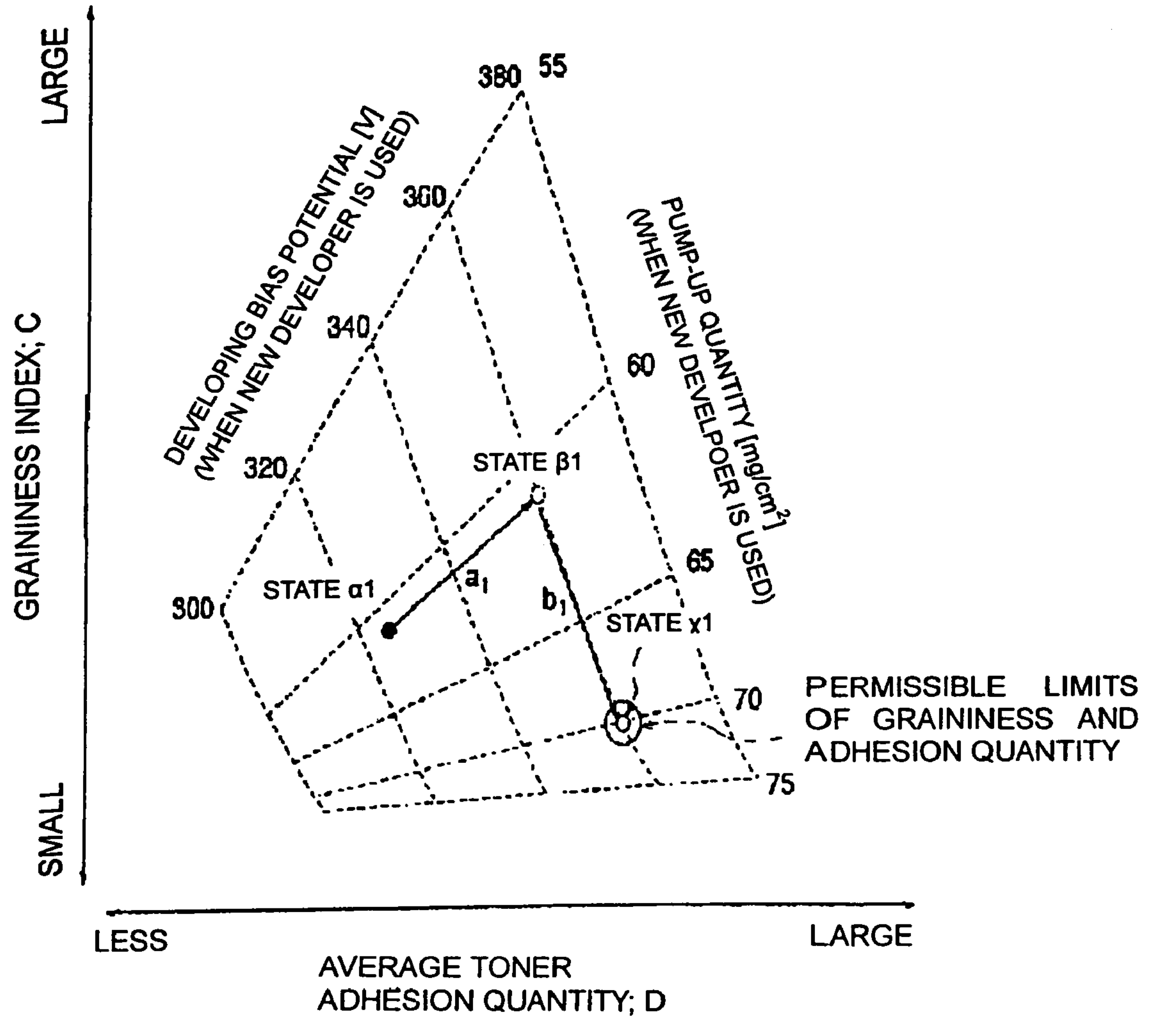
Figure 57:
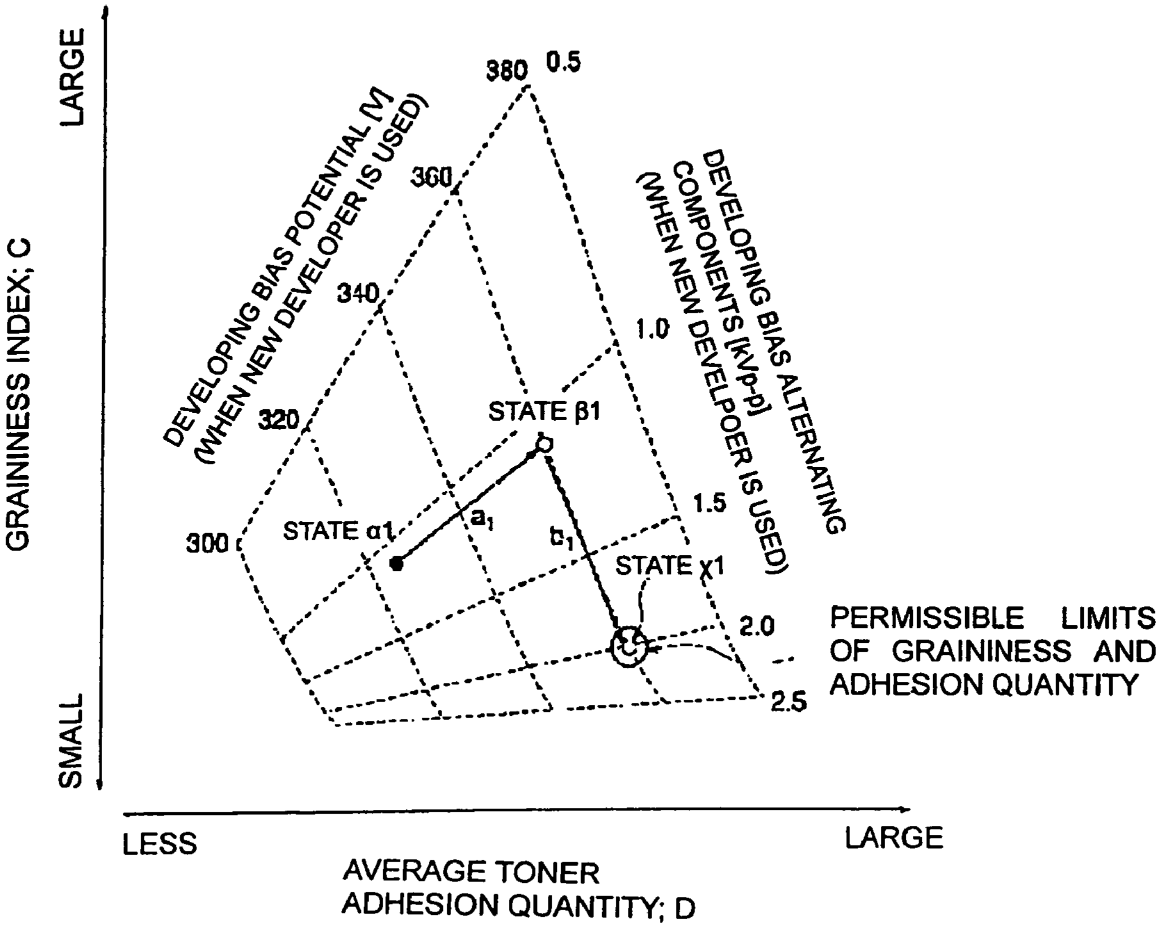
Figure 58:
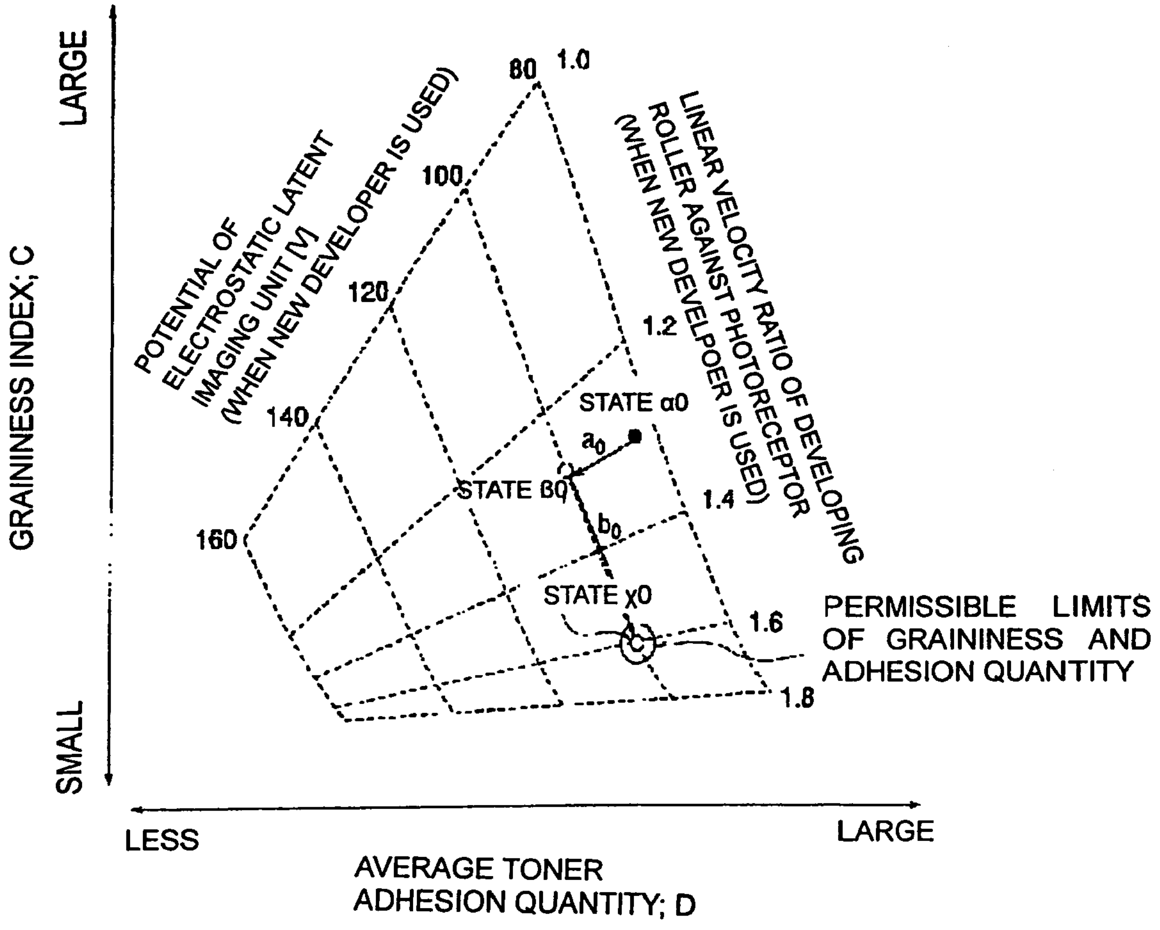
Figure 59:
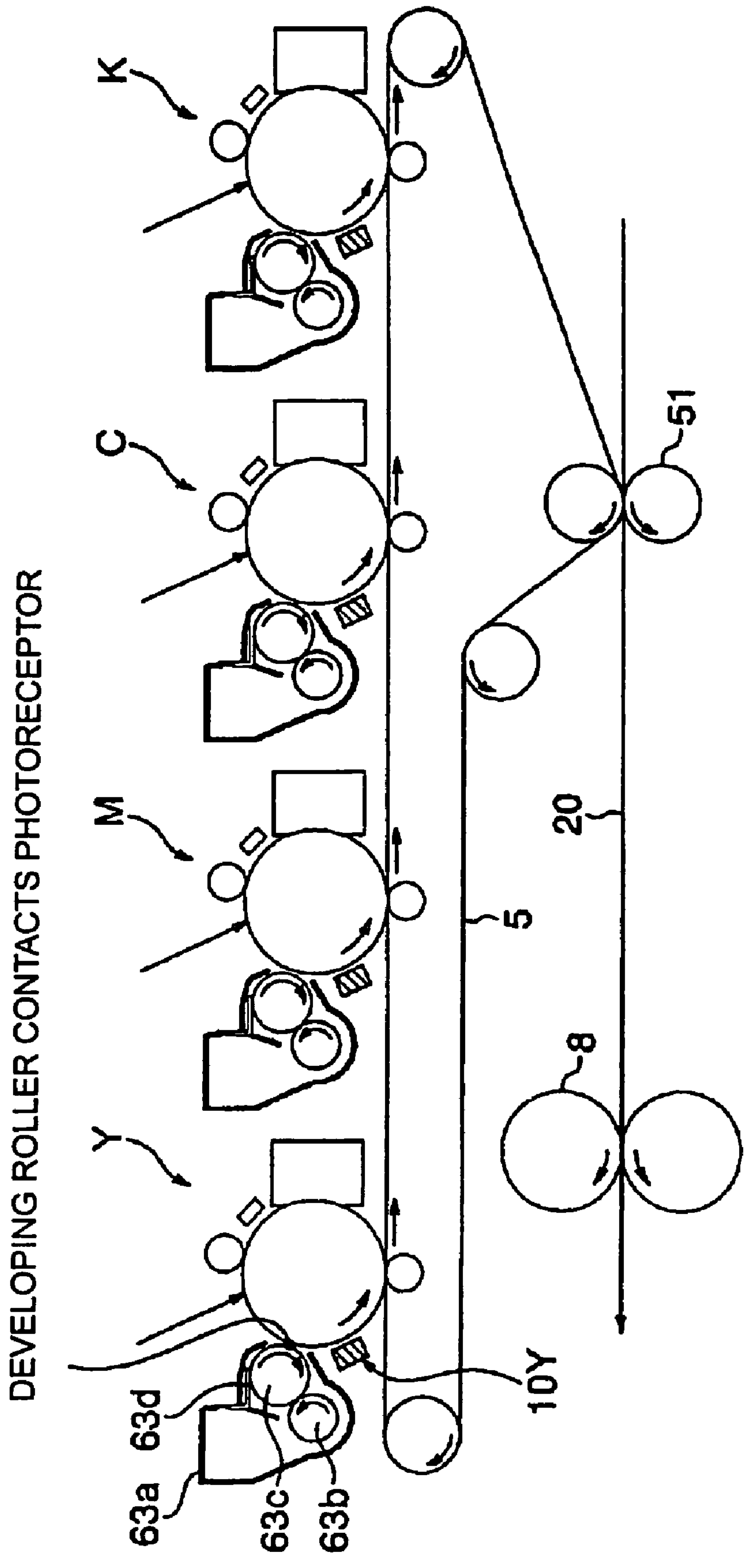
Figure 60:
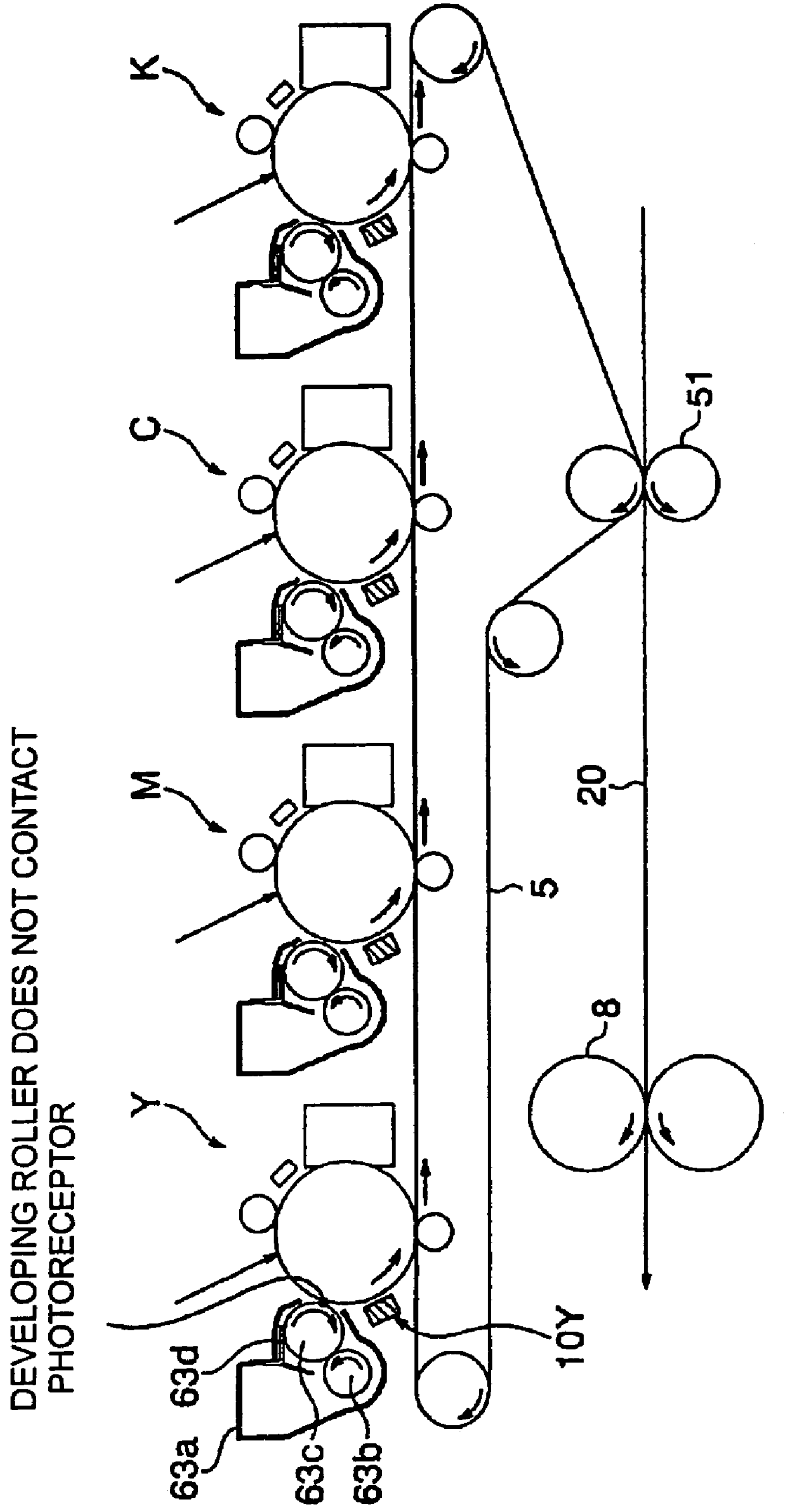
Figure 61:
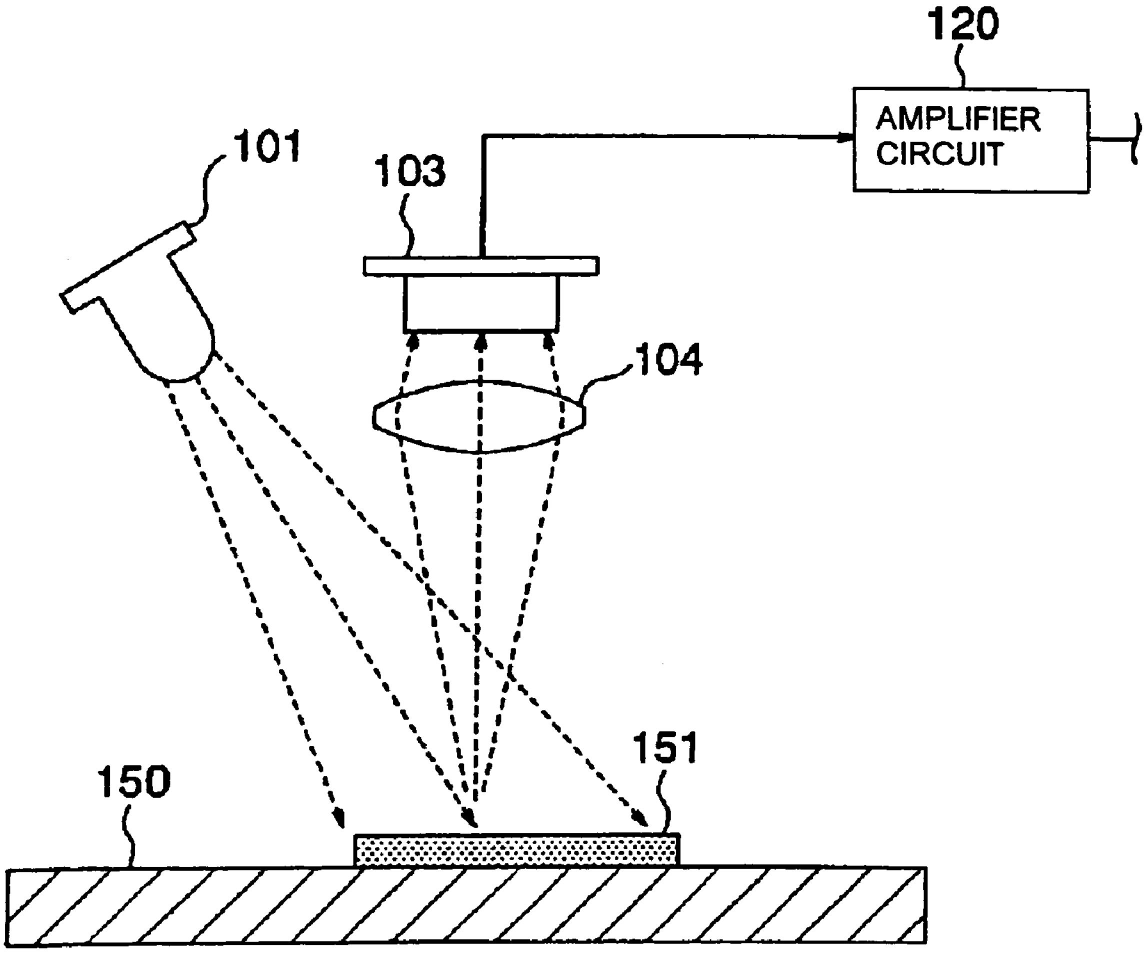
Figure 62:
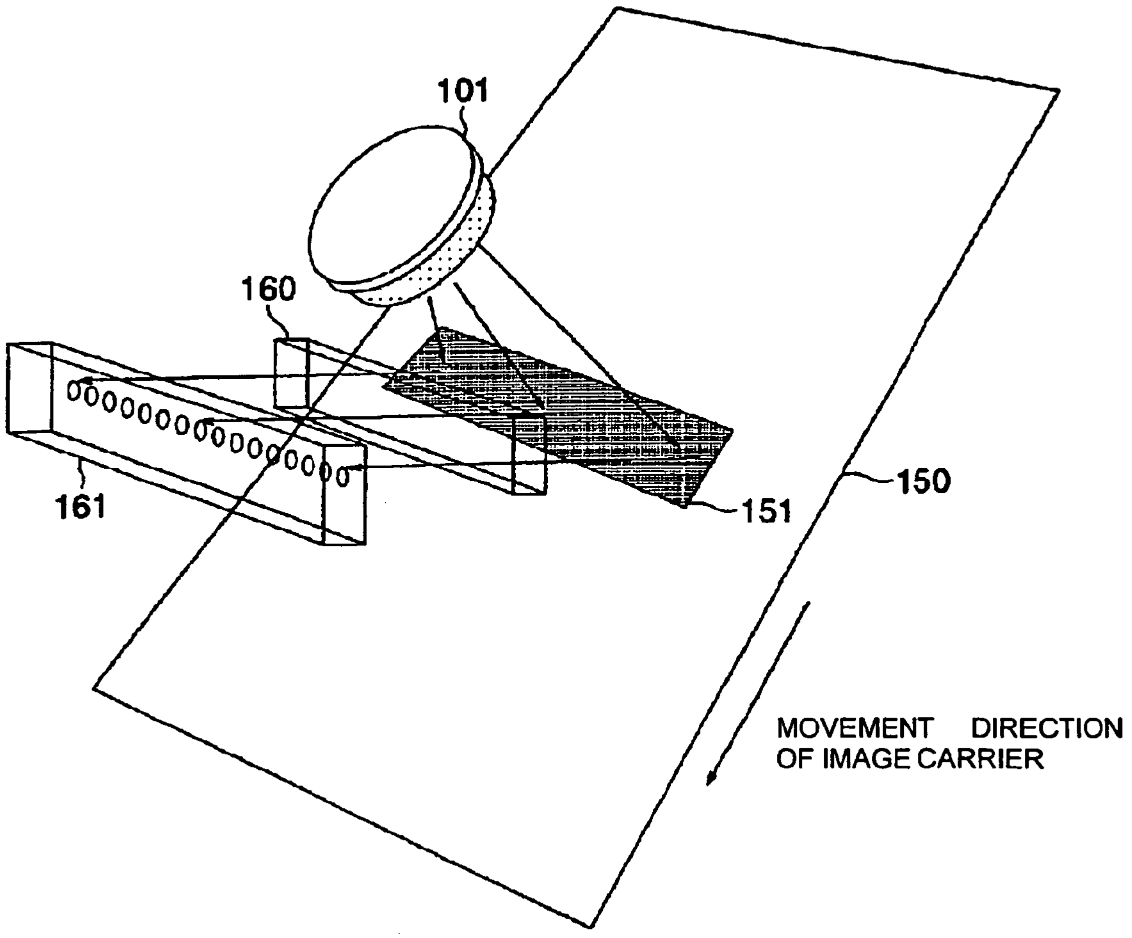
Figure 63:
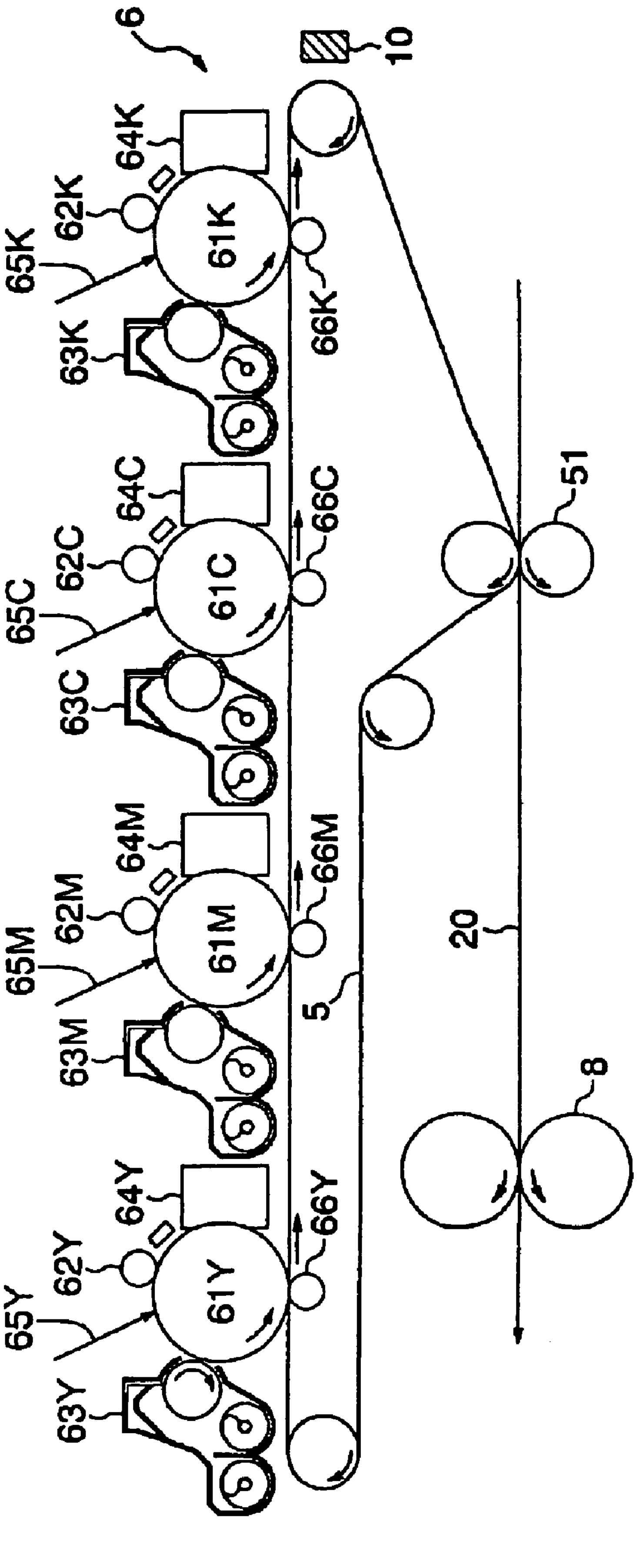
Figure 64:
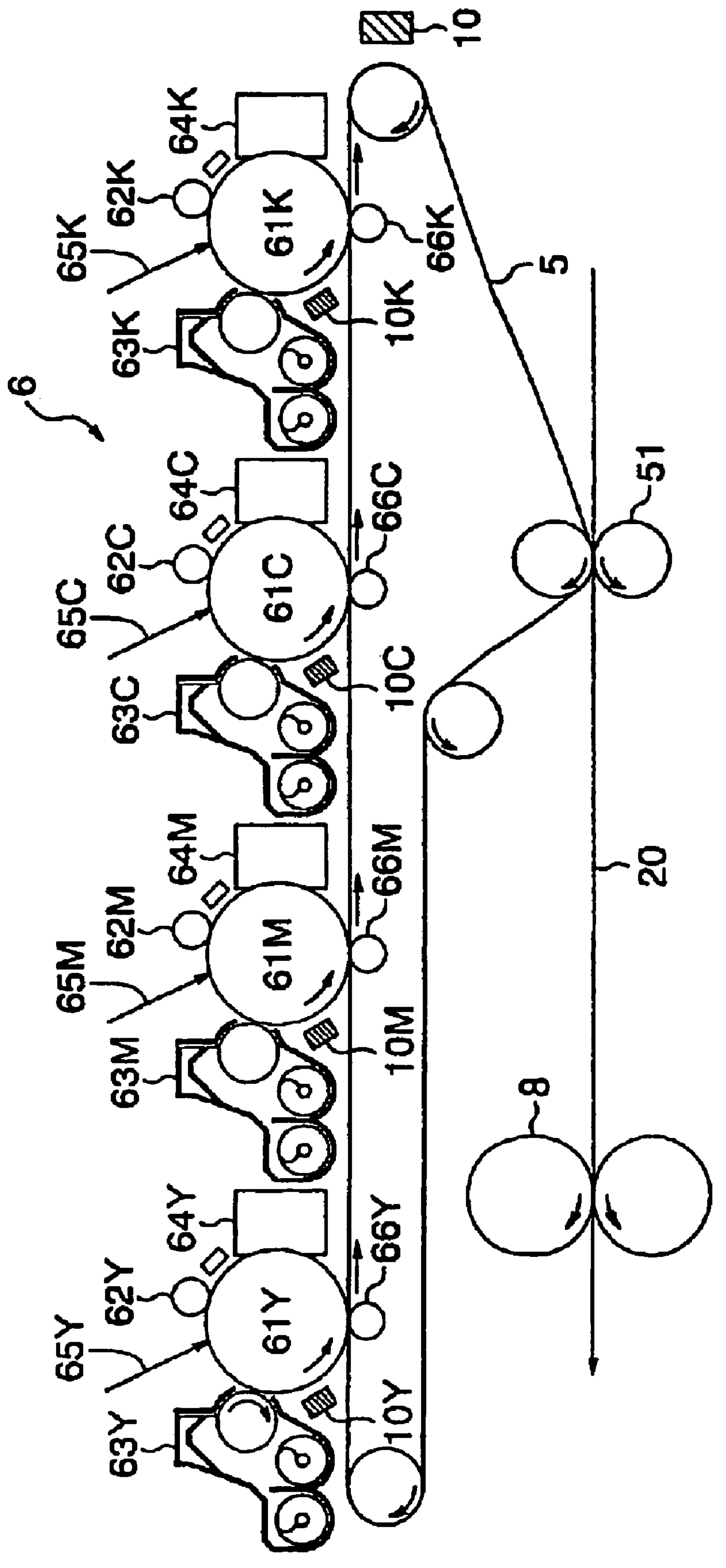

FIG. 42 is a side view of an example of a reflection type sensor which detects the image patterns in a sixth embodiment of the present invention;

FIG. 43 is a side view of another example of the reflection type sensor which detects the image patterns in the sixth embodiment;

FIG. 44 is a side view of an example of a through-beam type sensor which detects the image patterns in the sixth embodiment;

FIG. 45A is a plan view of an example of the image pattern in the sixth embodiment, and FIG. 45B to FIG. 45D show graphs of the detected image patterns;

FIG. 46 is a partially sectional view of a location where a photo sensor is installed in the sixth embodiment;

FIG. 47 is a graph of sensitivity characteristics of two types of photoreceptor in the sixth embodiment;

FIG. 48 is a schematic diagram of how a red image pattern on a black intermediate transfer belt is detected in the sixth embodiment;

FIG. 49 is a schematic diagram of how a cyan image pattern on a white intermediate transfer belt is detected in the sixth embodiment;

FIG. 50 is a schematic diagram of how an image pattern on a particular color intermediate transfer belt is detected by a light having a wavelength so that a reflection can be obtained from the belt in the sixth embodiment;

FIG. 51 is a schematic diagram of how an image pattern on a particular color intermediate transfer belt is detected by a light having a wavelength so that a reflection cannot be obtained from the belt in the sixth embodiment;

FIG. 52 is a schematic diagram of how an image pattern on a transparent intermediate transfer belt is detected by the through-beam type photo sensor in the sixth embodiment;

FIG. 53 is a schematic diagram of how an image pattern on a recording medium is detected in the sixth embodiment;

FIG. 54 shows a relationship between an average toner adhesion quantity and a graininess index in a ninth embodiment of the present invention;

FIG. 55 shows a relationship between an average toner adhesion quantity and a graininess index in a tenth embodiment of the present invention;

FIG. 56 shows a relationship between an average toner adhesion quantity and a graininess index in an eleventh embodiment of the present invention;

FIG. 57 shows a relationship between an average toner adhesion quantity and a graininess index in a twelfth embodiment of the present invention;

FIG. 58 shows a relationship between an average toner adhesion quantity and a graininess index in a fourteenth embodiment of the present invention;

FIG. 59 is a schematic diagram of an image forming unit in an image forming apparatus according to a fifteenth embodiment of the present invention;

FIG. 60 is a schematic diagram of an image forming unit in an image forming apparatus according to a sixteenth embodiment of the present invention;

FIG. 61 shows a sensor unit of an image quality measuring apparatus provided in an image forming apparatus according to a seventeenth embodiment of the present invention;

FIG. 62 is another example of the sensor unit of the image quality measuring apparatus according to the seventeenth embodiment;

FIG. 63 is a schematic diagram of an image forming unit in an image forming apparatus according to an eighteenth embodiment of the present invention; and FIG. 64 is a schematic diagram of another image forming unit in the image forming apparatus according to the eighteenth embodiment.

DETAILED DESCRIPTION

Exemplary embodiments of the present invention will be explained below with reference to the accompanying drawings.

A first embodiment of this invention will be explained below.

1.1 General Structure

Figure 1:
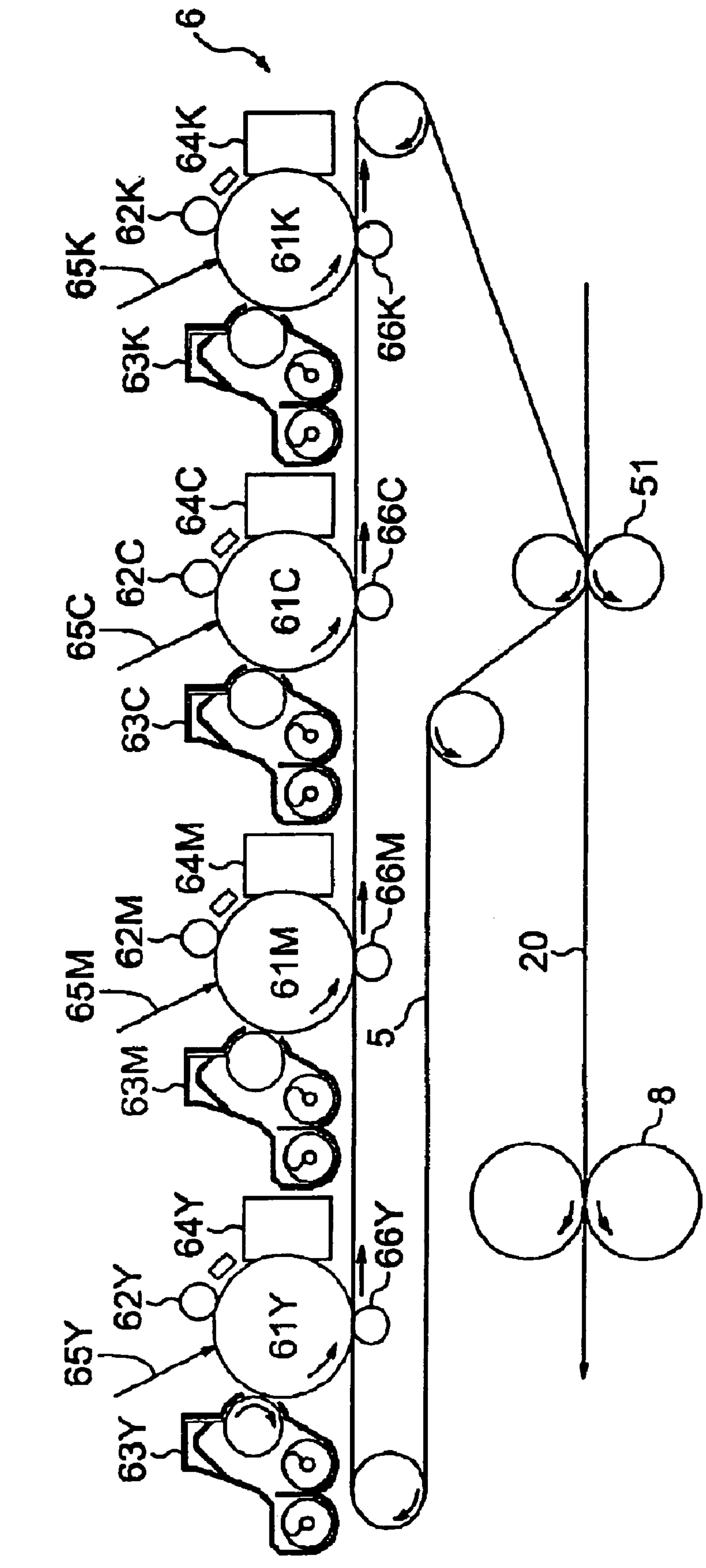
FIG. 1 shows an image forming unit of a full-color image forming apparatus, which uses a dry-type two-component developing method, that is furnished with tandem arranged photoreceptor drums as latent image carriers according to a first embodiment of the present invention.
Figure 2:
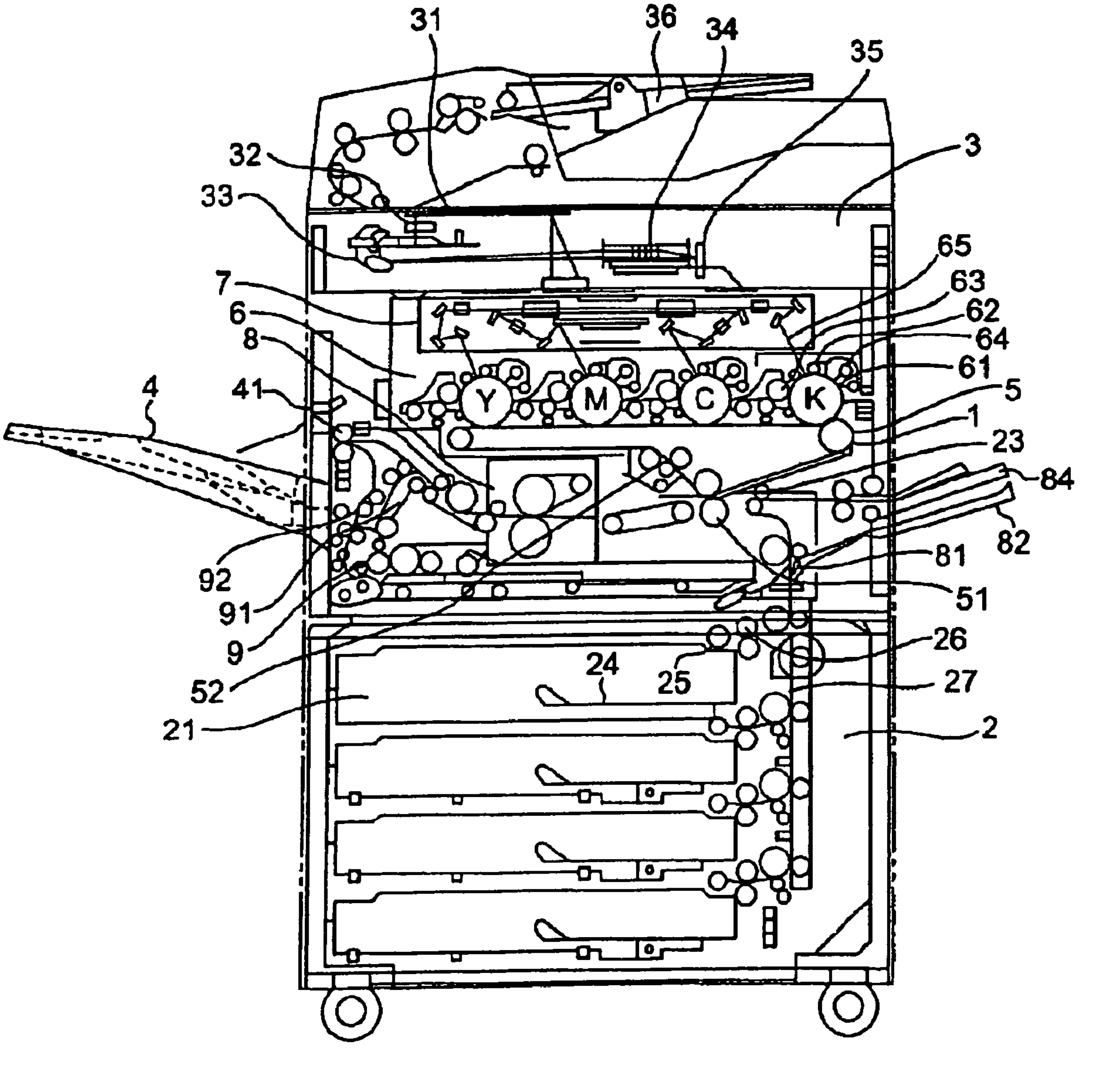
FIG. 2 shows a general view of the full-color image forming apparatus, which uses the dry-type two-component developing method, that is furnished with the tandem arranged photoreceptor drums as the latent image carriers according to the first embodiment.

FIG. 1 shows an image forming unit of a full-color image forming apparatus of a dry type two-component developing system that is furnished with tandem arranged photoreceptor drums as latent image carriers according to the first embodiment. FIG. 2 is a general view of the full-color image forming apparatus equipped with the image forming unit.

As shown in FIG. 2, the image forming unit 1 is disposed at about a center of the tandem type color image forming apparatus MFP according to the first embodiment, and a paper feeding unit 2 is disposed beneath the image forming unit 1, and the paper feeding unit 2 includes a plurality of trays 21. Furthermore, a reading unit 3 to read a document is arranged above the image forming unit 1. A paper discharging tray 4 as a discharged paper storage unit is equipped in downstream of a paper transfer direction (shown in the left side of FIG. 2), and is loaded with discharged paper on which image is formed.

As shown in FIG. 1, the image forming unit 1 has an intermediate transfer belt 5 which is an endless belt. A plurality of the image forming units 6 for yellow (Y), magenta (M), cyan (C), and black (K) are arrayed over the intermediate transfer belt 5 which stretches out toward both the right and left directions in the image forming apparatus shown in FIG. 2. The image forming units 6 include corresponding drum-shaped photoreceptors (photoreceptor drum) 61Y, 61M, 61C, and 61K (hereinafter simply "a photoreceptor 61" unless necessary to distinguish colors). A charging unit 62, an exposing portion 65, a developing unit 63, and a cleaning unit 64 are arranged along outer circumference of the corresponding photoreceptor 61. The charging unit 62 charges the surface of the photoreceptor 61, and in the exposing portion 65, the surface of the photoreceptor 61 is irradiated with a laser beam radiated from an exposing apparatus 7 (refer to FIG. 2). The developing unit 63 visualizes an electrostatic latent image formed on the surface of the photoreceptor 61 by unit of toner developing, and the cleaning unit 64 removes and recovers toner remaining on the surface of the photoreceptor 61 after transfer.

In an image forming process according to the image forming unit 1 having such a structure, an image of each color is formed on the photoreceptor 61 of the corresponding image forming unit 6, and four colors are superposed on the surface of the intermediate transfer belt 5 to form a color image. In this process, at first a yellow (Y) image forming unit develops yellow (Y) toner and transfers the developed yellow toner onto the intermediate transfer belt 5 by a primary transfer unit 66Y. Then, a magenta (M) image forming unit develops magenta toner and transfers the developed magenta toner onto the intermediate transfer belt 5 by a primary transfer unit 66M. Then, a cyan (C) image forming unit develops cyan toner and transfers the developed cyan toner onto the intermediate transfer belt 5 by a primary transfer unit 66C, and lastly a black (B) image forming unit develops black toner and transfers the developed black toner onto the intermediate transfer belt 5 by a primary transfer unit 66K, and a full-color toner image with the four colors superposed on one another is formed. Then, the four-color toner image on the intermediate transfer belt 5 is transferred, by a secondary transfer unit (transfer roller) 51, onto recording paper 20 supplied from a paper feeding unit 2, and the recording paper 20 is conveyed toward a fixing unit 8. In the fixing unit 8, the toner image transferred to the recording paper 20 is fixed, and the recording paper 20 is discharged to the paper discharging tray 4 by paper discharging rollers 41 or conveyed to a double-side unit 9. When a double-sided printing is conducted, a carrying route is branched at a branch point 91, and the recording paper 20 is reversed by way of a double-side unit 9. Then, a skew of the recording paper 20 is corrected by register rollers 23 and the image forming process on back side of the paper is conducted in the same manner as on the front side. Meanwhile, toner remaining on the surface of the intermediate transfer belt 5 shown in FIG. 1, after the full-color toner image is transferred, is removed and recovered by a cleaning unit 52. In FIG. 92, reference numeral 92 denotes a reversed paper discharging route. Further, in FIG. 1, the image forming units of colors are distinguished from one another by putting each letter Y, M, C, or K indicating each color on a latter part of reference numeral denoting each unit.

A stack of unused recording paper 20 is stored in the paper feeder tray 21 of the paper feeding unit 2 shown in FIG. 2. In the paper feeder unit 2, the recording paper 20 stored in the paper feeder tray 21 is sent out toward the image forming unit 1 in such a manner as follows. Firstly, an end of a base plate 24 is raised, while the other end of the base plate 24 is movably held to the base of the paper feeder tray 21, thus a topmost piece of the recording paper 20 (that is omitted in FIG. 2) stored in the paper feeder tray 21 is raised up to a position contactable with a pick-up roller 25. The topmost piece of the recording paper 20 is drawn out from the paper feeder tray 21 by the pick-up roller 25 and carried toward the register rollers 23 by feeding rollers 26 by way of a vertical conveying path 27. The register rollers 23 temporarily halt carrying of the recording paper 20 and adjust timing so as to control the toner image on the intermediate transfer belt 5 and a tip of the recording paper 20 to be situated at designated positions and send out the recording paper 20. The register rollers 23 perform the same function on the recording paper 20 coming in from a manual feeding tray 84 as on the recording paper 20 coming in from the vertical conveying path 27. In FIG. 2, reference numeral 81 indicates a branch nail and reference numeral 82 indicates a paper discharging tray. When a jam occurs in the downstream of the vertical conveying path 27, the branch nail 81 functions to discharge the jammed paper to the paper discharging tray 82.

The reading unit 3 includes a first traveling body 32, a second traveling body 33, a CCD 35, and a lens 34. Each of the traveling bodies 32 and 33 has a light source for illuminating a document and a mirror. The first traveling body 32 and the second traveling body 33 reciprocate to scan the document (not shown) placed on a contact glass 31. The information for the image scanned by the first traveling body 32 and the second traveling body 33 is focused, by the lens 34, on an image forming face of the CCD 35 which is arranged in a rear part of the reading unit 3, and is read in as image signals by the CCD 35. The read-in image signals are digitized and subjected to image processing.

The exposure device 7 is equipped with a laser diode LD not shown, the laser diode LD emits light based on the signals after the image processing, and an optical writing is conducted on the surface of the photoreceptor 61 to form an electrostatic latent image. The optical signals coming from the LD reach the photoreceptor 61 through a known polygon mirror and a lens. Further, an automatic document feeder 36 is equipped above the reading unit 3 to automatically feed the document on to the contact glass 31.

Incidentally, the color image forming apparatus according to the first embodiment is a so called multi-function image forming apparatus. This multi-function image forming apparatus has a function as a digital color copier which reads in the document through optical scanning, digitizes the read-in image, and copies the digitized image on a sheet of paper, a function as a facsimile that sends out to and receives from remote areas the image information by a control unit not shown, and a function as a printer that prints out the image information, which is computer-executable, on a sheet of paper. Regardless of the functions, all the images are formed on the recording paper 20 by a similar image forming process, and the recording paper 20 is discharged into the single paper discharging tray 4 and stored. Furthermore, the image forming apparatus according to the first embodiment is capable of detecting a deterioration of the image and automatically controlling the image forming conditions to appropriate ones if the deterioration is confirmed, as described later. Thus, there is no need to replace the developer and the photoreceptor immediately after the deterioration is confirmed, and therefore, it is possible to extend lives of the developer and the photoreceptor to the limit.

1.2 Image Quality

Figure 3:
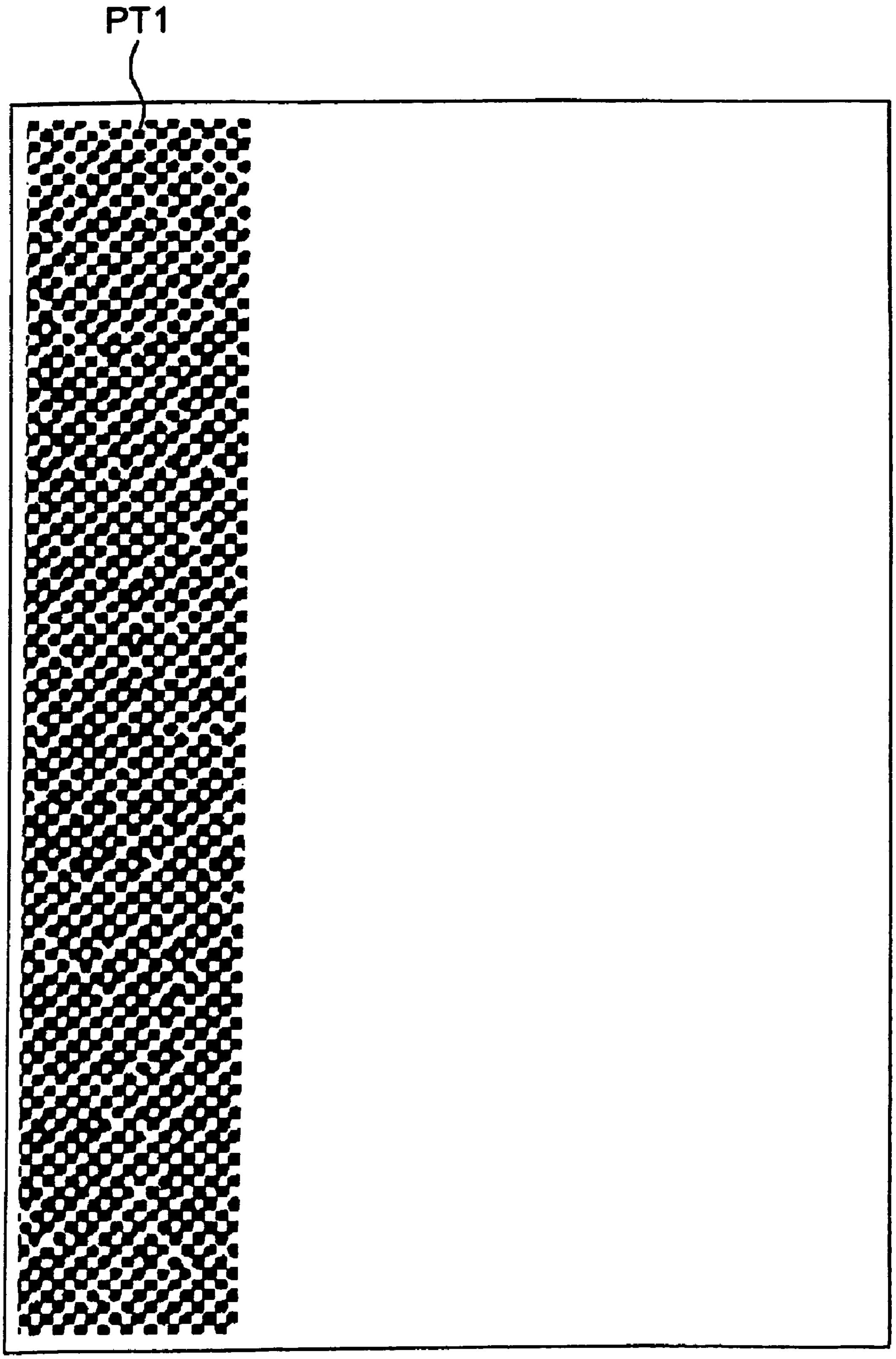
FIG. 3 shows an initial image of a dotted image formed on a recording medium using the image forming apparatus which has a 600 dpi writing system shown in FIG. 2.
Figure 4:
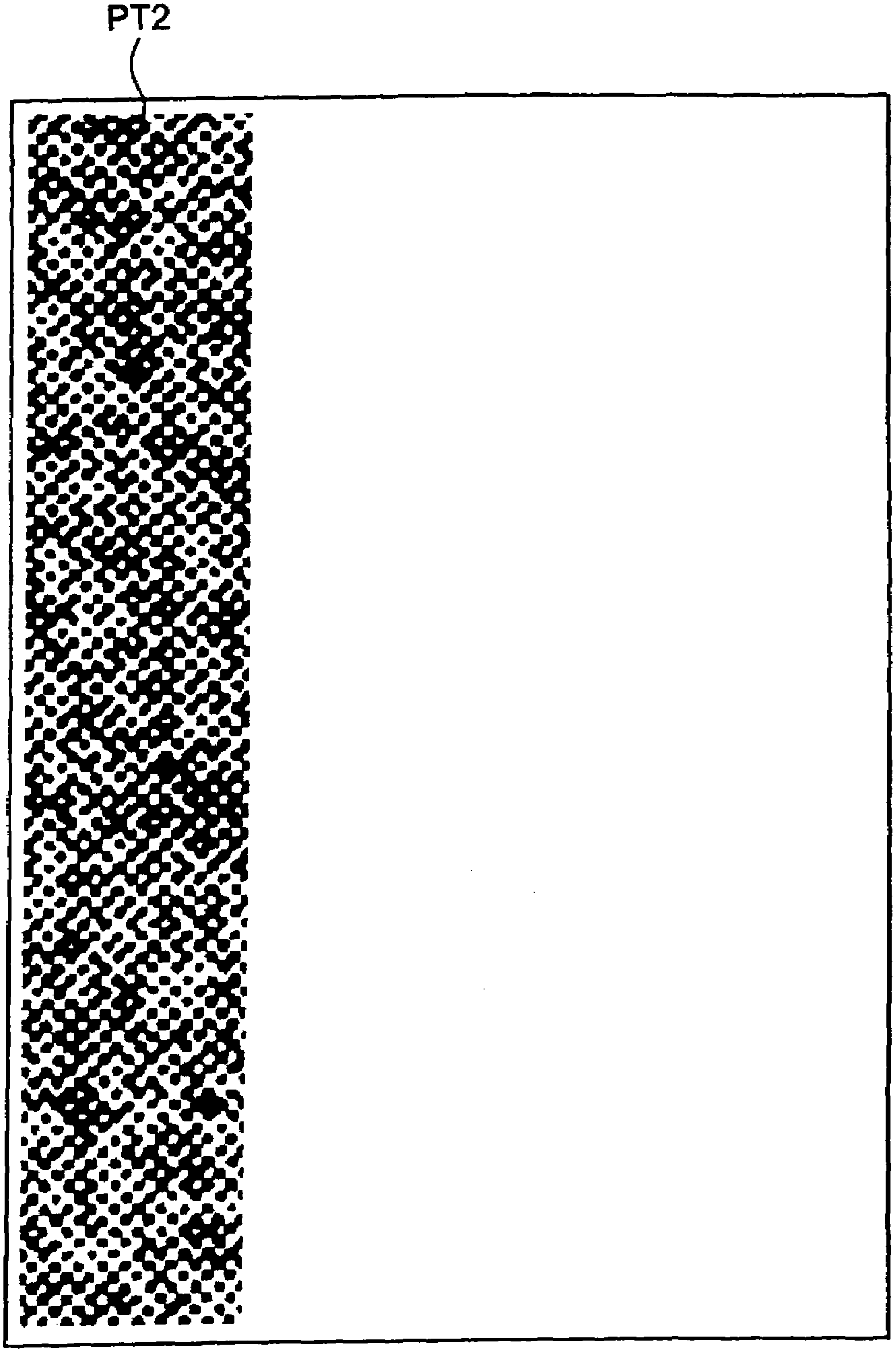
FIG. 4 shows an image of the dotted image formed on a recording medium, after printing for extremely long period of time under a certain condition using the image forming apparatus which has the 600 dpi writing system shown in FIG. 2.

FIGS. 3 and 4 are enlarged photographs (the images are binarized when photographed, for convenience in printing) of dot images (a size of a dot is “2 pixels×2 pixels”) formed on the recording paper 20 by the image forming apparatus shown in FIGS. 1 and 2 that has a function capable of writing in 600 dpi. FIG. 3 shows an initial halftone image PT1, and FIG. 4 shows a halftone image PT2 printed after the printer is used over a very long period of time under a certain condition. As shown in FIG. 3, the halftone image PT1 of which density is initially uniform has turned into the halftone image PT2 having roughness due to various factors such as deterioration of the developer and the photoreceptor in the image forming process due to the use of these devices for a long period of time. The roughness can be digitized as a spatial frequency response of fine density unevenness and expressed as a characteristic such as “graininess”.

Figure 5:
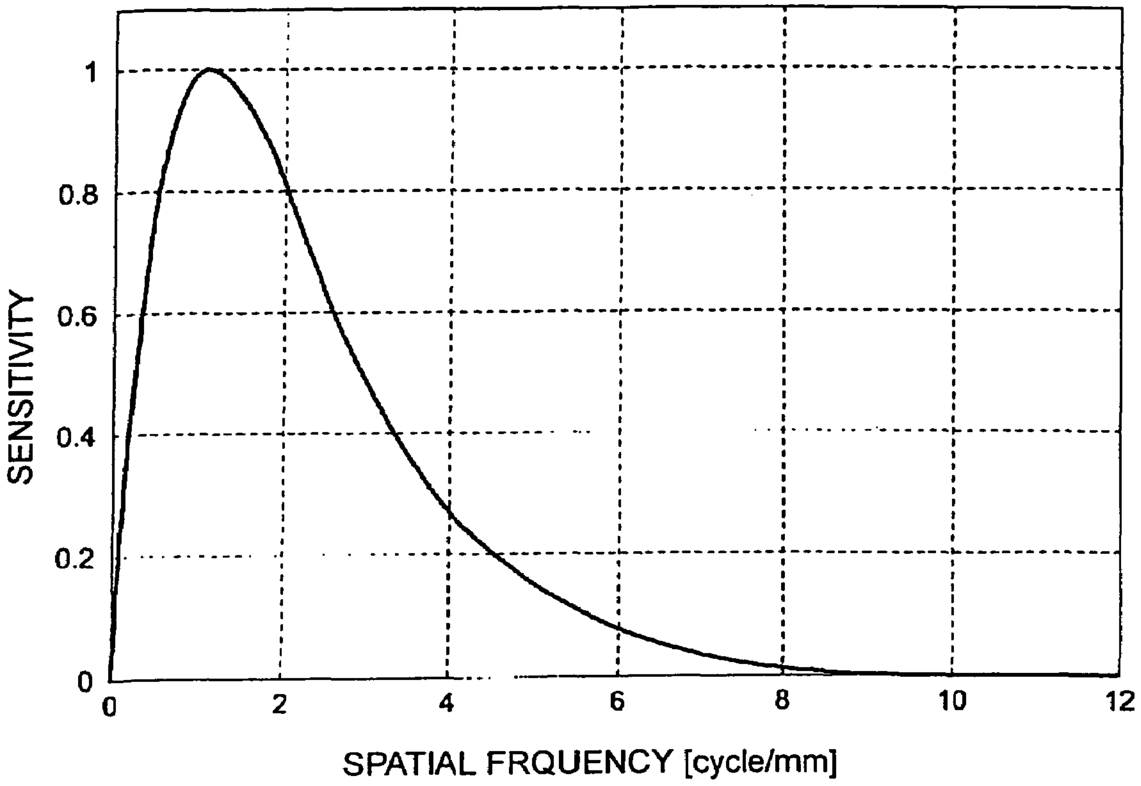
FIG. 5 shows a visual spatial frequency response for the density unevenness by average test subjects.

Namely, the image of a high degree of graininess (rough graininess) indicates an image having a high degree of roughness, and the image with a low degree of graininess (fine graininess) indicates a density-uniform image having less roughness. However, all the density unevenness does not always make a person feel roughness. If a human looks at a print image and does not feel roughness with respect to the print image, the quality of this image is considered sufficiently good. FIG. 5 shows a visual spatial frequency response concerning the density unevenness obtained by average test subjects. It is known that the spatial frequency felt by the human as density unevenness is limited to a spatial frequency having a range of 0 cycle/mm to approximately 10 cycle/mm based on approximately 1 cycle/mm as a peak as explained above.

1.3 Image Quality Measuring Apparatus

Figure 6:
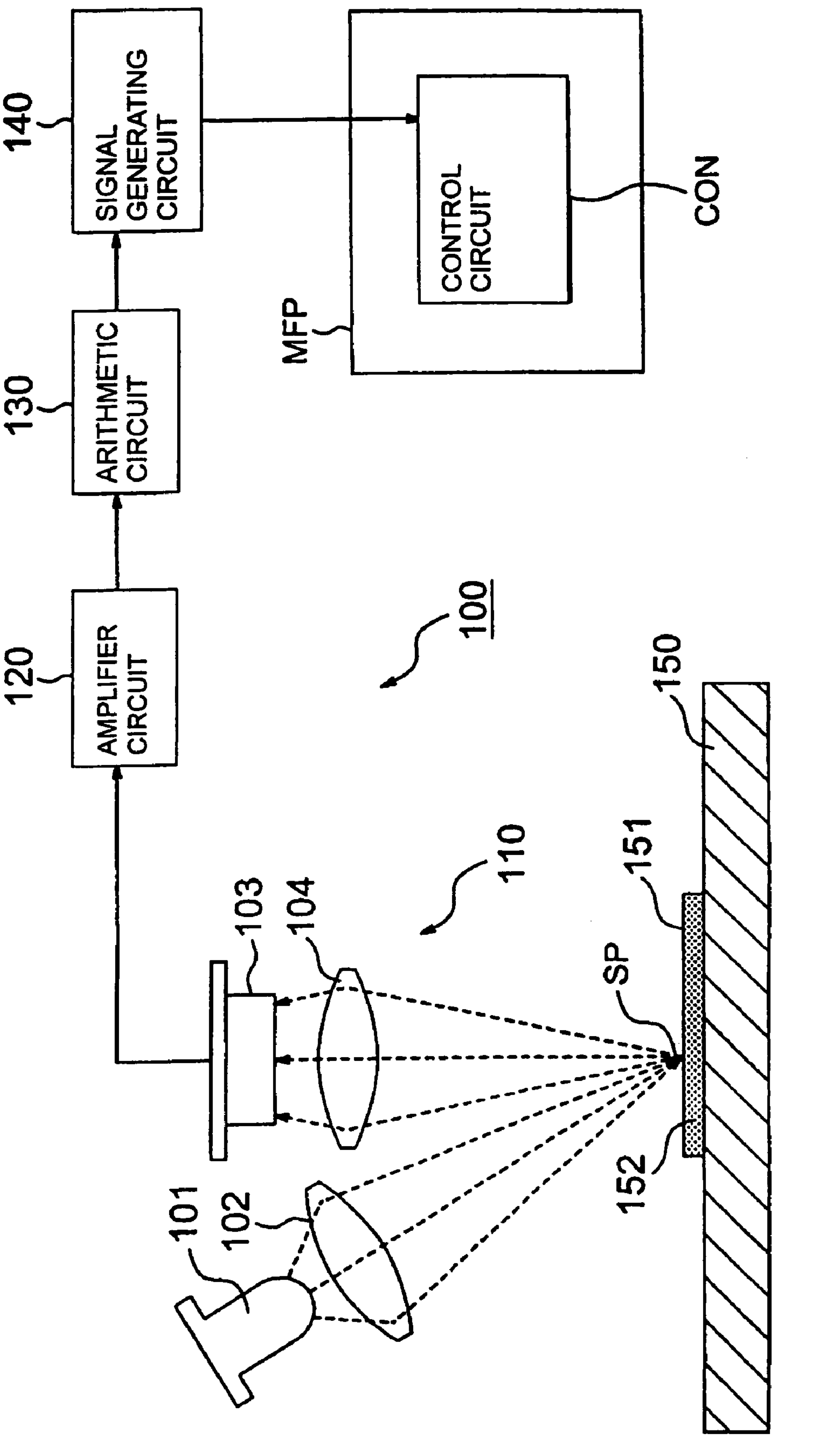
FIG. 6 shows a schematic configuration of the image quality measuring apparatus that measures fine density unevenness of the image and a control circuit of the image forming apparatus in the first embodiment.

FIG. 6 shows a schematic configuration of the image quality measuring apparatus that measures fine density unevenness of the image. An image quality measuring apparatus 100 includes a light reflection type sensor (a photo-reflector) 110, an amplifier circuit 120 that amplifies electrical signals from the light reflection type sensor 110, an arithmetic circuit 130 as an arithmetic unit that conducts arithmetic processing according to the signals amplified by the amplifier circuit 120, and a signal generating circuit 140 that generates signals to control optical writing based on an arithmetic output from the arithmetic circuit 130.

The light reflection type sensor 110 includes a light-emitting diode (LED) 101 as a light source, a collective lens 102 that collects light emitted from the LED 101 into a light beam having a designated beam diameter, and a photoelectric conversion element 103 that receives the light reflected from an image pattern 151 on an image carrier 150 and converts the reflected light into electrical signals. The light reflection type sensor 110 also includes an image forming lens 104 that forms an image with the light reflected from the image pattern 151, on an image forming face of the photoelectric conversion element 103. The light reflection type sensor 110 makes the spot light SP by stopping down an irradiation beam diameter, as is clear from the characteristic chart of the relationship between a distance (beam diameter) along the scan direction and a light quantity.

The light reflection type sensor 110 collects the beam irradiated from the LED as the light source by the collective lens 102, and makes a circular beam diameter approximately 400 μm on the plane of the image pattern 151 formed on the image carrier 150. The light reflected on the image pattern 151 is detected by the photoelectric conversion element 103 such as a photodiode, and adhesion unevenness of toner particles 152 in the image pattern 151 is captured as fluctuations in the quantity of light that comes into the photoelectric conversion element 103.

A method of capturing the fluctuation in light quantity according to the toner adhesion quantity includes those as follows. That is, a method of detecting the fluctuation by a difference in regular reflection characteristics or diffused reflection characteristics between the toner particles and the surface of the image carrier, a method of detecting the fluctuation by a difference in reflection spectral characteristics between the toner particles and surface of the image carrier, and a method of detecting the fluctuation with a higher sensitivity by combining the methods. Any of the above mentioned methods is adoptable.

In the case of utilizing the difference in the regular reflection characteristic or in the diffused reflection characteristic, it is preferable to adopt a material having a glossy and a higher regular reflection characteristic for the surface of the image carrier 150, because the toner image generally has a strong diffused reflection characteristic. Furthermore, in the case of detecting the fluctuation by the difference in the reflection spectral characteristics, it is preferable to use a light source wavelength having a large difference in the reflection spectral characteristics between the toner particle 152 and the image carrier 150.

In the first embodiment, the detection method which applies the difference of reflection characteristic is adopted. The image quality measuring apparatus, shown in FIG. 6, detects image quality based on the difference in the diffused reflection spectral characteristics between the toner particle 152 and the image carrier 150 using the LED 101 that has a light-emitting wavelength of 870 nm. In respect to the beam diameter, it is necessary to make the beam diameter (d1 in FIG. 7), concerning at least to a scanning direction of the spotlight SP, be 1 mm or less. Because by making the beam diameter 1 mm or less, it is possible to detect the density unevenness of approximately 1 cycle/mm which is most sensitive in the spatial frequency response of the human sense of sight. The beam diameter d1 is derived from 1 mm which is a reciprocal number of 1 cycle/mm where the spatial frequency in FIG. 5 becomes the maximum. In this embodiment, the beam diameter "d1" is set to approximately 400 μm. This patent application defines the beam diameter d1 as a distance between points on both sides of the light beam where the power of the spotlight SP on the beam irradiated surface per unit area declines to 1/e of the maximum power.

Figure 8:
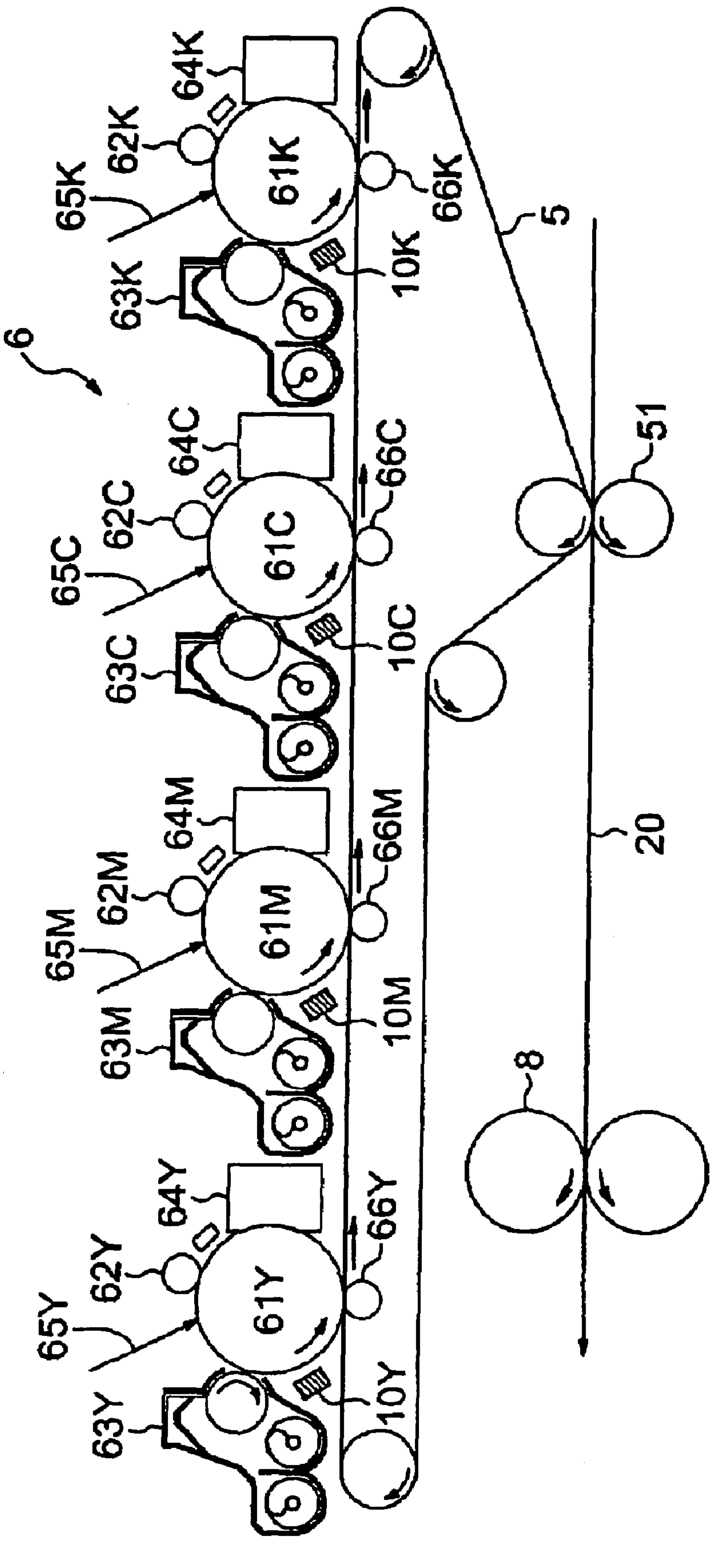
FIG. 8 shows an example of the image forming process by the image forming apparatus, in which a light reflection type sensor 110 shown in FIG. 6 is arranged opposite to a surface of the photoreceptor right after a developing process of the image forming unit shown in FIG. 1.

FIG. 8 is an example of an image forming process of the image forming apparatus equipped with the light reflection type sensor 110 shown in FIG. 6, and the sensor is disposed at a position opposite to a position on the surface of the photoreceptor at which the developing process is just finished. In this example, light reflection type sensors 10Y, 10M, 10C, and 10K are disposed and fixed to nearly each center of the rotational axes of the photoreceptors 61Y, 61M, 61C, and 61K, and the spotlight from each of the sensors radiates the photoreceptor 61. The images on the photoreceptors 61Y, 61M, 61C, and 61K are scanned by the spotlights SP through rotation of the photoreceptors 61Y, 61M, 61C, and 61K. The output of the reflected light is detected by scanning the images PT1 and PT2 as shown in FIGS. 3 and 4 in the paper carrying direction (in a longitudinal direction in FIGS. 3 and 4). In other words, in this example, the revolving photoreceptor 61 forms a scanning unit and the image carrier on which the image pattern is formed. The structure may be any type if the spotlight is able to scan the image formed on the image carrier, and therefore the structure in which the light reflection type sensor 10Y is moved instead of the photoreceptor 61 as the image carrier is permissible. That is, the structure may be any type on condition that the image pattern and the spotlight move relatively.

Figure 9:
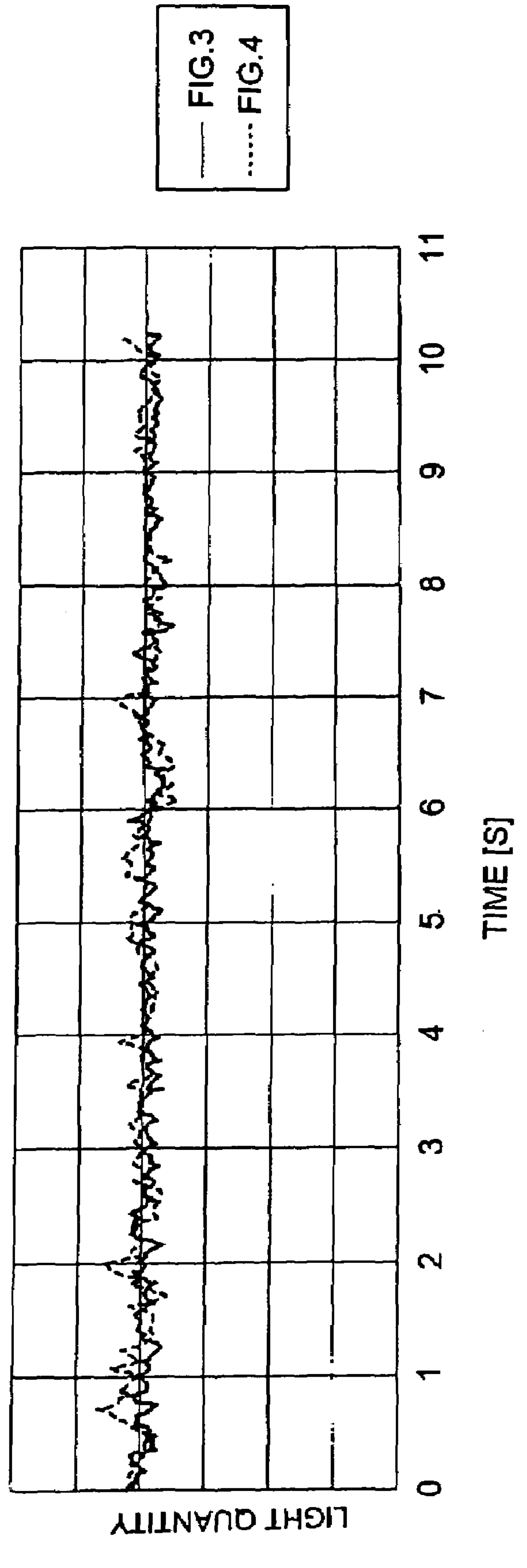
FIG. 9 shows fluctuations of quantity of light (voltage) coming from an amplification circuit of a reflected light shown in FIG. 6.

FIG. 9 shows fluctuations in the light quantity (voltage) of the reflected light coming in from the amplifier circuit 120. Scanning conditions of the spotlight SP here are as follows, a scanning speed: 200 mm/s, a scanning distance: about 11 mm, and data sampling cycle: 75 μs. That is, a sampling interval on the image is about 15 μm pitch, and only one scanning not including an averaging step or the like is conducted. By determining an average light quantity shown in FIG. 9, it is also possible to calculate the average adhesion quantity of the toner particles 152 which adhere as the pattern.

1.4 Control 1.4.1 Calculation of Noise Quantity

Figure 10:
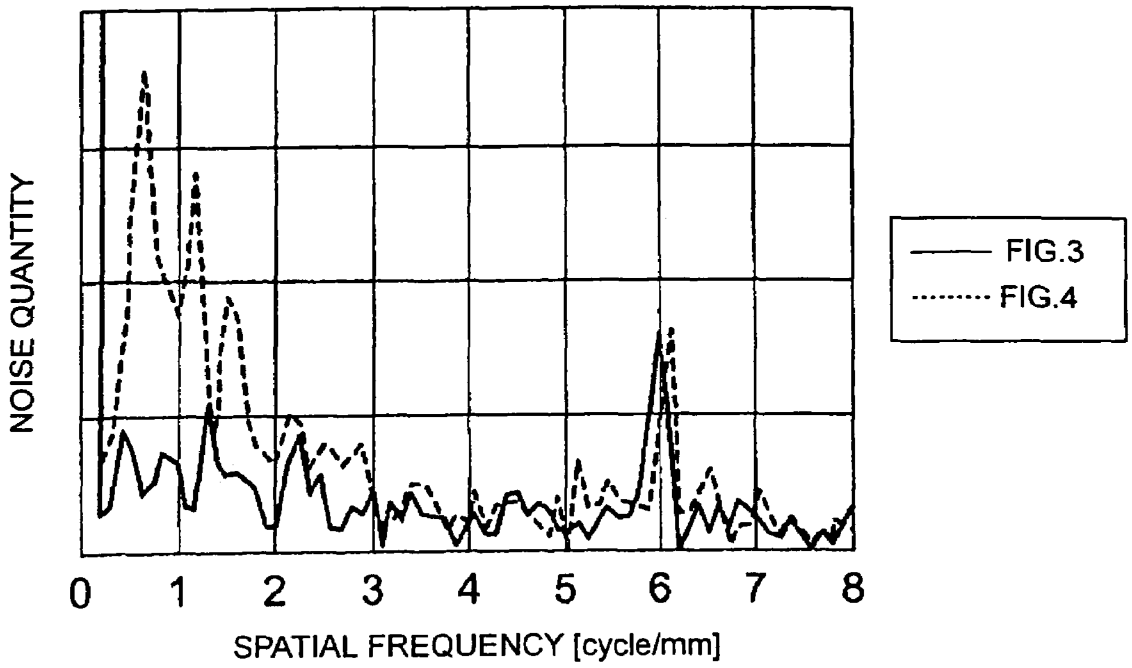
FIG. 10 shows the spatial frequency response determined through a calculation by the Fast Fourier Transform (FFT) based on measuring results shown in FIG. 9.

In the state of output where the light quantity is output by using time shown in FIG. 9 as a parameter, it is impossible to read the spatial frequency response of the density unevenness, and therefore the arithmetic circuit 130 calculates the spatial frequency of the output. In the calculation of the spatial frequency response, it is preferable to apply such a known method as the Fast Fourier Transform (FFT) from a view point of processing speed. FIG. 10 shows a transformation result by the Fast Fourier Transform. The peaks seen at 6 cycle/mm in FIG. 10 are due to repetition frequencies of dot patterns in FIG. 3 and FIG. 4.

As is clear from FIG. 5, the visual characteristic is very sensitive to the density unevenness having a spatial frequency around 1 cycle/mm, therefore, it is possible to know an image quality deterioration level (an increase of the graininess) of the pattern (the image PT2) shown in FIG. 4 with respect to the pattern (the image PT1) shown in FIG. 3, by comparing noise quantities of the patterns in the spatial frequency around 1 cycle/mm.

Furthermore, as will be explained later, it is possible to obtain the visual noise quantity based on the spatial frequency shown in FIG. 11 as the parameter if the arithmetic circuit 130 assigns weights of the visual spatial frequency response shown in FIG. 5, to the spatial frequency response shown in FIG. 10. By this arithmetic, it is possible to extract only the spatial frequency response that appeals to human eyesight, thus it is possible to detect an intended image quality easily. Furthermore, in this embodiment it is possible to eliminate the signals appearing on around 6 cycle/mm due to the structures of the image patterns. Therefore, it is possible to eliminate information that is not related to the image quality being focused on, thus image detection error becomes hard to occur. Furthermore, as will be explained later, it is also possible to calculate a total amount of visual noise as shown in FIG. 12, if the arithmetic circuit 130 integrates a derived visual noise quantity (refer to FIG. 11 ) in a spatial frequency range from 0.2 cycle/mm to 4 cycle/mm. From this value it is possible to know a comprehensive image quality change in almost all spatial frequency range that appeals to human eyesight.

As explained above, if deterioration of the image quality is detected based on the derived noise quantity, the visual noise quantity, and the total visual noise quantity, and if the detected image quality is lower than a predetermined image quality level, the signal generating circuit 40, in the measuring apparatus shown in FIG. 6, generates signals to prompt to control an appropriate image forming condition. Upon receiving the signals, a control circuit CON of the image forming apparatus MFP shown in FIG. 6 automatically controls the image forming conditions so that the image quality is increased higher than the above mentioned level, and conducts an automatic control so that the image quality is restored to image quality as normal as possible. As changes of the image forming conditions, there are following points to be changed with regard to, for example, the developing conditions.

(1) To increase a toner density in the developer.

(2) To increase a rotational speed of the developing roller.

(3) To reduce a gap between the developing roller and the photoreceptor.

(4) To widen a gap between a doctor blade which controls quantity of the developer on the developing roller, and the developing roller.

(5) To increase the amplitude of voltage and frequency of vibration of an alternating bias component applied on the developing roller (when the alternating bias is superposed).

(6) To reduce a difference between a potential of the developing roller and a potential of the image forming unit of the photoreceptor by reducing an absolute value of DC bias component applied on the developing roller.

(7) To automatically exchange the developers.

(8) To polish the surface of the photoreceptor.

(9) To consume the deteriorated toner and replenish the new toner.

By performing the control over the points either independently or aptly combining some of the points together, it is possible to restore the image quality to image quality as normal as possible.

Furthermore, there are following points to be changed with regard to transfer conditions.

(1) To optimize a transfer bias.

(2) To optimize a difference in speed between the image carriers disposed opposite to each other in the transfer process.

Controlling the transfer conditions may sometimes restore the image quality.

Incidentally, it is possible to improve the image density unevenness when the conditions from (1) to (5) regarding the developing conditions are changed. However, changing at least one of the (1) to (5) conditions so as to restore the image unevenness results in an increase in the average image density. Therefore, if the average image density has increased as a result of the change, image forming conditions can be changed also by controlling such a developing potential as follows. The conditions allow the average image density to be decreased without increasing the image density unevenness.

a) To decrease an absolute value of the average developing bias.

b) To increase an absolute value of potential of the image on the photoreceptor.

That is, the control is provided to improve image density unevenness in consideration of the average image density. As explained above, it is possible to restore the image density unevenness while fixing the average image density unchanged, by controlling not only the image forming conditions that affect the image density unevenness but also controlling the image forming conditions that affect the image density. Further, it is possible to suppress unnecessary increase in the average image density by conducting changes to restore the image density unevenness when the average image density is a preset value or less (including a value after the control is performed over the developing potential so as to be reduced to the preset value or less).

The above mentioned explanation is an example that simply adds the image density unevenness control to the conventional controlling method that controls to maintain the average image density at a certain level. In the example, a control routine of the average image density and a control routine of the image density unevenness are independent from each other.

The conditions (3): to reduce the developing gap, (4): to widen the doctor gap, and (8): to polish the surfaces of the photoreceptors are respectively adjusted mechanically. In the case of (3), a unit to move the developing roller is provided to adjust the developing gap. In the case of (4), a unit to move the doctor blade relatively to the developing roller is provided to adjust the doctor gap. In the case of (8), a member for polishing the surface of the photoreceptor may be discretely provided to polish the surface of the photoreceptor by bring the member into contact with the surface of the photoreceptor if necessary. Alternatively, the photoreceptor may be detached from the image forming apparatus to be polished. A unit to realize (7): to automatically exchange the developers in order to restore the image density unevenness will be explained later.

If it is determined that restoring of the image quality is impossible only by implementing the automatic control, for example, if it is found no improvement of deterioration in the image quality after conducting the control, the control circuit CON instructs a display unit to exchange such parts as the developer or the photoreceptor, or transmits the instruction data to any other communication device over a communication line so that the user is prompted to exchange the parts. It is possible to extend lives of the developer or the photoreceptor to the longest through the processes. Further, it is possible to suppress the toner quantity consumed through formation of pattern images to a minimum level because a required minimum size of a pattern is about 1 mm×about 10 mm.

In the example shown in FIG. 8, the surfaces of the photoreceptors 61Y, 61M, 61C, and 61K are irradiated with the spotlight SP so as to detect the image quality on the surfaces thereof. However, it is needless to say that the spotlight SP may be radiated to the image formed on the intermediate transfer belt 5, the recording paper 20, or some other recording medium. Further, when the spotlight SP is radiated on the photoreceptor 61Y, 61M, 61C, and 61K, it is preferable that a wavelength of the spotlight SP and a spectral sensitivity wavelength range of the photoreceptor 61Y, 61 M, 61C, and 61 K differ to prevent the deterioration of the image quality caused by a destruction of the electrostatic latent image due to the spotlight SP itself.

1.4.2 Calculation of Visual Noise Quantity

The arithmetic circuit 130, as explained above, obtains the spatial frequency response as shown in FIG. 10 by FFT, and calculates the visual noise quantity by weighting the spatial frequency response with the visual spatial frequency shown in FIG. 5. FIG. 11 shows a relationship between a quantity of visual noise and the spatial frequency, and shows the output of the visual noise quantity of the arithmetic circuit 130 which conducts the calculation. The weighting by the arithmetic circuit 130 is conducted by multiplying the characteristic shown in FIG. 10 by the characteristic shown in FIG. 5. By this calculation, detection of target image quality is easily accomplished, because the spatial frequency response that appeal to eyesight can be exclusively extracted. Furthermore, in this embodiment, it is possible to eliminate signals appearing around 6 cycle/mm due to the image pattern structure. Therefore, it is also possible to eliminate information that is not related to the information being focused on, thus detection error can be prevented almost completely.

1.4.3 Total Amount of Visual Noise

Figure 11:
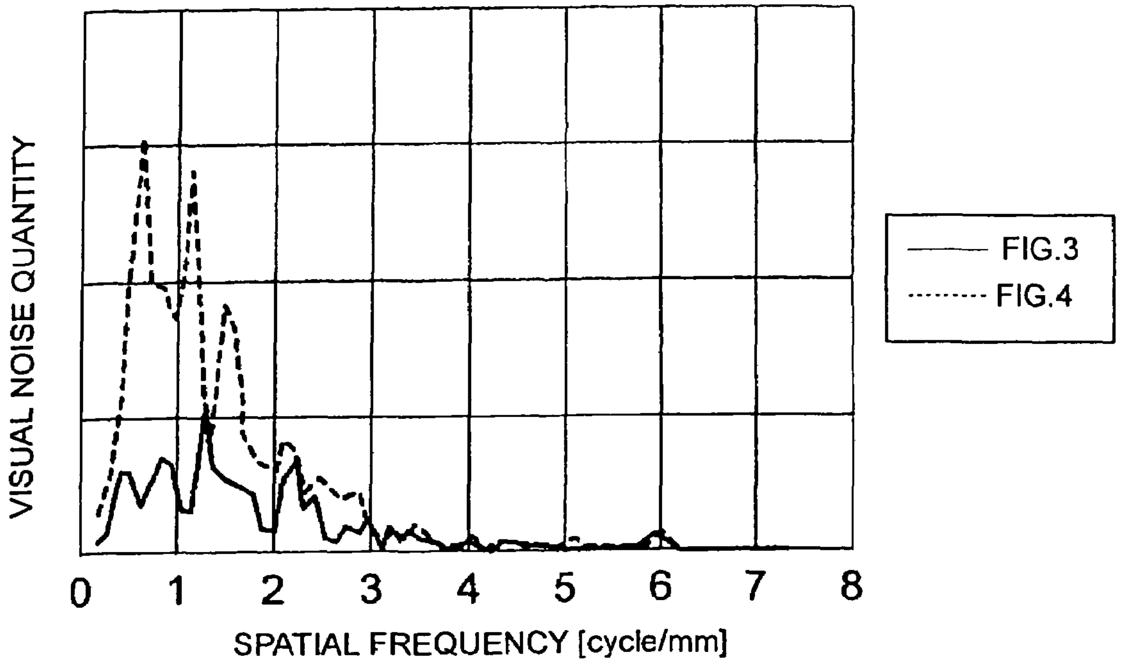
FIG. 11 shows a relationship between a quantity of visual noise and the spatial frequency.
Figure 12:
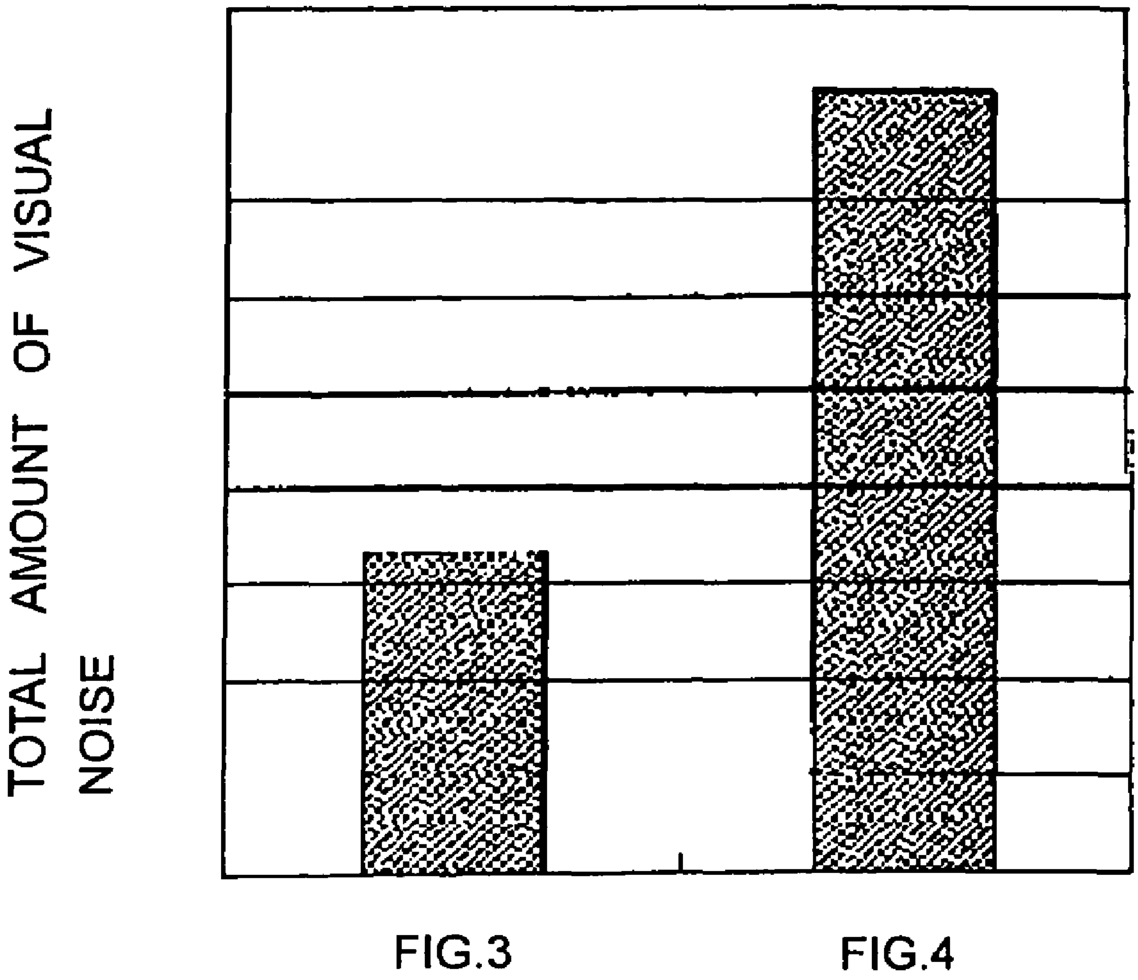
FIG. 12 shows a total amount of the computed visual noise.

The arithmetic circuit 130 calculates the total amount of visual noise as shown in FIG. 12 by integrating the visual noise quantity shown in FIG. 11 over the range of the spatial frequency intervals as 0.2 cycle/mm to 4 cycle/mm. From this calculated value, it is possible to obtain a comprehensive change in image quality in almost all spatial frequency range that appeals to human eyesight.

1.4.4 Processing Procedure

Figure 13:
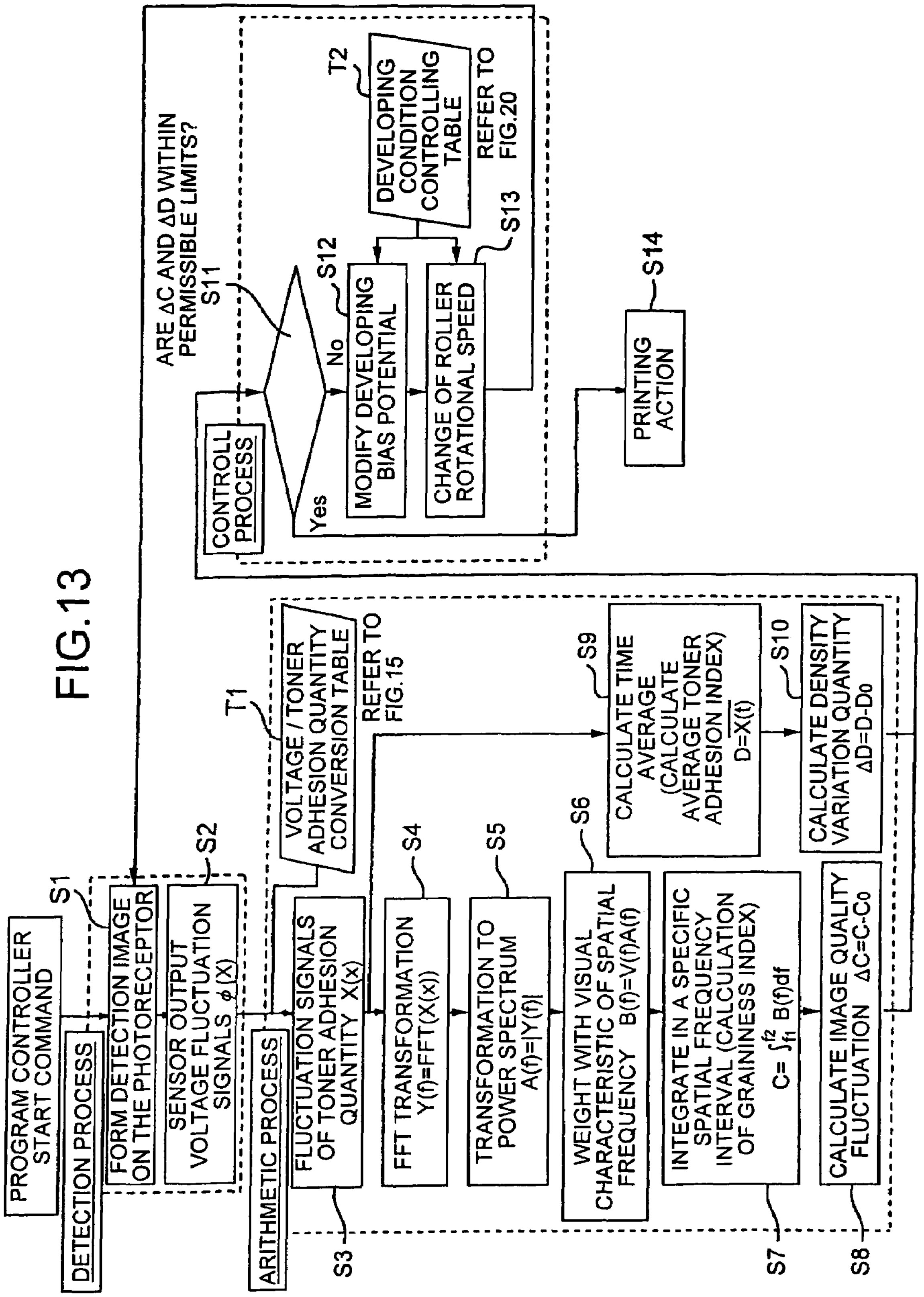
FIG. 13 is a flowchart of a controlling process of automatically controlling the image forming conditions based on the image quality information that is detected by the image quality measuring apparatus.

FIG. 13 is a flowchart of a procedure of processing in the image forming apparatus MFP that is equipped with the image quality measuring apparatus 100 (refer to FIG. 8) capable of detecting the quality of the image formed on the photoreceptor 61 of each color. The procedure starts from detection of the image quality information by the image quality measuring apparatus 100 until the apparatus conducts an automatic control of the image forming conditions based on the detected image quality information. For simplification of explanation, one of the four photoreceptors will be taken up as an example. The arithmetic circuit 130 and the signal generating circuit 140 of the image quality measuring apparatus 100, and a CPU of the control circuit CON of the image forming apparatus MFP share roles to perform this control. However, the same functions as the arithmetic circuit 130 and the signal generating circuit 140 may be given to the control circuit CON to allow the CPU of the control circuit CON to perform the control. The CPU performs the following processing based on a program stored in a ROM (not shown) using a RAM (not shown) as a work area.

First of all, a signal indicating program controller start command is generated at a predetermined timing. This timing is optionally set, for example, at power on of the image forming apparatus MFP or based on printed counter information. Upon receiving the signal, the control circuit CON controls various units of the apparatus (step S1) so as to form an image pattern (a special half-tone image) 151 on the photoreceptor 61.

Figure 14:
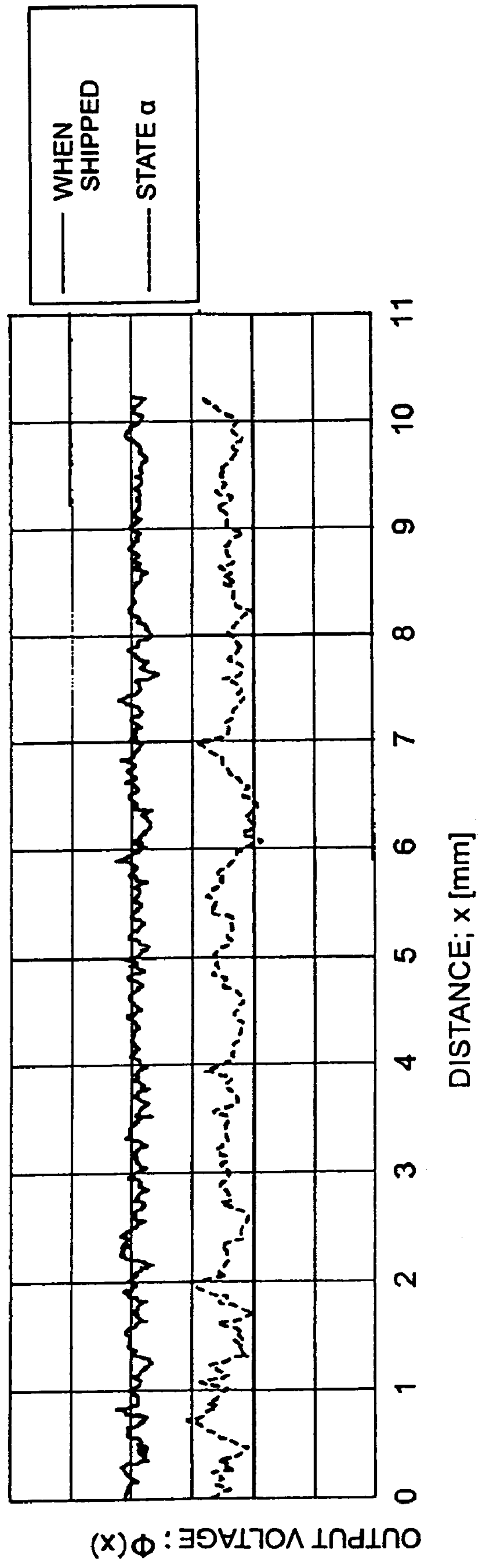
FIG. 14 shows an output voltage detected by irradiating the image patterns with luminous flux emitted from an LED and leading a reflected light into a photoelectric conversion element.

After the processing, the control circuit CON controls that the luminous flux emitted from the LED 101 is radiated to the image pattern 151, thus the light reflected from the image pattern 151 is led to the photoelectric conversion element 103 where the reflected light is detected, then a fluctuation in the light quantity received by the photoelectric conversion element 103 is converted into voltage, amplified, and output to the arithmetic circuit 130 (step 2). An example of the output voltage at this step is shown in FIG. 14. FIG. 14 shows a comparison between the outputs of just after the shipment of the image forming apparatus MFP (when shipped) and the outputs in a state that the developer and the like are deteriorated as a result of use of the image forming apparatus MFP for a long period of time (state $\alpha$).

Figure 15:
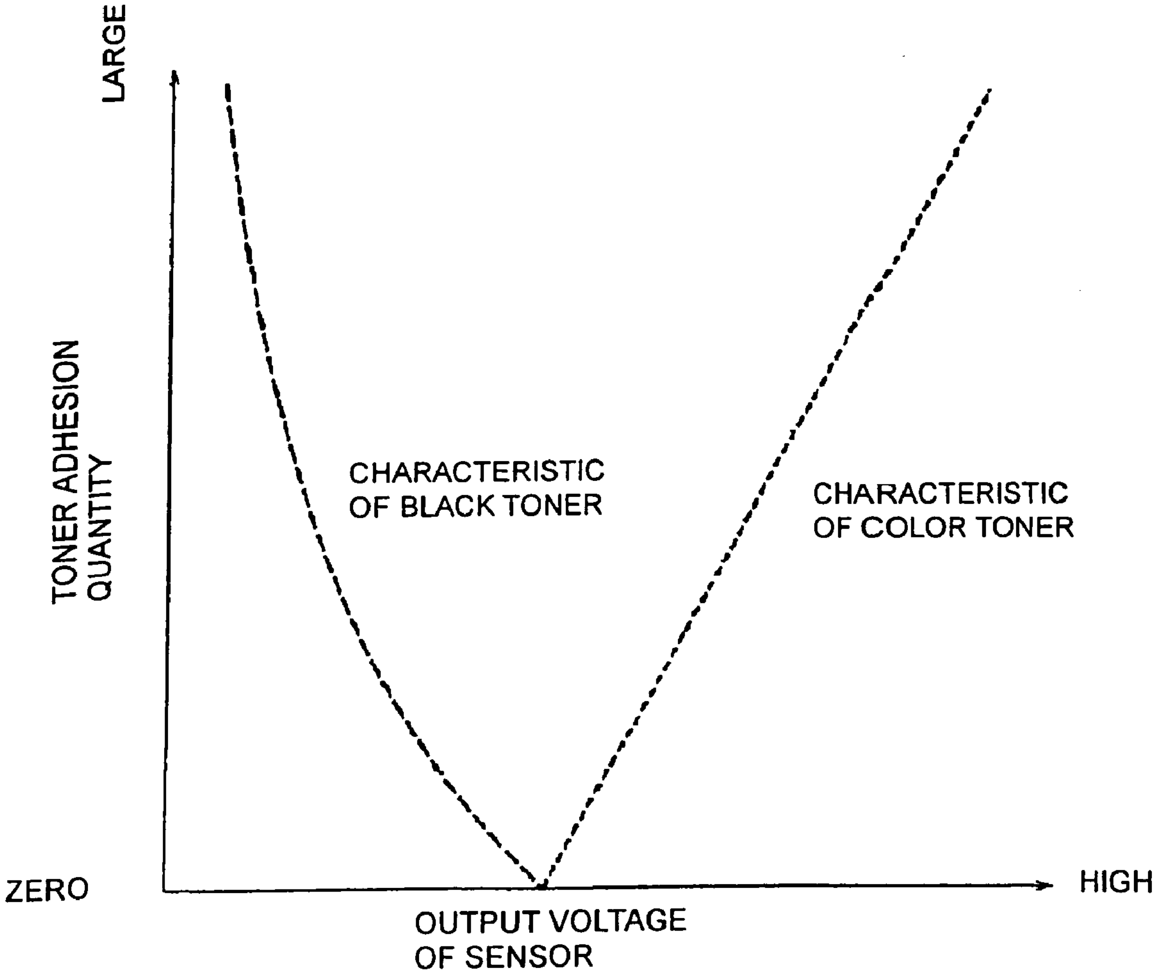
FIG. 15 shows a relationship between the output voltage of the sensor and an actual toner adhesion quantity.
Figure 16:
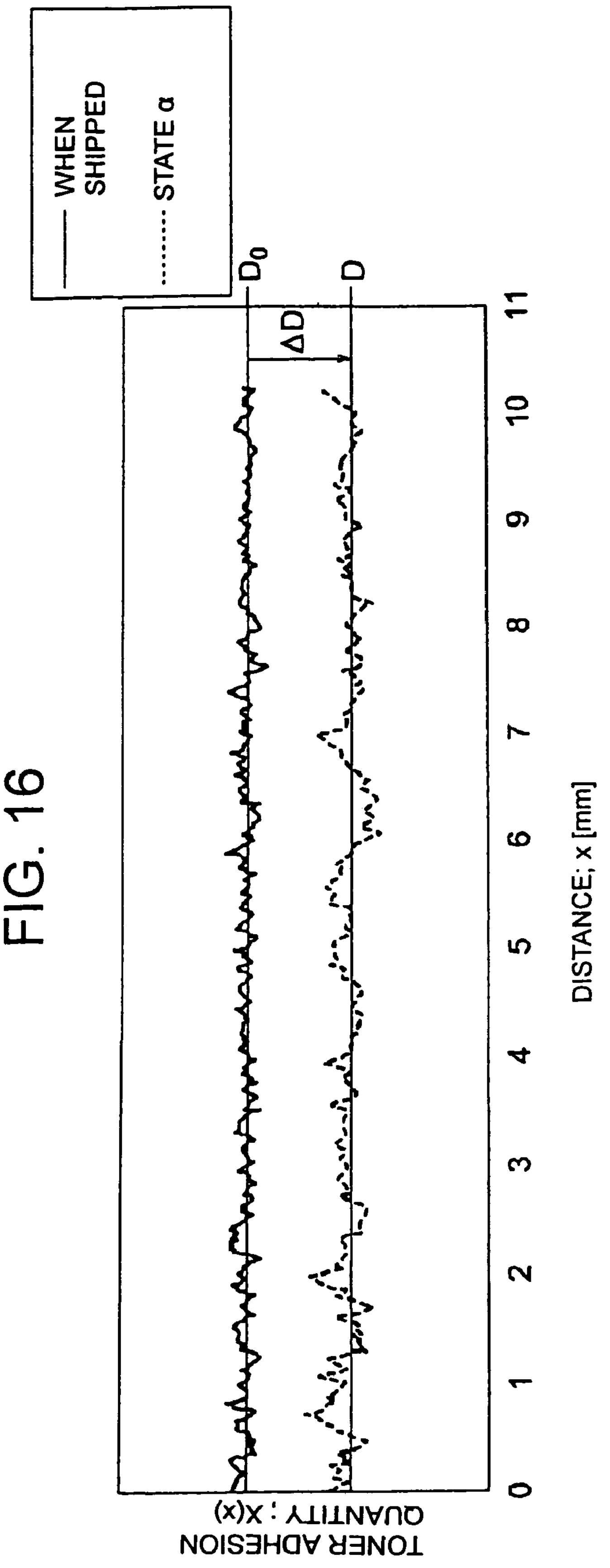
FIG. 16 shows an output state of signals indicating fluctuation in toner adhesion quantity obtained by converting voltage fluctuation into fluctuation in the toner adhesion quantity.
Figure 17:
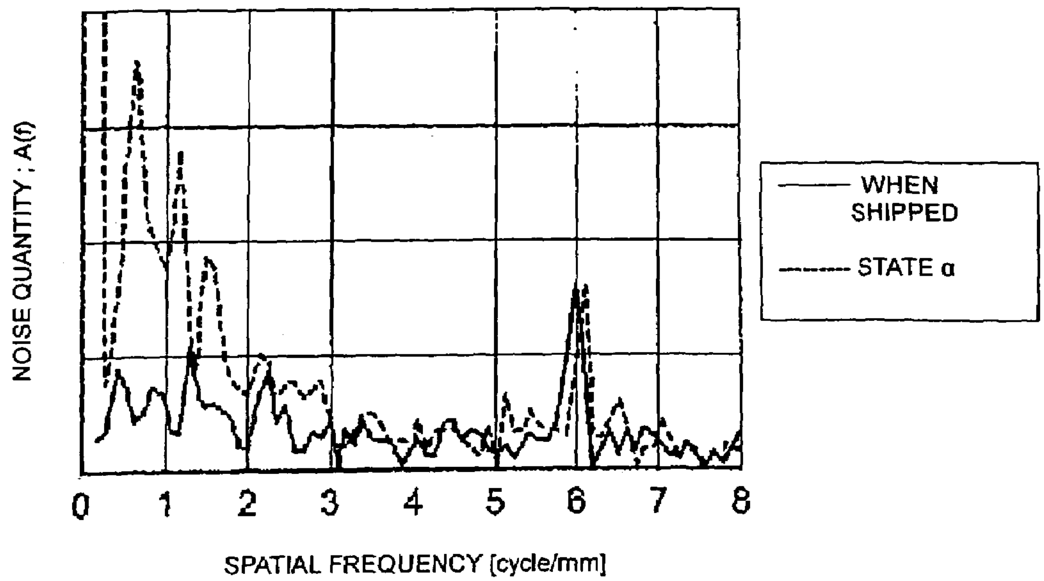
FIG. 17 shows power spectrums obtained by subjecting the signals indicating fluctuation in the toner adhesion quantity to the Fast Fourier Transform (FFT), and computing absolute values of conversion signals that are obtained from the FFT.

Meanwhile, there is a relationship (conversion table T1) between the output voltage of the photoelectric conversion element 103 (output voltage of the sensor) and the actual toner adhesion quantity as shown in FIG. 15. Therefore, the arithmetic circuit 130 obtains fluctuation signals of the toner adhesion quantity (FIG. 16) by converting voltage fluctuation into fluctuation in the toner adhesion quantity by referring to the conversion table T1 (step 3). In other words, the arithmetic circuit 130 obtains signals that indicate the toner adhesion quantity as information that corresponds to the average image density. Assume that the average toner adhesion quantities when the apparatus is shipped and at the state of $\alpha$ are D0 and D respectively. The difference $\Delta$D between the two is the fluctuation in the average toner adhesion quantity, and the fluctuation value $\Delta$D is calculated from the obtained average toner adhesion quantity D and the preset value DO before the shipment (steps S9 and S10).

Figure 18:
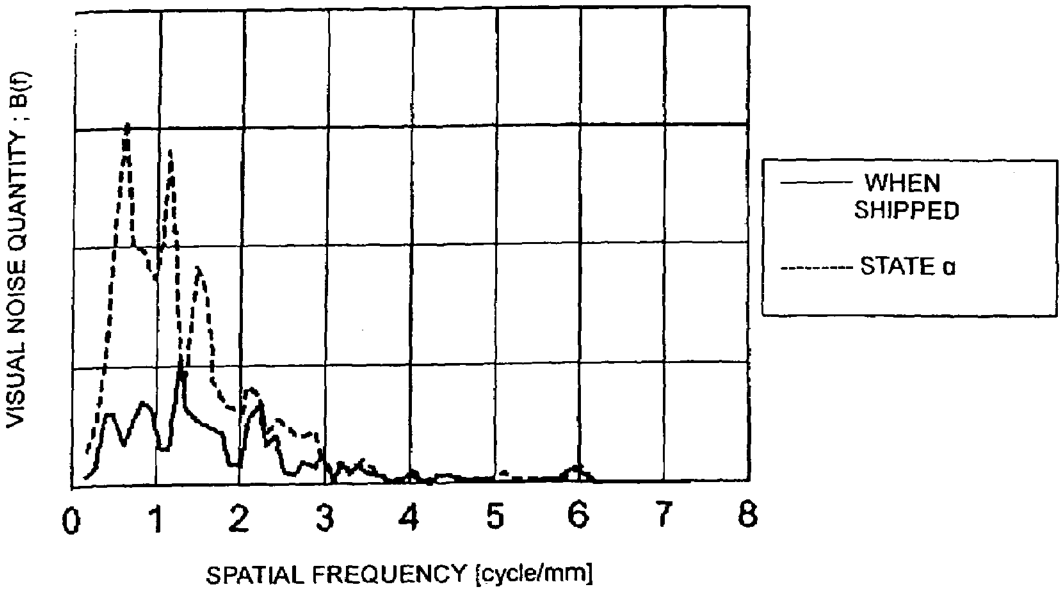
FIG. 18 shows visual noise quantity obtained by weighting the power spectrums shown in FIG. 17 with the visual characteristic of the spatial frequency shown in FIG. 5.
Figure 19:
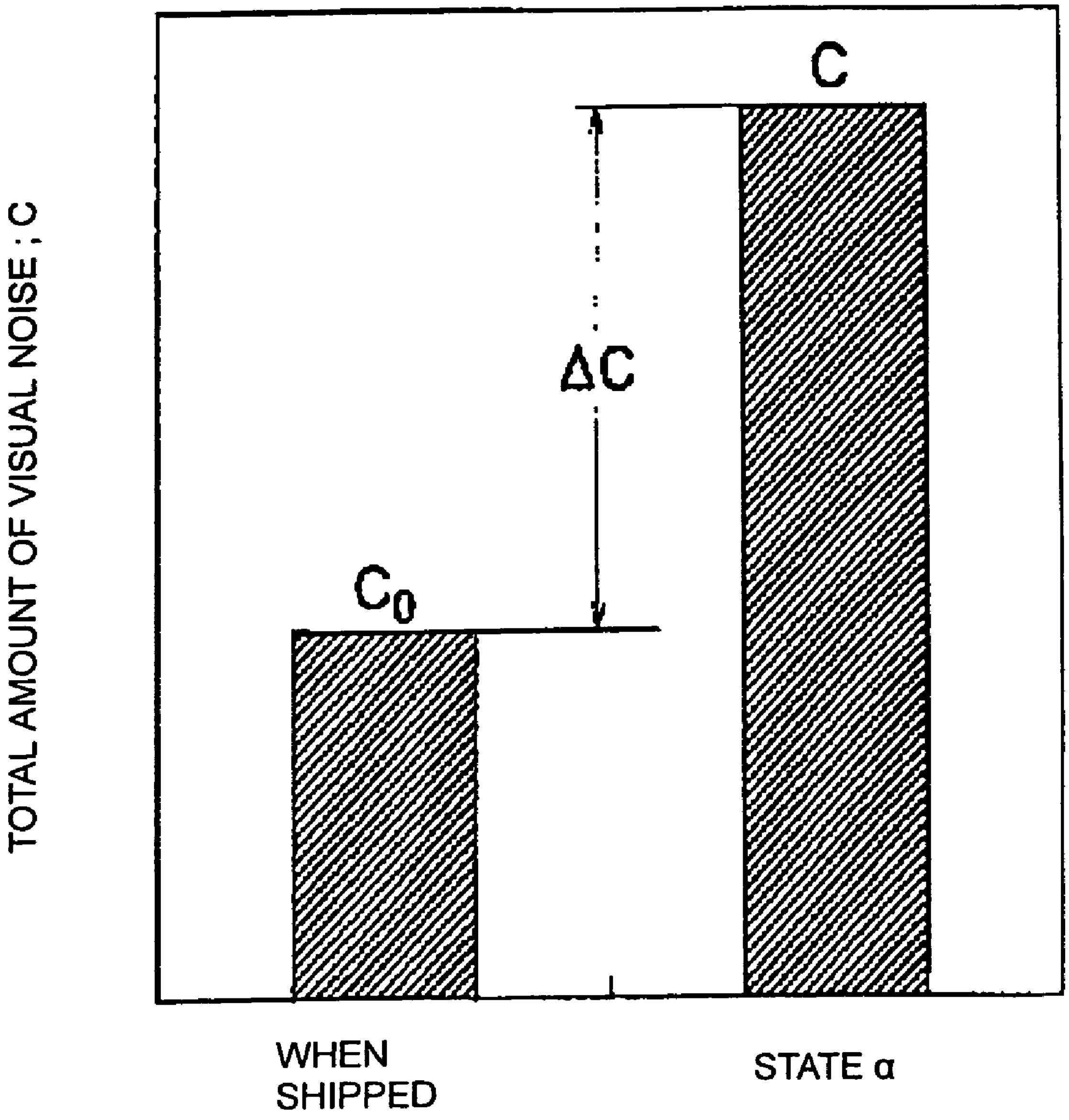
FIG. 19 shows a graininess index obtained through integrating the visual noise quantity obtained in FIG. 18 in a specific spatial frequency interval.

The quantity fluctuation signals X (x) of the toner adhesion is subjected to Fast Fourier Transform (FFT) (step S4), and a power spectrum A (f) is obtained by calculating the absolute value of conversion signals Y (f) (a complex number) that are obtained as a result of the processing at step S4 (step S5). The power spectrum is weighted with the visual characteristic of the spatial frequency (FIG. 5) (step S6 in FIG. 18), and the power spectrum is integrated in a special spatial frequency interval (e.g., in an interval from 0.1 cycle/mm to 5.0 cycle/mm) (step S7 in FIG. 19) to obtain a graininess index C. That is to say, the control circuit CON obtains the graininess index that indicates the image density unevenness. Then, the control circuit CON calculates a difference $\Delta$C between a preset graininess index CO when the apparatus is shipped and a graininess index C at the state of $\alpha$ (step S8). The difference $\Delta$C indicates the fluctuation value of the graininess. If the values $\Delta$D and $\Delta$C gained so far are within specifications of a machine, the signal generating circuit 140 outputs signals to that effect into the control circuit CON, and the control circuit CON controls various units of the apparatus so that the units conduct printing action without performing any special controls (step S11, step S14). However, if the signal generating circuit 140 supplies signals to the effect that ΔD and ΔC are out of the specifications of the machine or signals including ΔD or ΔC, the control circuit CON changes settings of the image forming conditions, for example, change of the developing conditions.

Next, setting control of the image forming conditions conducted by the control circuit CON in the case that the ΔD or ΔC is out of the specifications will be explained referring to the procedures of controlling the developing conditions.

Figure 20:
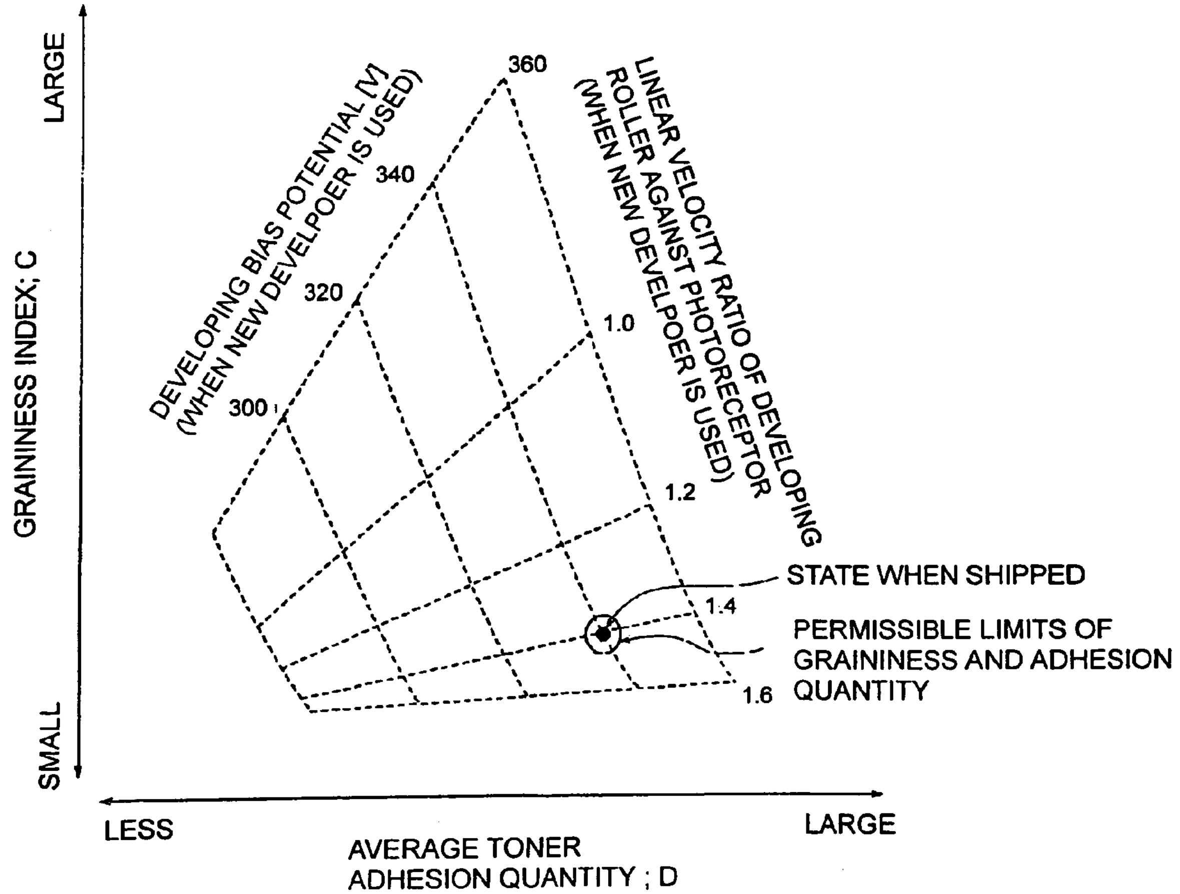
FIG. 20 shows, concerning the image pattern as a target of detection, how the graininess index C and the average toner adhesion quantity D change in a state when the apparatus is shipped, when developing bias electrical potential and revolution speed of the developing roller are changed.

FIG. 20 refers to an image pattern that is an object of the detection, and specifically shows how the graininess index C and the average toner adhesion quantity D change when the developing bias potential and the rotational speed of the developing roller are changed on condition that the state of the apparatus when shipped is kept as it is. It is understood from FIG. 20 that the average toner adhesion quantity increases in accordance with an increase in the developing bias and at the same time the graininess of the toner increases. It is also understood that the average toner adhesion quantity increases in accordance with an increase in linear velocity of the developing roller but the graininess of the toner decreases. Namely, the above-mentioned facts indicate that it is possible to optionally and independently control the average toner adhesion quantity and the graininess, by properly controlling the developing bias and the rotational speed of the developing roller.

Figure 21:
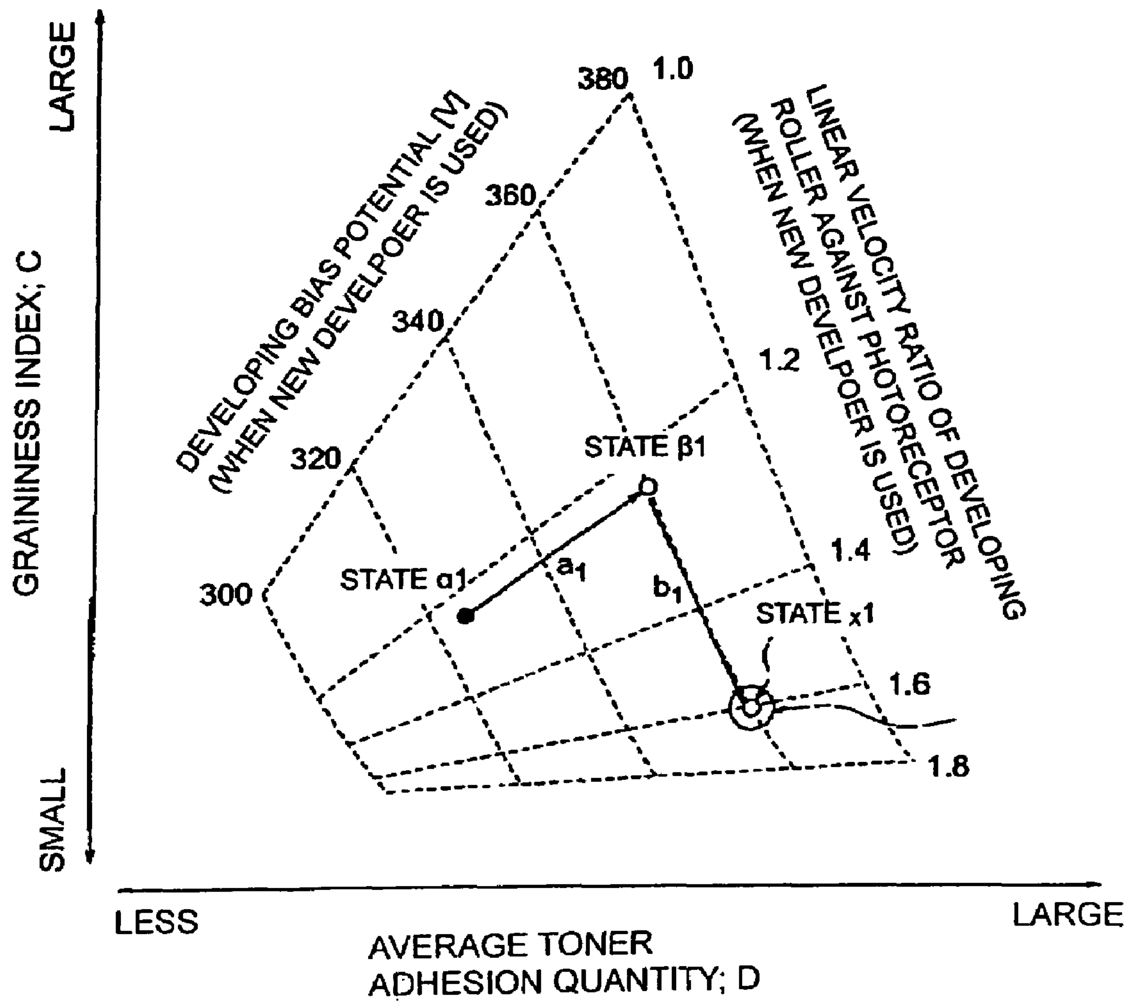
FIG. 21 shows a method of restoring the graininess and the toner adhesion quantity to the state when the apparatus is shipped as shown in FIG. 20, when changed with time from the state shown in FIG. 20.

It is assumed that the developing bias is set to 325V and the linear velocity ratio of the developing roller is set to 1.25 when the image forming apparatus MFP of this embodiment is shipped. Further, assuming that the developing bias and the linear velocity ratio of the developing roller remain the same as 325V and 1.25, respectively, the graininess index and the average toner adhesion quantity are changed to be "state α1" as shown in FIG. 21, as a result of deterioration in the developer due to long continuous use of the image forming apparatus MFP. In such a case, the control circuit CON refers to a developing condition control table T2 shown in FIG. 20 and controls various units of the apparatus to increase the developing bias because the average toner adhesion quantity has decreased (process a1) and move the state to "state β1" (step S12). In the case as shown in FIG. 21, the graininess of the toner and the average toner adhesion quantity can be restored to the state when the apparatus is shipped by changing the developing bias from 325V to 360V and the linear velocity ratio of the developing roller from 1.25 to 1.6 (process b1 at step S13).

Figure 22:
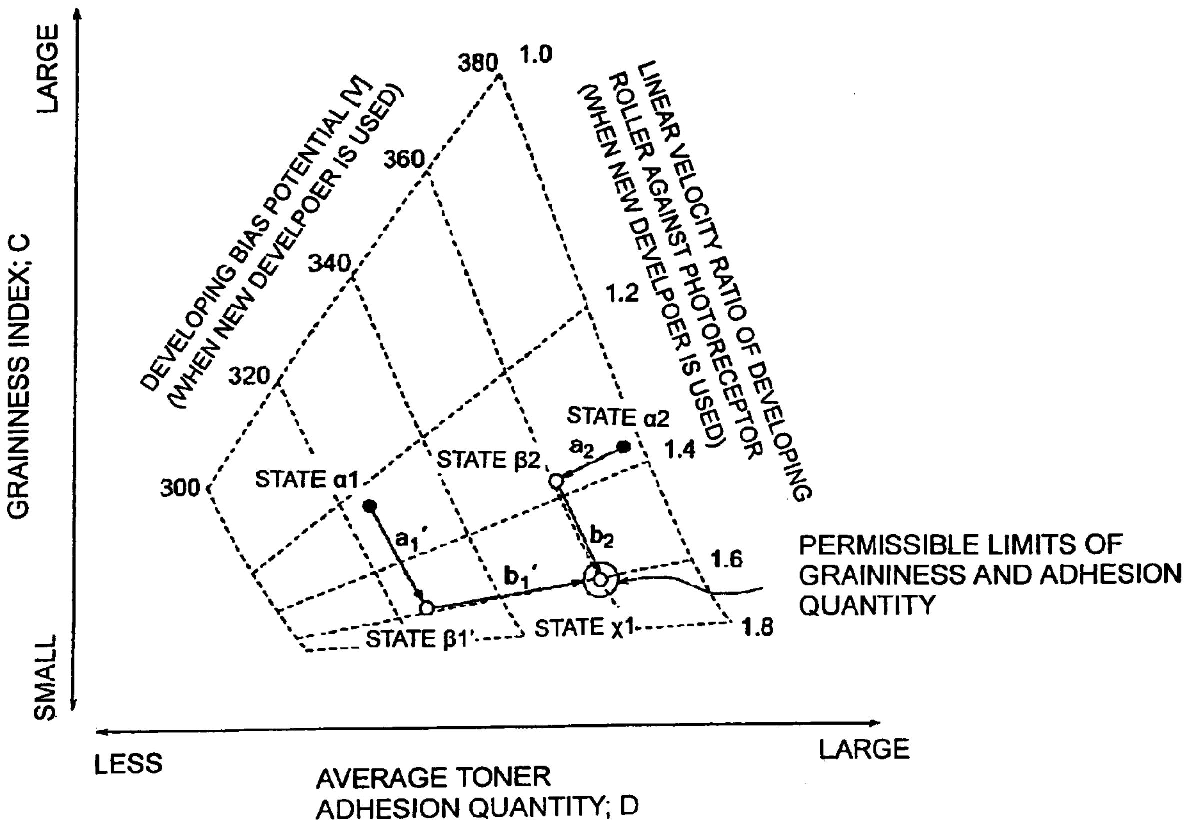
FIG. 22 shows another method of restoring the graininess and the toner adhesion quantity to the state when the apparatus is shipped as shown in FIG. 20, when changed with time from the state shown in FIG. 20.

As explained above, the graininess of the toner and the average toner adhesion quantity can be restored to the state when the apparatus is shipped by properly controlling both the developing bias and the linear velocity ratio of the developing roller by referring to the developing condition control table T2 shown in FIG. 20. Furthermore, it is needless to say that the procedure of restoring the image quality from the "state α1" may be performed by way of process a1' (a process to increase the linear velocity ratio of the developing roller) and process b1' (a process to increase the developing bias) as shown in FIG. 22. Further, restoration of the image quality from the "state α2" shown in FIG. 22 can be realized by way of, for example, process a2 (a process to decrease the developing bias) and process b2 (a process to increase the linear velocity ratio of the developing roller).

Figure 23:
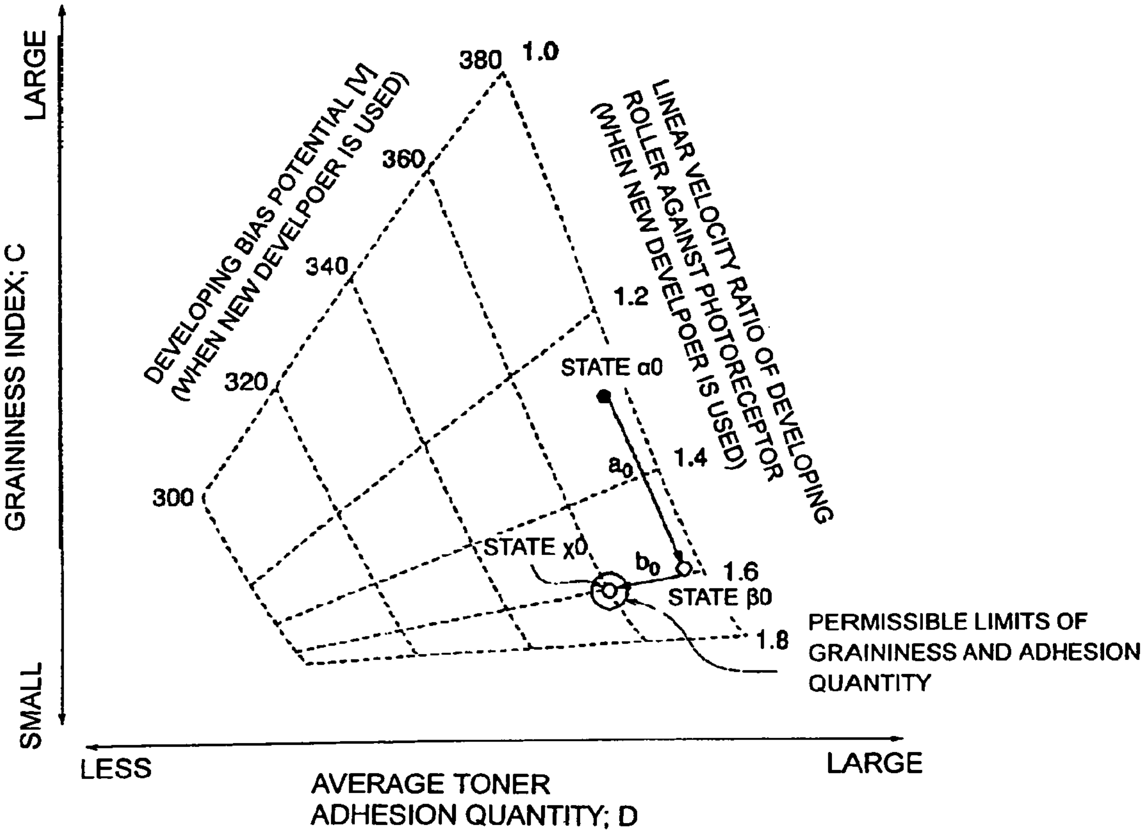
FIG. 23 shows a method of controlling the image density unevenness by a combination of an increase of linear velocity of the developing roller and a decrease of the developing bias in a simple additional manner in contrast with a conventional controlling method that maintains the image density constant.

FIG. 23 shows a method of controlling image density unevenness by a combination of an increase in the linear velocity of the developing roller and a decrease in the developing bias in a simple additional manner in contrast with a conventional controlling method of maintaining the image density at a constant level. In this control, it is possible to restore the image from "state α0" indicating the state of the image shown in FIG. 4 to "state x0" indicating the state of the image shown in FIG. 3.

1.4.5 Automatic Exchange of the Developer

1.4.5.1 Mechanism

As explained above, exchanging of the developer is effective to restore to the image density unevenness (refer to the above mentioned (7)). Now, a unit to exchange the developer will be explained as follows, if it is determined based on the detection of the image quality that there exists the image density unevenness and the image quality is deteriorated.

Figure 24:
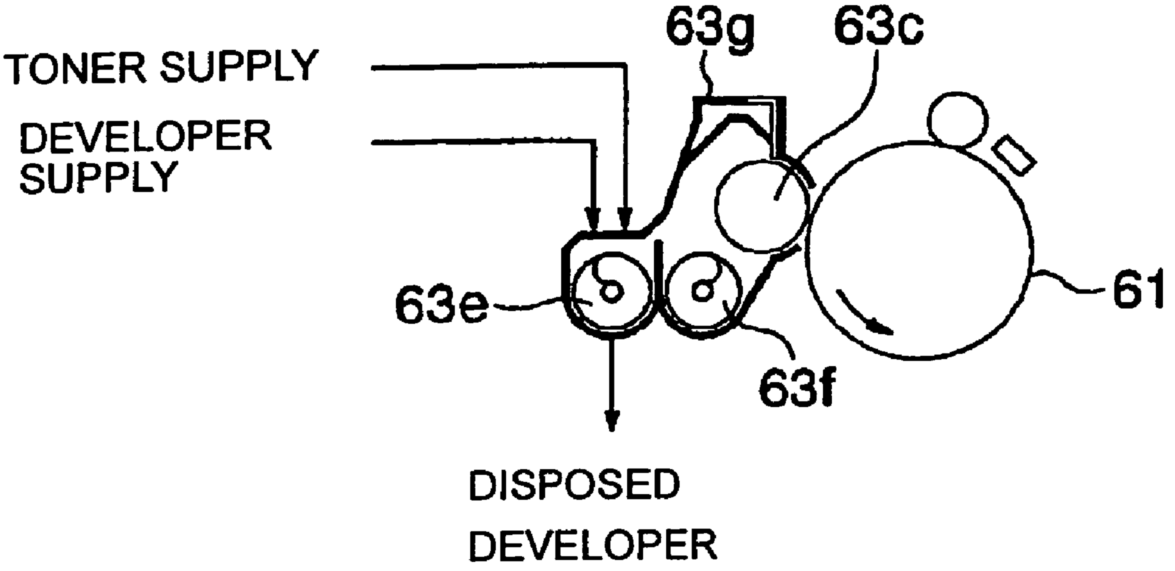
FIG. 24 is a schematic diagram of a developing unit 63 that develops the image by the two-component developing process shown in FIG. 1 and FIG. 8.

FIG. 24 is a schematic diagram of a developing unit 63 that develops the image by the two-component developing process shown in FIGS. 1 and 8. A developing roller 63*c* is provided at a position, in a developing tank 63*g*, facing the photoreceptor 61. In a lower part of the developing tank 63*g* which is separated into two rooms, a first and a second screws 63*e* and 63*f* are equipped. A toner supply port and a developer supply port are provided at the upper part of the first screw 63*e* and a toner disposal port is provided at the lower part of the first screw 63*e* of the developing tank 63*g*.

Figure 25:
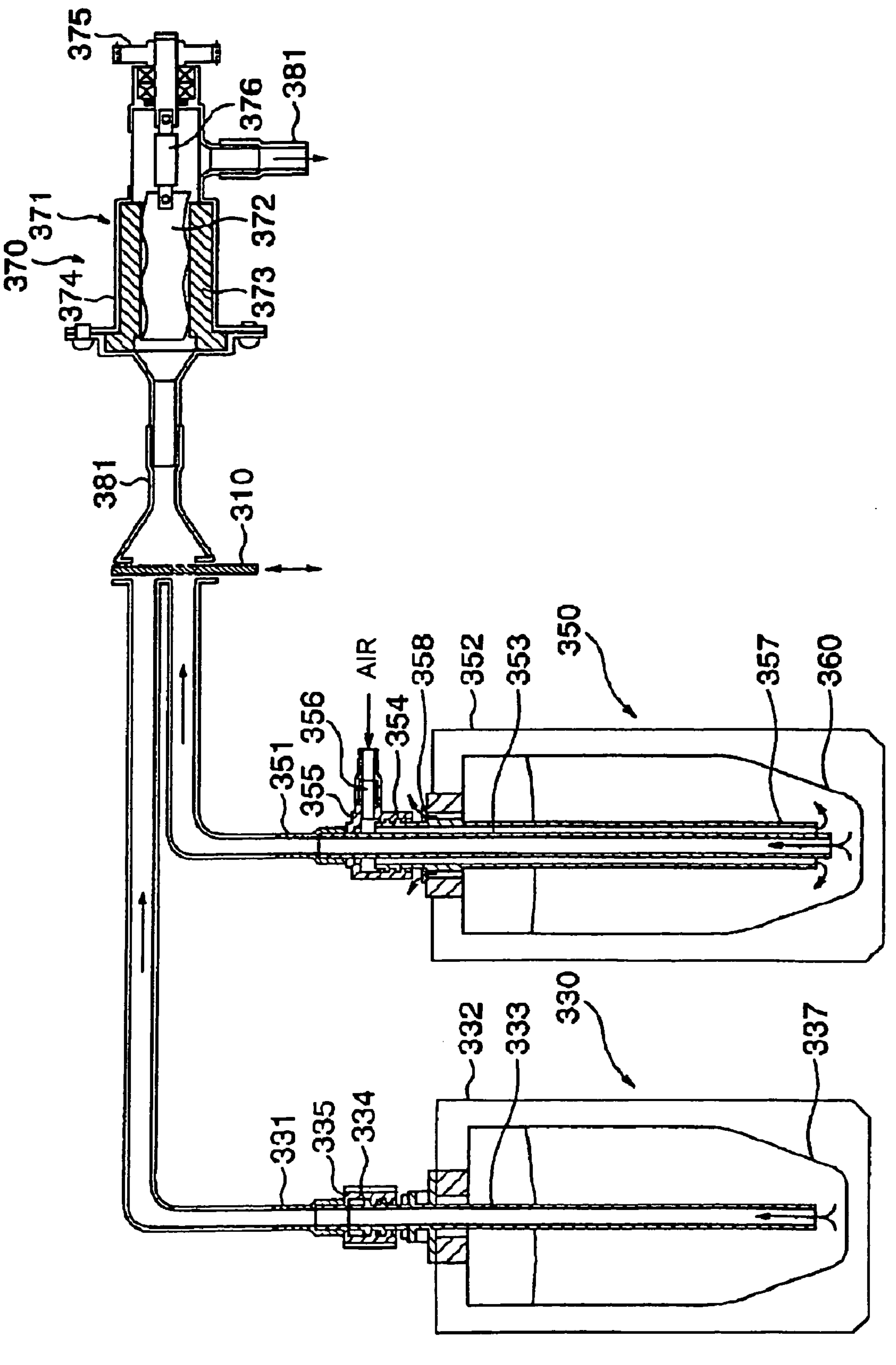
FIG. 25 is a cross section of a developer and toner supply unit that supplies the developer and the toner to a developer tank.
Figure 26:
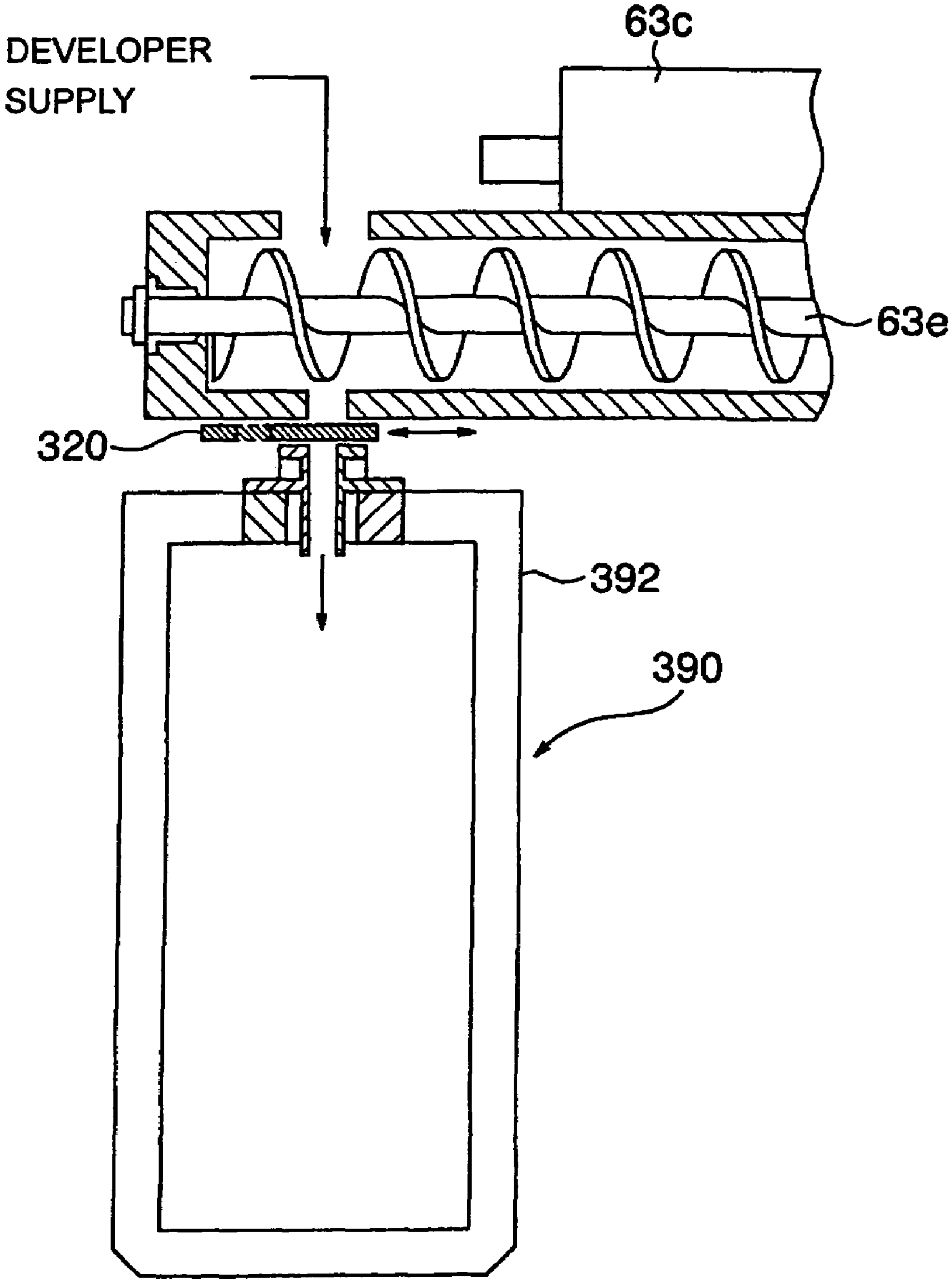
FIG. 26 is a cross section of a developer disposal unit.

FIG. 25 is a cross section of the developer and toner supply mechanism that supplies the developer and toner to a developer tank, and FIG. 26 is a cross section of a developer disposal mechanism.

As shown in FIG. 25, the mechanism that supplies the developer and toner to the developing tank 63*g* includes a developer storage unit 330, a toner storage unit 350, and a toner and developer conveyer unit 370. In this embodiment, a suction type of one-axis eccentric screw pump 371 which is commonly called mono pump is used as the toner and developer conveyer unit 370. The screw pump 371 includes a rotor 372 which is made of a rigid material such as metal and is screw-shaped and eccentric, a stator 373 which is made of an elastic material such as rubber and is double-thread screw-shaped and fixed, and a holder 374 that is made of plastic, covers the rotor 372 and the stator 373, and forms a powder conveying path.

The rotor 372 is rotationally driven through a gear 375 and a shaft coupling 376 that are connected to and driven by a driving source (not shown). As the rotor 372 rotates, the pump generates a strong self-suction force and becomes capable of sucking the toner and the developer. The driving power of the suction type screw pump 371 is controlled through a special motor for this purpose or through a main motor and a clutch (not shown) in the image forming apparatus.

The one-axis eccentric screw pump 371 having the configuration is capable of continuously conveying a constant volume of the toner or developer with a high solid-to-gas ratio. It is known that the screw pump 371 is capable of conveying an accurate quantity of the toner and developer in proportion to the rotational speed of the rotor 372. Therefore, the quantity of the toner and the developer to be conveyed may be controlled by the running time of the screw pump. Furthermore, it is possible to convey the toner and the developer to all directions optionally including higher places using, for example, a flexible tube for a supply pipe 381. Furthermore, the screw pump 371 is very advantageous for the developer and the toner to be used, because the screw pump 371 does not give unnecessary stress to the developer and the toner while being conveyed.

The developer storage unit 330 includes a bag-shaped container 332, and a pipe-shaped suction guide member 333 is welded at the upper center part of the container 332 by ultrasonic or the like and is integrated into one body. The lower end of the suction guide member 333 reaches a portion close to the bottom of the container 332, and the upper end thereof protrudes from the container 332, and a threaded part 334 is formed at the protruded portion. The threaded part 334 is screwed with a base member 335, and one of the ends of a supply pipe 331 is connected to the upper part of the base member 335. The other end of the supply pipe 331 is coupled to a suction port of the developer conveyer unit 370.

The container 332 has a structure with a single layered or multi-layered flexible sheet that is made of such plastics as polyethylene or nylon with a thickness of about 80 μm to 120 μm. It is effective in prevention of the sheet from electrostatic charging to evaporate aluminum film onto the surface of the sheet. Furthermore, the suction guide member 333 can be made of such plastics as polyethylene or nylon, and it is preferable from a recycling viewpoint that the suction guide member 333 is made of the same material as that of the container 332. Although the suction guide member 333 plays the role as a suction port of the developer, it also plays the role as a filling port of the developer at a factory. Instead of the base member 335, a cap is attached to the threaded part 334 of the suction guide member 333 of the container 332 filled with the developer at the factory. When the apparatus is shipped from the factory, the container 332 is completely sealed by the cap. Therefore, when in use, the cap is detached and the base member 335 is attached, thus handling is extremely simple.

Incidentally, fluidity of the developer for electrophotography is very low. Therefore, the container 332 is vertically installed and the lower end of the pipe-shaped suction guide member 333 is arranged so as to reach a position adjacent to the bottom of the container 332. The toner is suctioned from the end of the suction guide member 333 by the screw pump. As the container 332 is flexible, capacity of the bag-shaped container 332 is reduced as the suction of the developer proceeds. The suction guide member 333 prevents clogging of the developer due to a local deformation of the container 332 when the capacity thereof is reduced, thus the developer stored in the container 332 is suctioned out completely without remaining in the bag. Furthermore, by forming a reverse cone-shaped portion 337 that is gradually narrowed toward the bottom of the bag-shaped container 332 in the bottom thereof, the developer is moved to a portion adjacent to the suction port of the suction guide member 333 by a natural drip due to the weight of the developer itself even when the quantity of the developer stored in the bag is reduced. Thus, transportation of the developer becomes stable regardless of the quantity of the developer.

Next, the toner storage unit 350 will be explained. The toner storage unit 350 includes a bag-shaped toner container 352, and a pipe-shaped suction guide member 353 is welded at the upper center part of the container 352 by ultrasonic and integrated into one body. The lower end of the suction guide member 353 reaches a portion close to the bottom of the container 352, and the upper edge of the guide member 353 protrudes from the container 352, and a threaded part 354 is formed at the protruded portion. The threaded part 354 is screwed with a base member 355 at an air intake part 357. One of the ends of a supply pipe 351 is connected to the upper part of the base member 355, and the other end of the supply pipe 351 is connected to the suction port of the toner conveyer unit 370 (not shown).

The container 352 is made of such plastics as polyethylene or nylon with a thickness of about 80 μm to 120 μm and the structure thereof is formed with single or plural layered flexible sheet. It is effective to evaporate aluminum film onto the surface of the sheet to prevent the sheet from electrostatic charging. Furthermore, it is possible to make the suction guide member 353 made of such plastics as polyethylene or nylon, and it is preferable from a recycling view point that the suction guide member 353 is made of the same material as that of the container 352. Although the suction guide member 353 plays the role as a suction port of the toner, it also plays the role as a filling port of the toner at a factory. Instead of the base member 355, a cap is attached to the threaded part 354 of the suction guide member 353 of the container 352 filled with the toner at the factory. When the apparatus is shipped from the factory, the container 352 is completely sealed by the cap, and the cap is detached and the base member 355 is attached to the container 352 when the container is used, and therefore handling is extremely simple.

Fluidity of the toner for electrophotography is very low. Therefore, the container 352 is vertically installed and the lower end of the pipe-shaped suction guide member 353 is disposed so as to reach a portion adjacent to the bottom of the container 352. The toner is suctioned from the end of the suction guide member 353 by the screw pump 371.

The suction guide member 353 is formed into a double-pipe, and an air induction portion 357 is built around a toner suction part. The air induction portion 357 is connected with an air inlet 356 that is built on the base member 355, and the air is sent to the air inlet 356 from an air pump (not shown). During suctioning of toner, the air jetted from the lower end of the suction guide member 353 via the air inlet 356 and the air induction portion 357, diffuses a toner layer and passes through the layer, thus the toner is fluidized. As the fluidized toner prevents occurrence of a cross-linking phenomenon of the toner, thus transportation of the toner is more ensured. A reference numeral 358 denotes a filter unit to release the air sent to the container 352.

Although the capacity of the bag is reduced as the suction of the toner proceeds, as the container 352 is flexible, the suction guide member 353 prevents clogging of the toner due to a local deformation of the container 352 when the capacity thereof is reduced, thus the toner stored in the container 352 is suctioned out completely without remaining in the bag. Furthermore, by forming the bag-shaped container 352 to be a reverse cone-shaped portion 360 that is gradually narrowed toward the bottom of the bag-shaped container 352, the toner is moved to a portion adjacent to the suction port of the suction guide member 353 by a natural drip due to the weight of the toner itself even if a small quantity of the toner remains in the bag. Thus, transportation of the toner becomes stable regardless of the quantity of the developer.

The supply pipe 331 as a developer passage from the developer storage unit 330 and the supply pipe 351 as a toner passage from the toner storage unit 350 are couple to the screw pump 371 as a passage of the toner and developer conveyer unit 370 through a passage switch shutter 310. Usually, the passage switch shutter 310 connects the toner passage 351 to the passage 371, and therefore a passage between the developer passage 331 and the passage 371 is closed, thus the toner is supplied during the normal operation.

Based on the structure, disposition of the deteriorated developer in the developing unit and filling of the developing unit with new developer are conducted in the following procedures.

If it is determined that it is impossible to improve the image quality by implementing only the control of the process conditions and the toner exchange in the developer, it is necessary to exchange carriers. However, it is troublesome to exchange only the carriers, therefore the developer itself including the toner is exchanged with new developer. By opening a developer disposal shutter 320 which is arranged at a portion of the developer container of the developing unit 63 shown in FIG. 26 (in this case, lower part of the first screw 63*e*), the developer in the developing unit 63 drops by its own weight into a disposed developer storage unit 390 to be stored. Most of the developer in the developing unit 63 drops from the developer disposal shutter 320 into the disposed developer storage unit 390 by continuously rotating the first and the second screws 63*e* and 63*f* (refer to FIG. 24) and the developing roller 63*c*. The developer disposal shutter 320 closes when the developer in the developing unit 63 is fully disposed.

When the developer disposal shutter 320 is closed, the passage switch shutter 310 shown in FIG. 25 is switched to close the passage between the toner passage 351 and the passage 371, and the developer passage 331 and the passage 371 are coupled to each other. Then, the rotor 372 is rotated predetermined turns and suctions a necessary amount of the developer from the developer container 330 to fill the developing unit 63 with the developer. After finishing the filling, the passage switch shutter 310 is switched to the normal position. Through the processes, the developing unit 63 is filled with a sufficient amount of the new developer, and becomes ready for a usual operation.

1.4.5.2 Control

Figure 27:
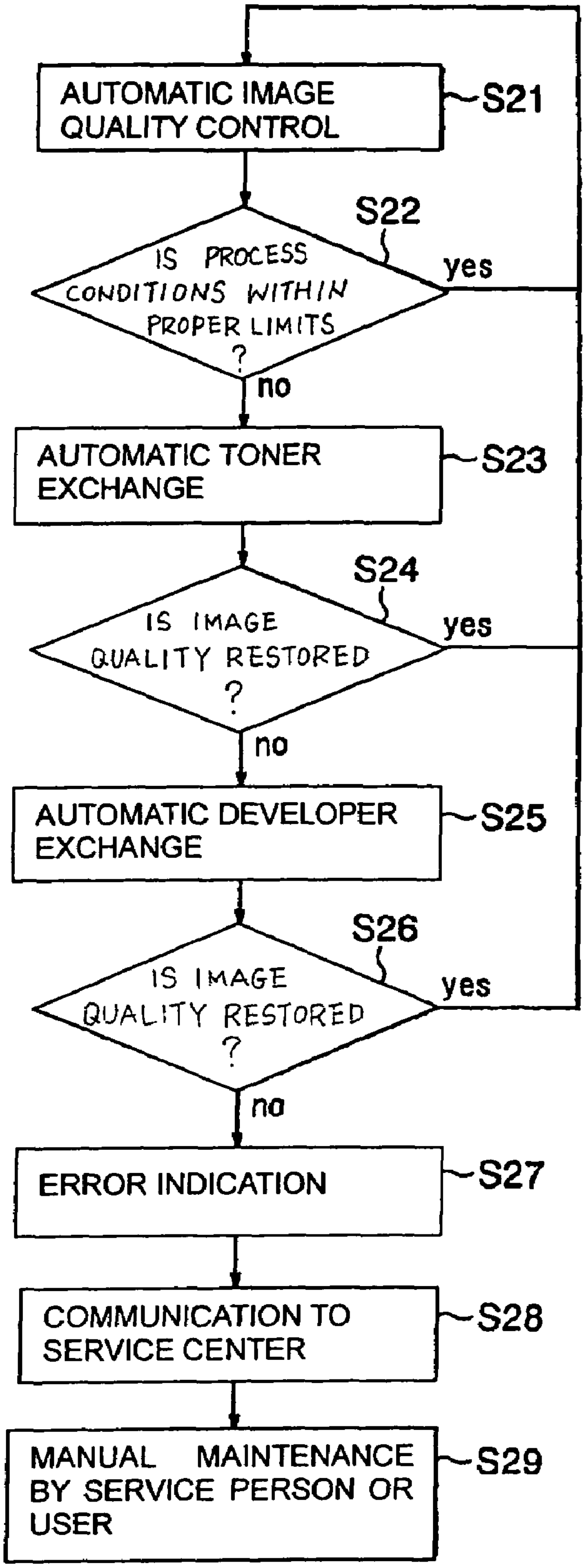
FIG. 27 is a flowchart of a procedure of controlling image quality including an automatic developer exchange.

FIG. 27 is a flowchart of a procedure of controlling image quality including an automatic developer exchange procedure.

Usually, an automatic image quality control is conducted through electrical or mechanical controls of the process conditions (step S21). This automatic control is implemented within a predetermined limit of electrical conditions or within a predetermined limit of mechanical conditions. The limit of the electrical conditions includes, for example, a charging potential of the photoreceptor or an applying potential to the developing roller so as to prevent abnormal discharges in a photoreceptor charging process or in a developing process, and a potential condition to prevent abnormal images such as surface stains or carrier adhesion. The limit of the mechanical conditions includes, for example, a driving limit related to durability or heat generation of rotary bearings, and a driving limit related to toner scattering, carrier scattering, and damages to the photoreceptors.

In the automatic image quality control at step S21, if it is determined that the control is beyond a proper control limit, in other words, if it is impossible to improve the image quality (step S22) by the control within the proper control limit, the toner needs to be exchanged because it is assumed that the toner extremely deteriorates (step 23). Exchange of the toner is conducted by recovery of the toner and supply of new toner. Namely, solid image development is forcibly implemented while the toner supply to the developing unit 63 is cut off, and the toner adhering to the photoreceptor 61 is recovered by a cleaner which is disposed on the photoreceptor 61 or by a cleaner disposed on a transfer body through a toner transfer step to the transfer body and stored in a disposed toner storage unit (not shown). If the toner is sufficiently discharged from the developer in the developing unit 63, the cut off of the toner supply to the developing unit 63 is released, and the new toner is supplied from the toner storage unit 350 to the developing unit 63, and the toner supply and the stirring of the developer are continued until the toner density in the developer reaches an appropriate level.

After the toner exchange process is implemented, a detection image is formed on the photoreceptor 61 or on the transfer body, and image quality is detected. If the image quality is sufficiently restored, the process returns to the normal automatic control of image quality at step S21 (step S24).

If the image quality is not fully improved after the exchange of the toner at step S23, the developer needs to be exchanged because it is assumed that the carrier extremely deteriorates (step 25). The exchange of the developer is conducted in the steps as explained above, such that the developer disposal shutter 320 is opened to accommodate the developer existing in developing tank 63*g* into the disposed developer storage unit 390, and the opening of the passage switch shutter 310 is switched to the passage side to supply developer to the developing tank 63*g*. The detail of the process is as explained above.

After the developer exchange process is implemented at step S25, a detection image is formed on the photoreceptor 61 or on the transfer body, and image quality is detected. If the image quality is sufficiently restored, the process returns to the normal automatic control of the image quality at step S21 (step S26).

If the image quality is not fully improved after the exchange of the developer at step S25, it is assumed that the photoreceptor 61 extremely deteriorates. Therefore, the automatic image quality controlling unit displays an error message on a display (not shown) such as an operation panel of the image forming apparatus to inform the user of machine conditions (step S27). Thus, if it is possible for the user to exchange the photoreceptor 61 with a new one, the user exchanges it with a photoreceptor 71 in response to reception of the error message. In the case of any image forming apparatus that is impossible for the user to exchange the photoreceptor 61, the automatic image quality controlling unit displays an error message and also informs a service center of machine conditions through telephone line (step S28) to prompt a service person to perform maintenance such as exchange of the photoreceptor (step S29).

1.5 Pattern for Detection of Image Quality

Image patterns shown in FIG. 28 through FIG. 35 can be used for the image pattern used for detecting image quality, other than the pattern shown in FIG. 3. Some examples of the pattern for detection of image quality ("image quality detection pattern") other than image pattern shown in FIG. 3 will be shown.

Figure 28:
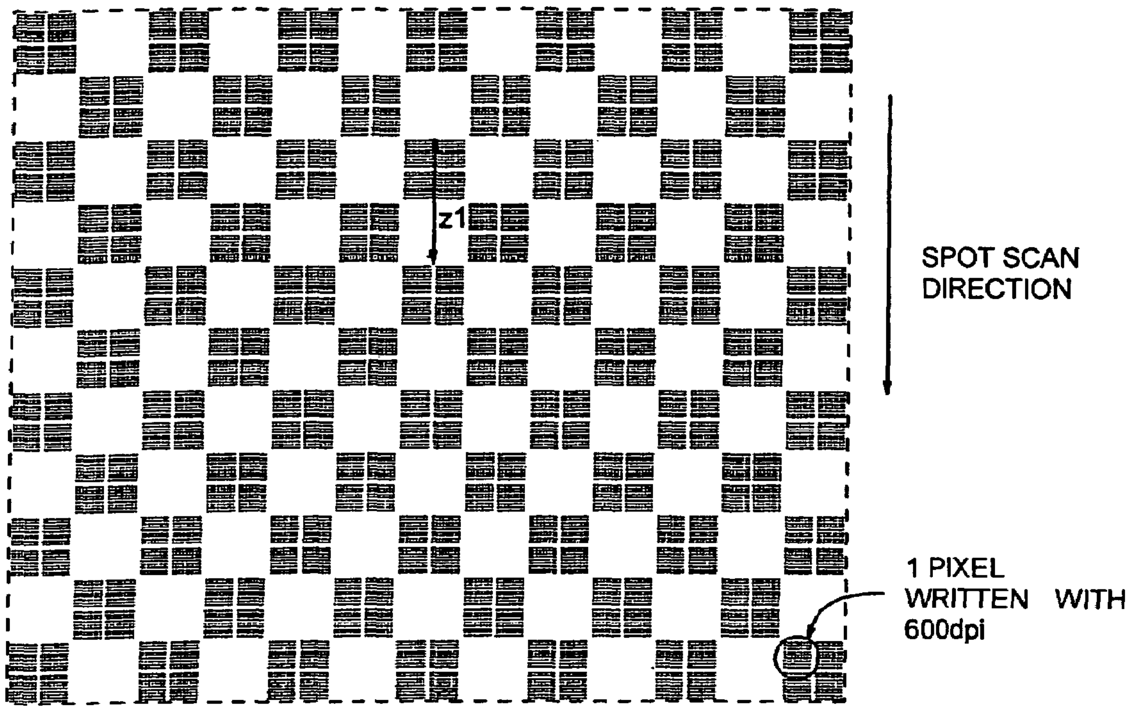
FIG. 28 shows an example pattern used to detect image quality corresponding to the pattern shown in FIG. 3.

FIG. 28 is a schematic diagram of the image pattern shown in FIG. 3, and a minimum unit of a dot consists of 2 pixels×2 pixels. In FIG. 28, a repetition cycle z1 of regular arrangement of dots along the scan direction of the spotlight SP is approximately 170 μm (the spatial frequency f1 is about 5.9 cycle/mm). If scanned with a spotlight SP having a beam diameter of about 400 μm as mentioned above, a spectrum appears at the spatial frequency of about 5.9 cycle/mm as shown in FIG. 10. It is necessary to make the repetition cycle z1 less than 250 μm (f1>4 cycle/mm), preferably less than 200 μm in order to avoid overlapping of the spectrum caused by the image pattern itself on the detection region of the image detection signals. Consequently, a halftone image pattern shown in FIG. 28 where z1=170 82 m is suitable for the image quality detection pattern.

Figure 29:
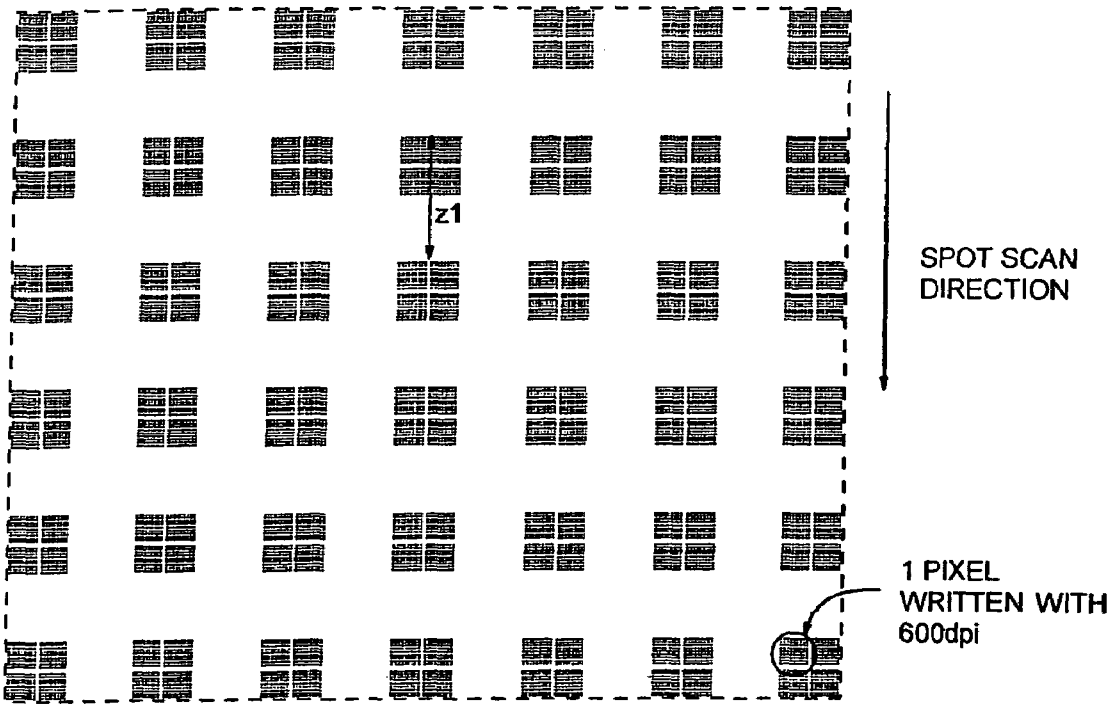
FIG. 29 shows an example of a clustered-dot dither pattern used to detect the image quality.
Figure 30:
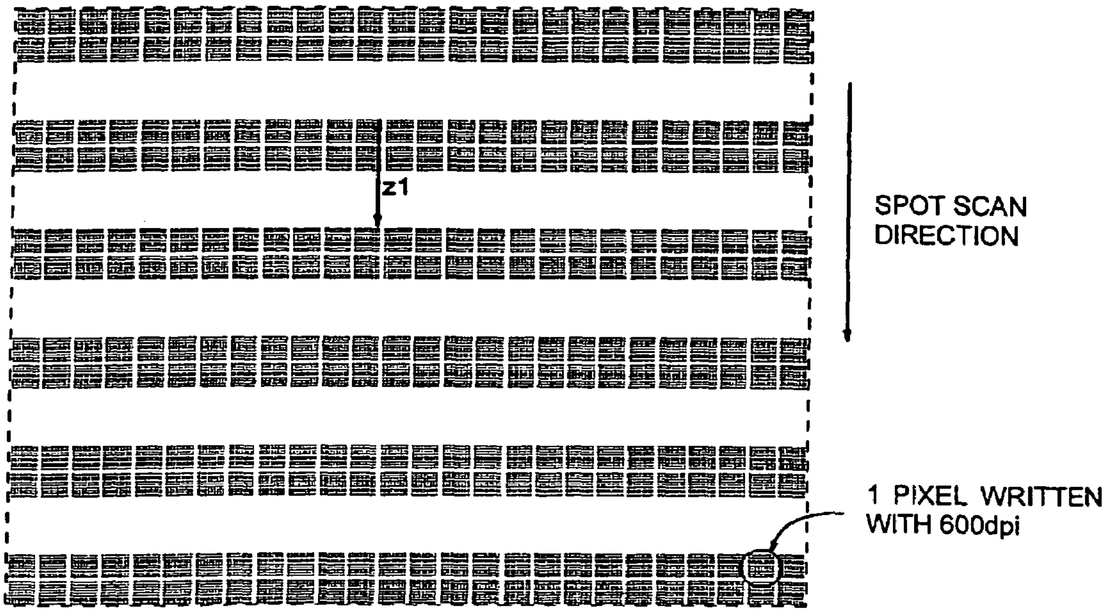
FIG. 30 shows an example of a myriad lines dither pattern used to detect the image quality.
Figure 31:
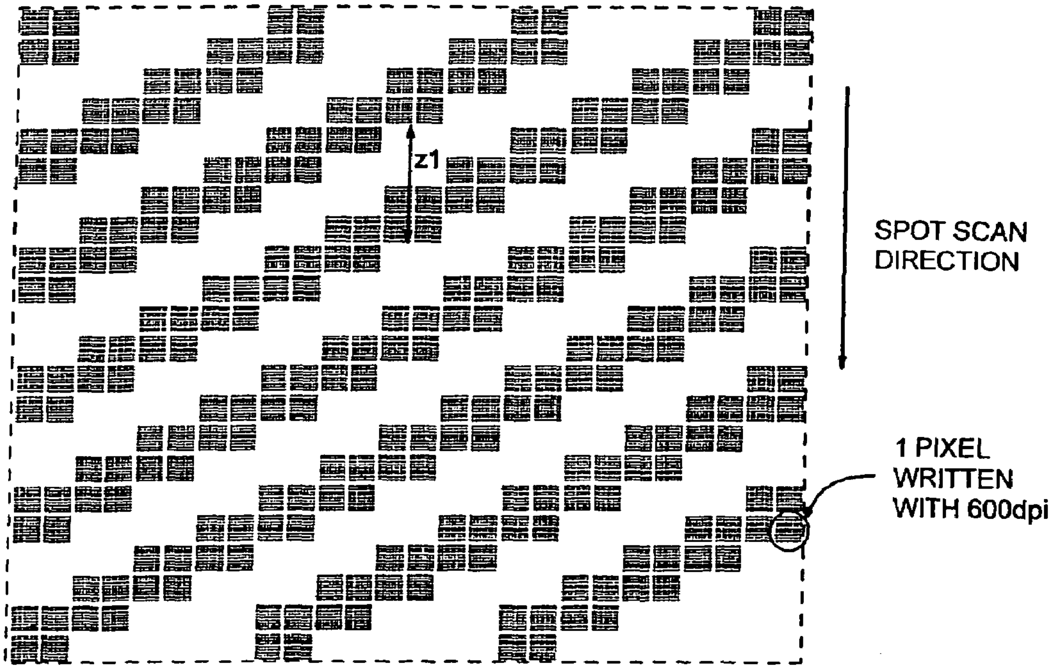
FIG. 31 shows another example of the myriad lines dither pattern used to detect the image quality.
Figure 32:
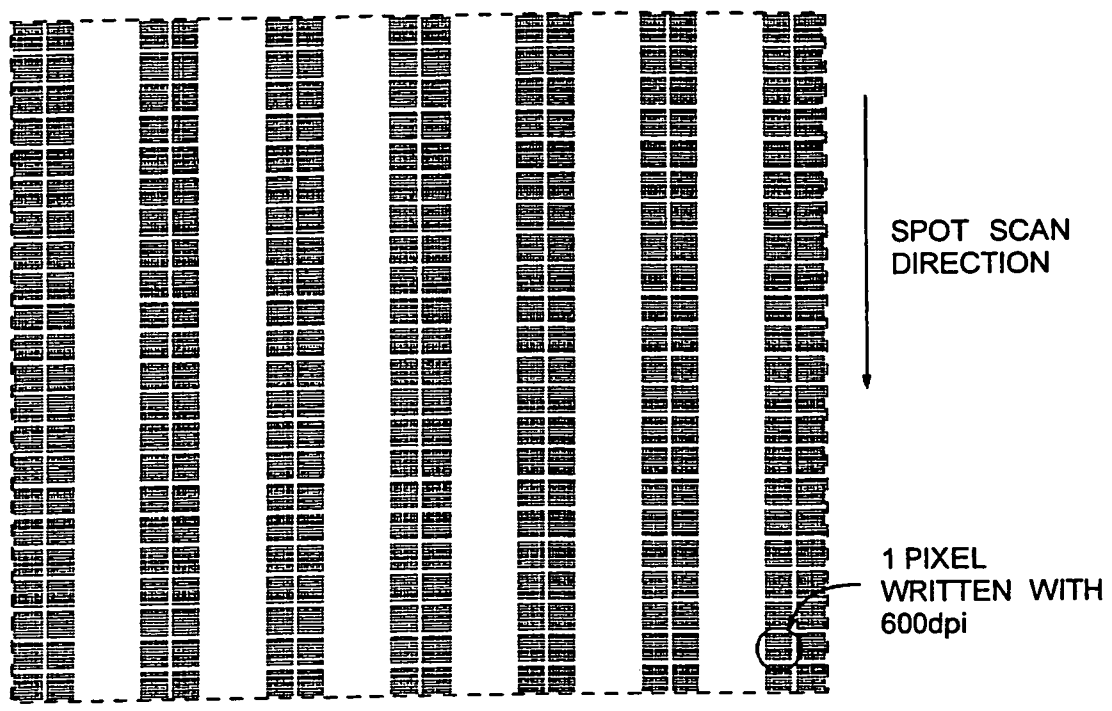
FIG. 32 shows an example of the myriad lines dither pattern in which it is impossible to define a repetition cycle of a dot alignment used to detect the image quality.
Figure 33:
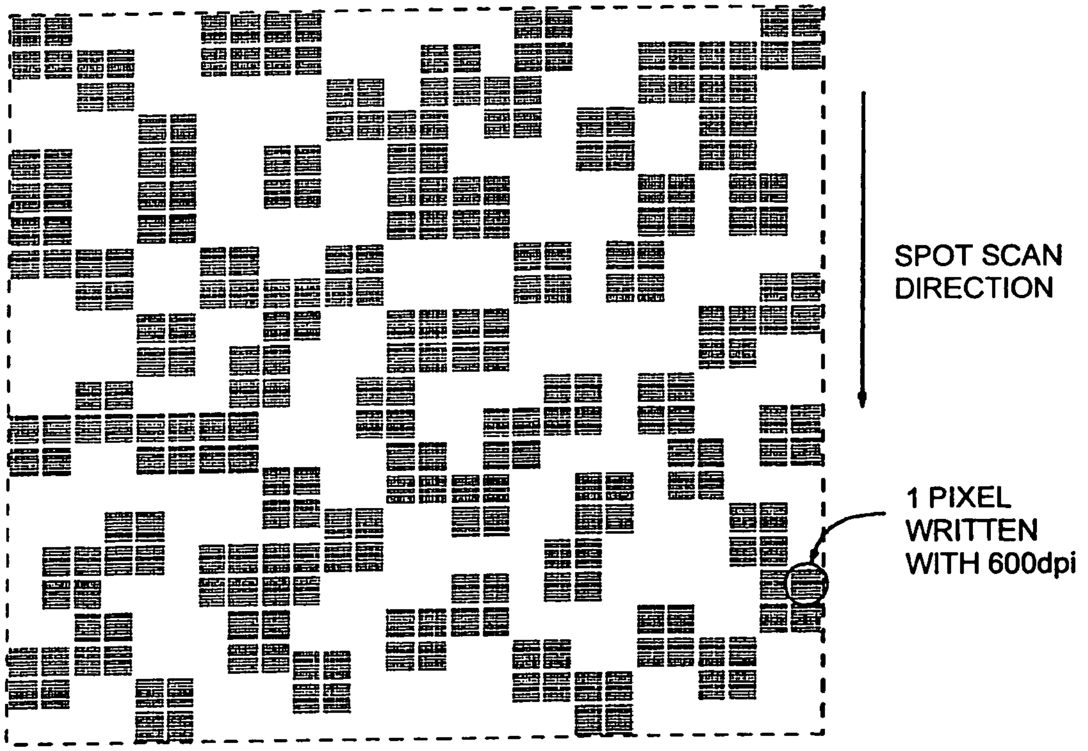
FIG. 33 shows an example of a random-dot dither pattern in which it is impossible to define a repetition cycle of the dot alignment used to detect the image quality.
Figure 34:
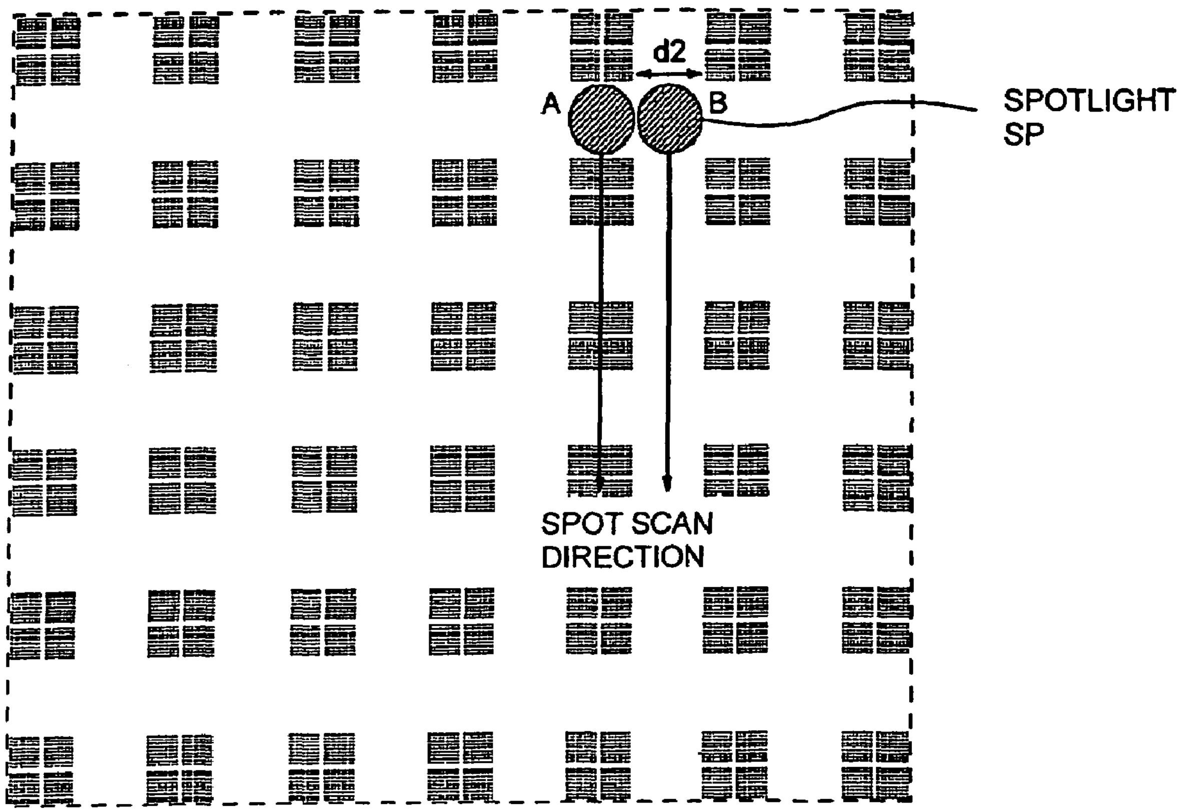
FIG. 34 shows a case in which the image information cannot be sometimes obtained depending on a scan position if a beam diameter in the direction perpendicular to a scan direction is small.
Figure 35:
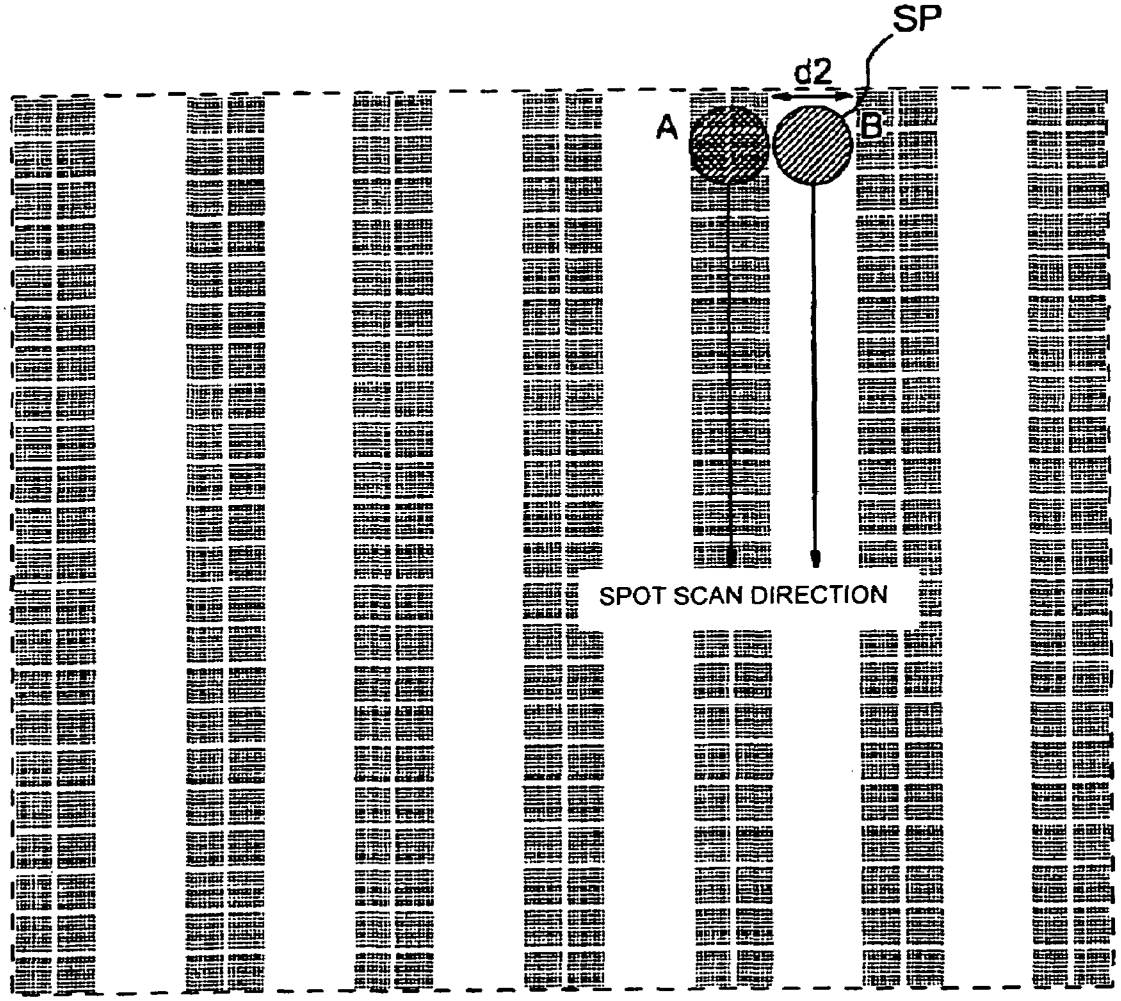
FIG. 35 shows another case in which the image information cannot be sometimes obtained depending on a scan position if the beam diameter in the direction perpendicular to a scan direction is small.

FIG. 29 "clustered-dot dither", FIG. 30 "myriad lines dither", and FIG. 31 "myriad lines dither" are exemplified as patterns other than the pattern of FIG. 28 where z=170 μm. In addition, those patterns where it is difficult to define a repetition cycle of the dot arrangement such as FIG. 32 "myriad lines dither", FIG. 33 "random-dot dither including error diffusion" are also exemplified, and spectra caused by the image pattern as shown in FIG. 10 do not appear in these patterns. When such patterns shown in FIGS. 29 and 32 are used, the image quality information sometimes cannot be obtained depending on the positions being scanned (FIGS. 34, and 35) if the beam diameter d2 in the direction perpendicular to the scan direction is as small as about several tens of micrometers. Therefore, if the pattern shown in FIG. 29 or FIG. 32 is used, it is preferable to make the beam diameter d2 large enough in the direction perpendicular to the scan direction.

In the examples explained above, as shown in FIG. 8, only the image qualities of the center areas of the photoreceptors 61Y, 61M, 61C, and 61K are able to be detected, because the light reflection type sensors 10Y, 10M, 10C, and 10K are disposed and fixed to the center of the receptors in each rotational axial direction. In contrast with the above mentioned examples, if parallel movement units that move the light reflection type sensors 10Y, 10M, 10C, and 10K (not shown) to axial directions of the receptors (drums) 61Y, 61M, 61C, and 61K, it becomes possible to move the light reflection type sensors to the axial directions of the receptors in parallel to the rotational axial directions. Thus, it becomes possible to detect the quality of images on not only the central areas of the photoreceptor 61Y, 61M, 61C, and 61K, but also the both edges or any given parts of the photoreceptors. As a result, it is possible to estimate not local but comprehensive image quality, because the image quality detections in wide areas become possible.

Furthermore, it also becomes possible to detect the density unevenness in respect to a direction which intersects with moving direction of the image carrier (in this case, crossing at right angles) by stopping the drives of the photoreceptors 61Y, 61M, 61C, and 61K, and conducting scanning with the spotlight SP using the parallel movement unit. Especially, it becomes possible to detect a so-called longitudinal streak that tends to occur as an abnormal image. The longitudinal streak is a long linear image defect, in the moving direction of the image carrier, occurring due to a flaw on the image carrier or a defect of a cleaning blade, and sometimes a plurality of streaks appear in the direction perpendicular to the moving direction of the image carrier.

A second embodiment of this invention will be explained below.

Figure 36:
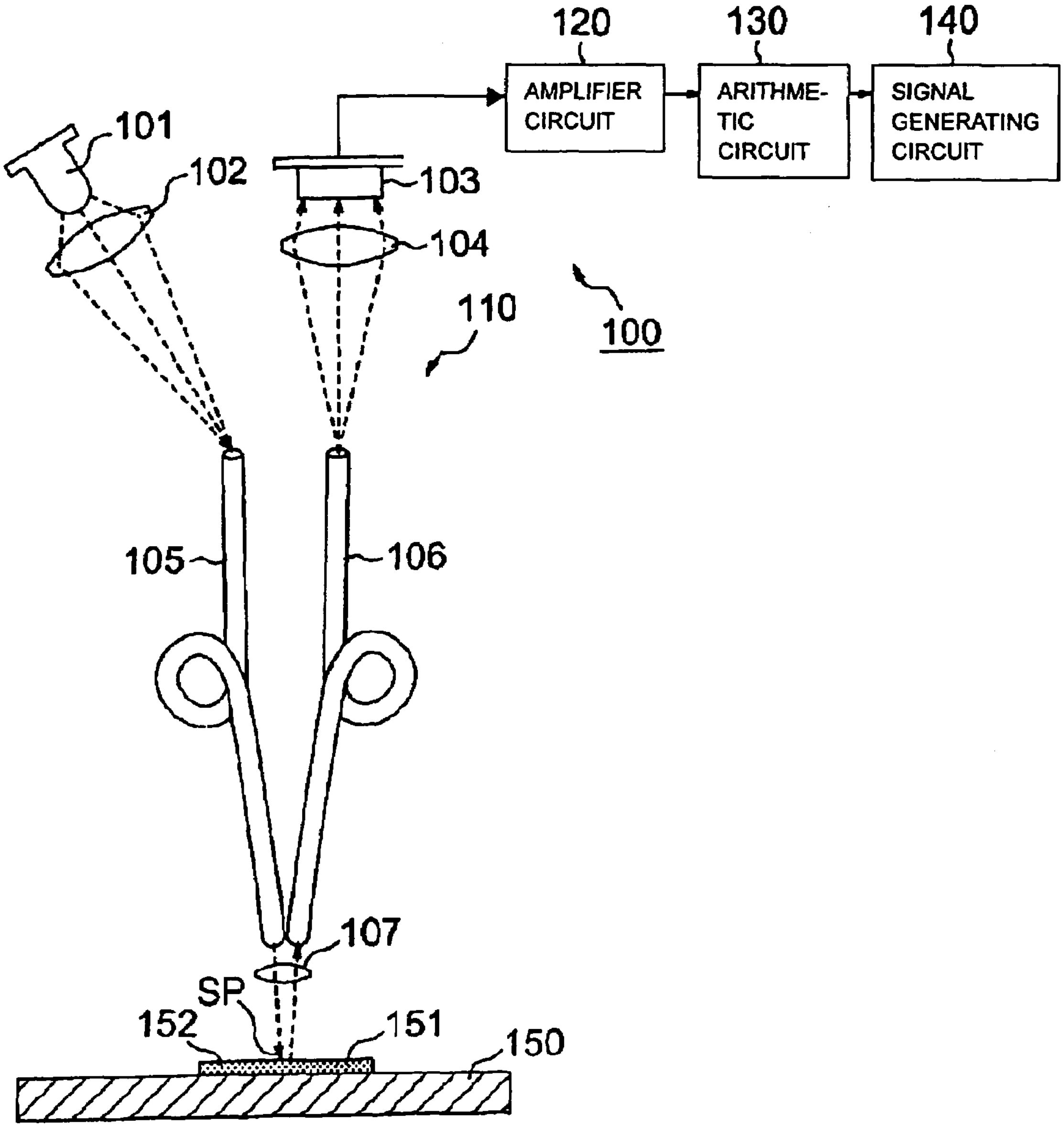
FIG. 36 is a schematic diagram of an image quality measuring apparatus according to a second embodiment of the present invention.

In the first embodiment, an example in which a spot is collected on the image pattern 151 with the collective lens 102 as shown in FIG. 6 and light reflected from the image pattern is collected on the image formation surface of the photoelectric conversion element 103 through the image forming lens 104, is explained. However, it is possible to guide light through an optical fiber as shown in FIG. 36. FIG. 36 is a schematic diagram of an image quality measuring apparatus according to the second embodiment. The example shown in FIG. 36 is different from the first embodiment shown in FIG. 6 in that a first optical fiber 105 and a second optical fiber 106 and an objective lens 107 are disposed in the apparatus. Therefore, only the different points will be explained.

That is to say, in the second embodiment, an end of the first optical fiber 105 is disposed at a light collecting point of the collective lens 102, and the other end of the first optical fiber is disposed at the objective lens 107 that is arranged in front of the image pattern 151. The objective lens 107 having features as follows is used. The features are such that the luminous flux guided through the first optical fiber 105 is stopped down to 1000 μm or less just like the first embodiment and the image pattern 151 is radiated with this stopped down flux, or that in the case of the image forming apparatus with a writing density of 600 dpi, the flux is stopped down to about 400 μm and the image pattern 151 is radiated with this stopped down flux. The light beam radiated is reflected from the toner particles 152 that form the image pattern 151, and guided to the second optical fiber 106 through the objective lens 107 and let in to the photoelectric conversion element 103 through the image forming lens 104. The rest of the units are formed in the same way as that of the first embodiment.

By using the fibers, the optical system can be arranged at any optional place so that the image quality measuring apparatus can be disposed at any place where the apparatus is impossible to be disposed due to limits of space in the first embodiment shown in FIG. 6.

Figure 37:
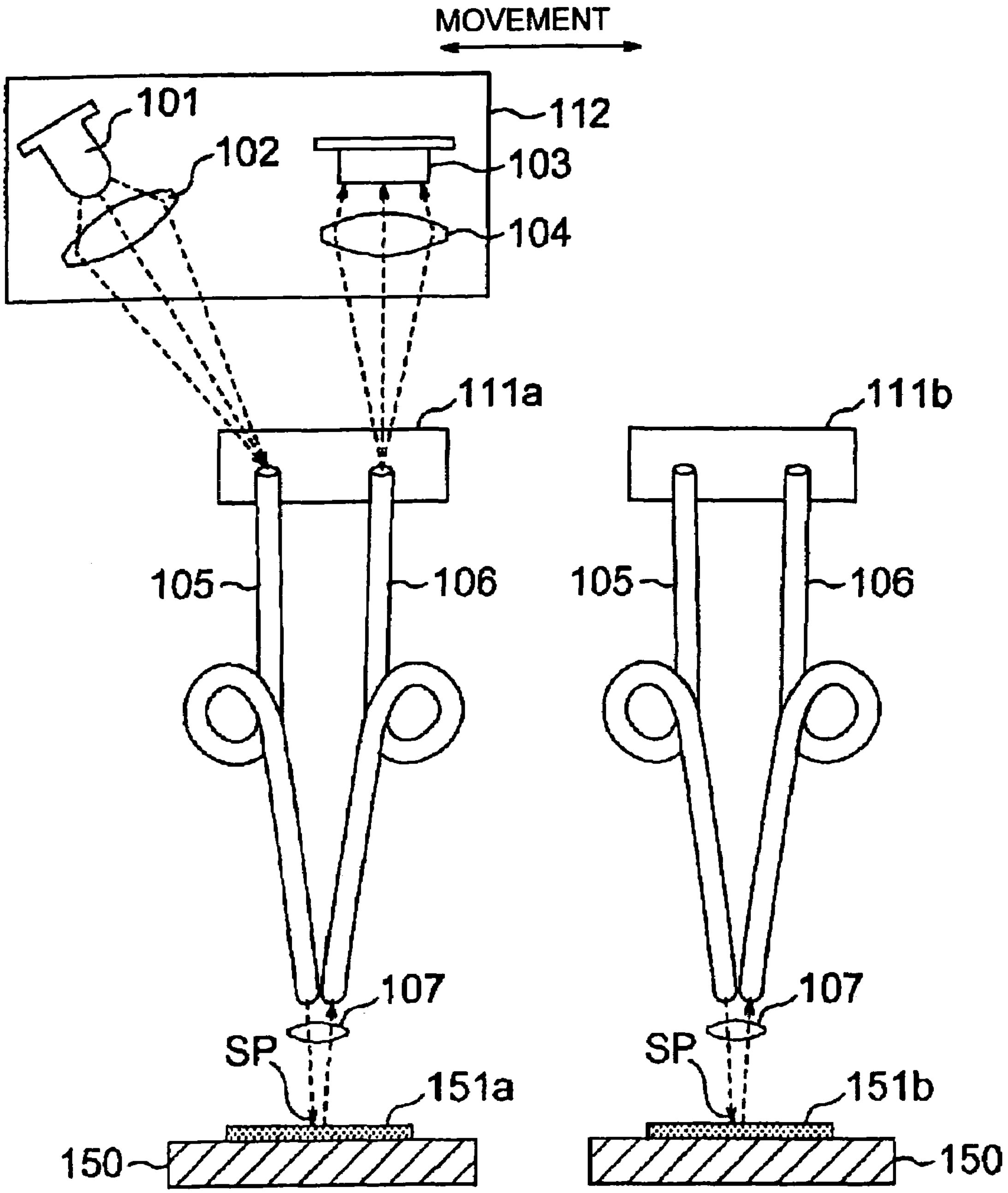
FIG. 37 shows a modification of the image quality measuring apparatus shown in FIG. 36.

FIG. 37 is a modified example of the image quality measuring apparatus shown in FIG. 36. The image quality measuring apparatus shown in FIG. 37 includes a sensor unit 112 as one unit consisting of the LED (light-emitting diode) 101, the photoelectric conversion element (light-receiving device) 103, the collective lens 102, and the image forming lens 104. The image quality measuring apparatus also includes a plurality of fiber units such as a first fiber unit 111*a*, and a second fiber unit 111*b* that form optical paths to a plurality of pattern detecting positions on the patterns 151 such as 151*a*, 151*b*, and so on.

In this formation, the sensor unit 112 as one unit is moved to be sequentially coupled to the fiber units one by one based on a time division. In this process, the image quality measuring apparatus detects the patterns 151*a*, 151*b*, and so on at a plurality of positions, respectively. According to this constitution, if there is one sensor unit 112 having at least the light-emitting device 101 and the light-receiving device 103 as a pair, it is possible to detect the image qualities at the positions by successively moving the sensor unit 112. If there are a great number of areas to be detected, the cost can be largely reduced.

The other units not particularly mentioned in the second embodiment are formed in the same manner as the first embodiment, and each unit functions in the same manner as the first embodiment.

A third embodiment of this invention will be explained below.

Figure 38:
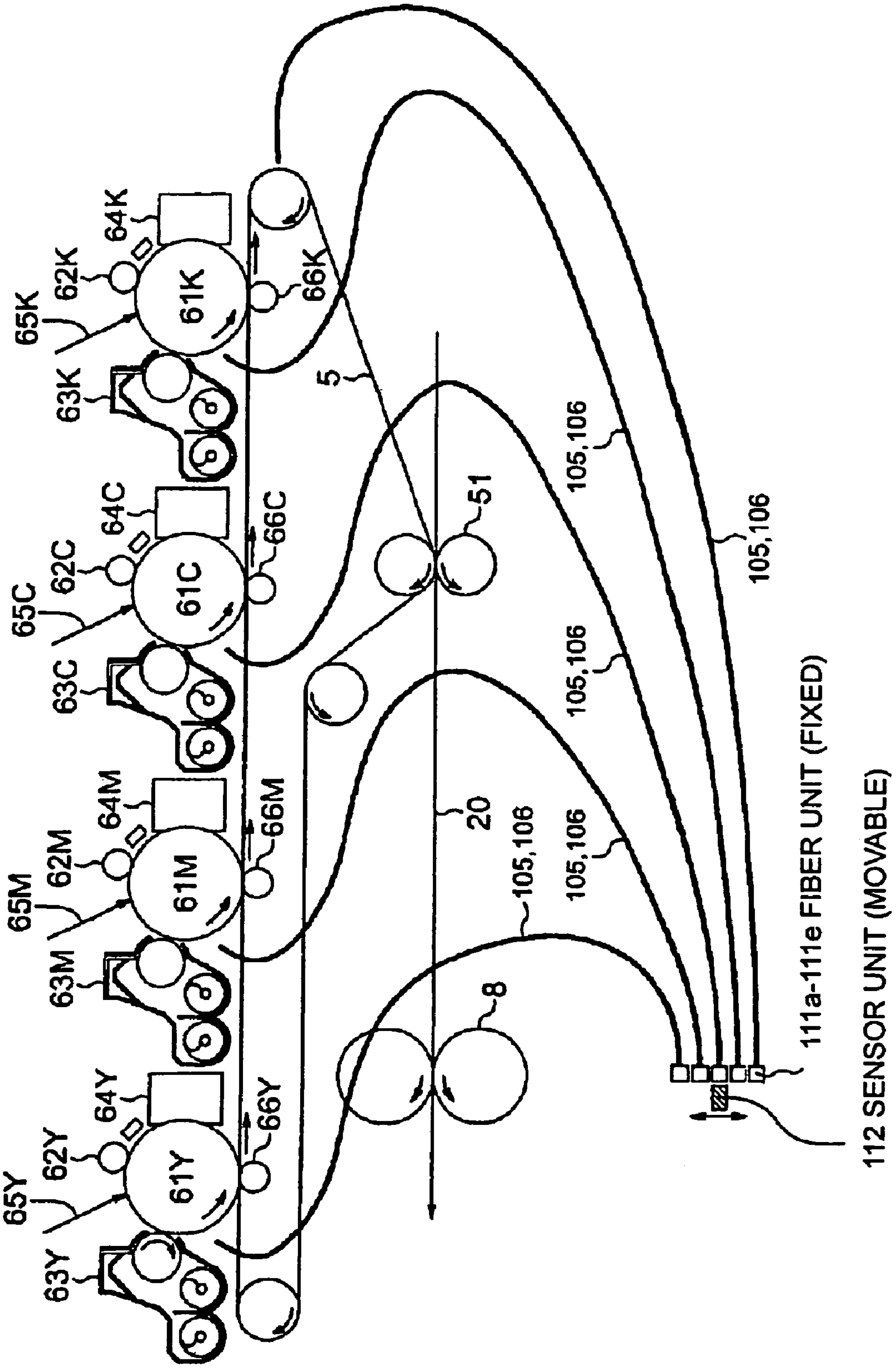
FIG. 38 shows an image forming unit of an image forming apparatus according to a third embodiment of the present invention, in which the quality of an image on each photoreceptor and the quality of an image on an intermediate transfer belt are detected by a pair of light-emitting device and light-receiving device.

This embodiment is an example of the image forming apparatus furnished with the tandem type image forming units shown in FIG. 1 that is provided with the image quality measuring apparatus in the second embodiment. FIG. 38 shows a structure of the third embodiment.

As shown in FIG. 38, the third embodiment is provided to detect the quality of an image on the photoreceptor 61 and the quality of an image on the intermediate transfer belt by the sensor unit 112 having the pair of light-emitting device 101 and light-receiving device 103. In this embodiment, the sensor unit 112 is movable by a moving unit (not shown), between positions on one side of fiber units 111*a* to 111*e* that are fixed in a line based on a time division. The sensor unit 112 as one unit also consists of the LED (a light-emitting device) 101, the photoelectric conversion element (light-receiving device) 103, the collective lens 102, and the image forming lens 104 as explained above. Although it is not shown in the FIG. 37, each one end of the fibers 105 and 106 facing the image carrier 150 in FIG. 37 may be formed so as to be movable in a width direction of the photoreceptor 61 as the image carrier and the intermediate transfer belt 5. Alternatively, a plurality of fibers 105 and 106 may be disposed in the width direction of the photoreceptor 61 as the image carrier and the intermediate transfer belt 5. It is also possible to dispose the fibers 105 and 106 at positions where the quality of images formed on various image carriers can be detected. More specifically, the images are those as an image formed on the intermediate transfer belt 5 between the adjacent photoreceptors 61, an image formed on a recording medium such as recording paper 20, and an image formed on the secondary transfer roller 51.

Figure 39:
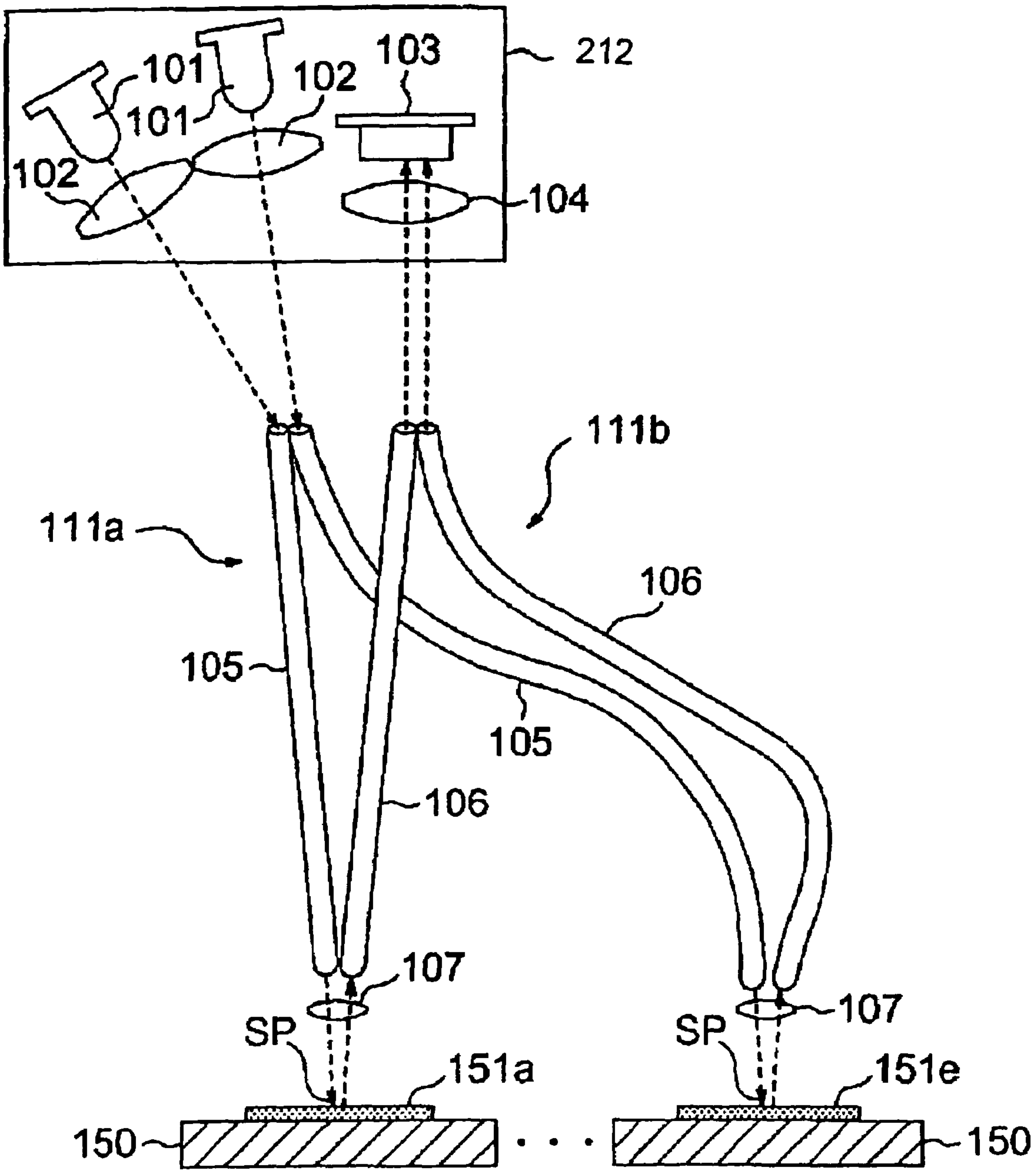
FIG. 39 shows a modification of the image forming unit shown in FIG. 38 with an image quality detecting unit.

FIG. 39 is a modified example of the image quality measuring apparatus shown in FIG. 38. According to this modified example, lights are simultaneously let in from one sensor unit 212 to the first fiber unit 111*a* and to the second fiber unit 111b and measures image quality of by guiding lights reflected from the image pattern 151*a* to an image pattern 151*e*. In this constitution, although plural light sources 101 are needed in the sensor unit 212, only one light-receiving device 103 is necessary and a driving unit can be eliminated. The positions, where a plurality of light-emitting units that irradiate images to be detected with spotlights are disposed, can be applied not only to any apparatus that uses the optical fibers 105, 106 but also to any apparatus that does not use the optical fiber as show in FIG. 6.

The other units that are not particularly explained in the third embodiment are formed in the same manner as the first and the second embodiments, and function in the same manner as well.

A fourth embodiment of this invention will be explained below.

Figure 40:
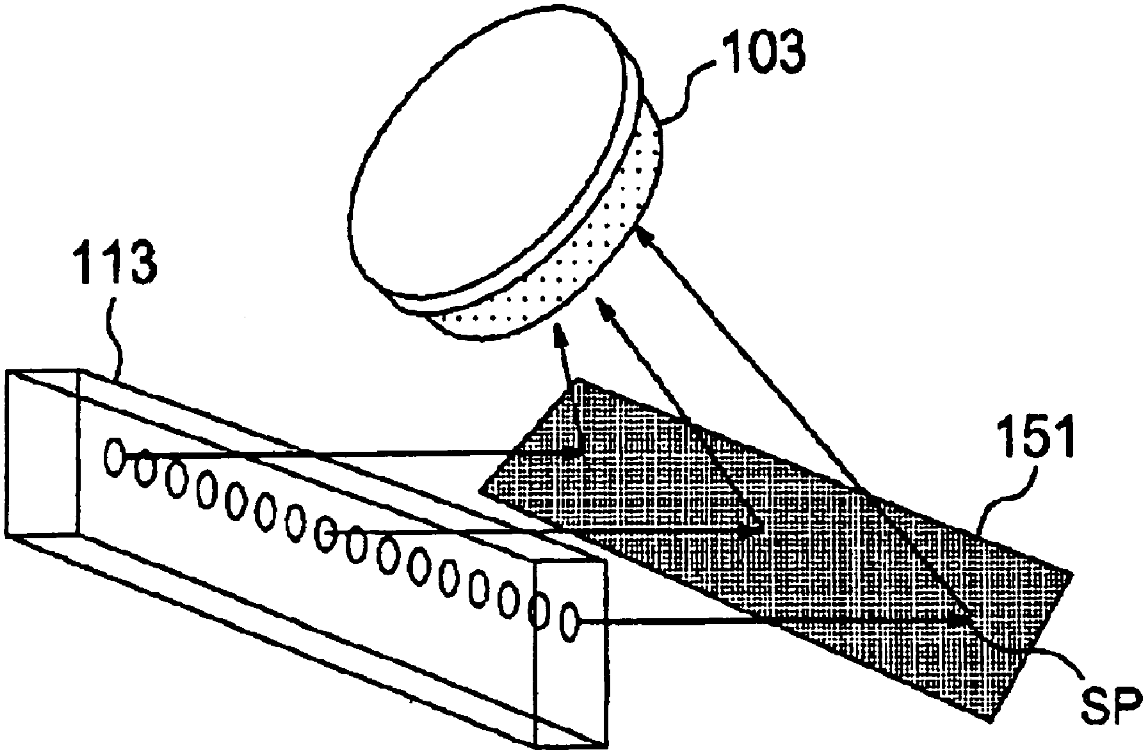
FIG. 40 shows the light-emitting device and the light-receiving device when an LED array is used as a light source according to a fourth embodiment of the present invention.

Although in the first to the third embodiments, the LED 101 is used as a light source to irradiate the image pattern with a spotlight, and one laser beam is irradiated to the image pattern 151. However, it is possible to use an LED array 113 instead of the LED 101. FIG. 40 shows the light-emitting device and the light-receiving device when an LED array is used as light sources.

According to the fourth embodiment, in the optical system of the image quality measuring apparatus represented by FIG. 6, the LED array is used instead of the LED 101, and the image pattern 151 is scanned with the spotlight SP by sequentially conducting turn-on and turn-off of each LED of the LED array. The LED array 113 of which light emitting surface has the light-emitting devices arranged thereon with 600 dpi can be used. The LED array 113 forms spots each having a beam diameter of about 400 μm on the image pattern 151 through the image forming device (not shown). Furthermore, if a length of the LED array 113 is 10 mm, it is possible to scan a length of 10 mm with an interval of about 42 μm by using the LED array 113. Although the light-receiving device 103 may be formed as an array type, but it is also possible to detect the image quality with one light-receiving device 103 if the length of the LED array 113 is relatively short as shown in the fourth embodiment. Thus, a low cost structure can be achieved when the LED array 113 having a short length is used.

Alignment direction of the LED array 113 can be the same as the moving direction of the image carrier such as the photoreceptor 61. In other words, the scan direction may be the same as the moving direction of the image carrier, or the LED array 113 may be disposed in a direction perpendicular to the moving direction of the image carrier, i.e. the scan direction may be the direction perpendicular to the moving direction of the image carrier. Further, two types of spotlight scanning may be concurrently used. That is, one of them is time division type spotlight scanning performed by turning on each LED of the LED array 113 based on the time division, and the other is spotlight scanning performed by moving the image carrier. Furthermore, the LED array 113 having almost the same length as the width of the image carrier may be disposed so as to detect the image quality over the whole area in the width direction of the image carrier.

In radiating the photoreceptor 61 with the spotlight SP, it is preferable that the wavelength of the spotlight SP is different from the spectral sensitivity wavelength range of the photoreceptor in order to prevent deterioration in the image quality due to damage of the electrostatic latent image caused by the spotlight SP.

The rest of the units, which are not particularly explained in the fourth embodiment, are formed in the same manner as the first and the second embodiments, and each unit functions in the same way as the first and the second embodiments.

A fifth embodiment of this invention will be explained below.

Figure 41:
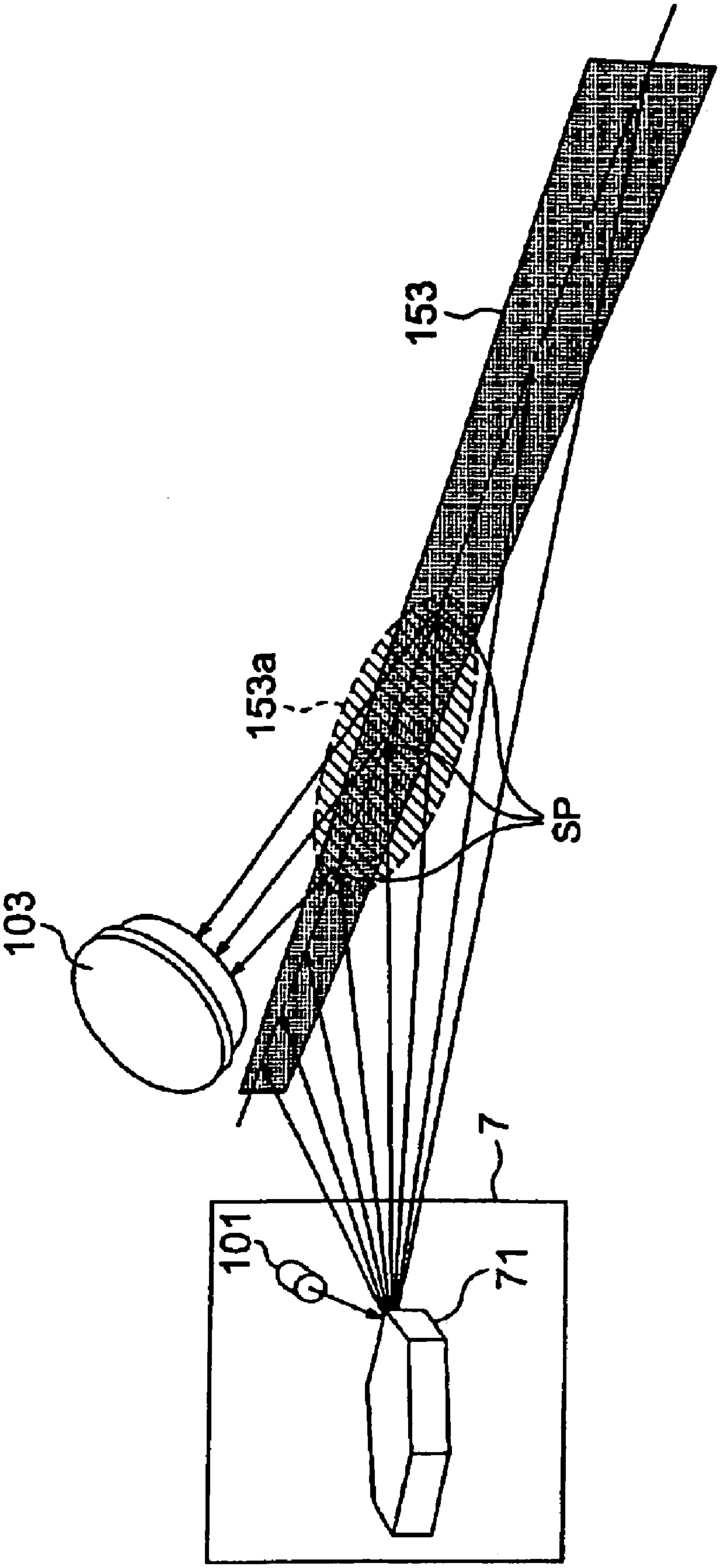
FIG. 41 shows a case in which it is possible to use a polygon mirror instead of the light-emitting device if a writing exposure unit in the image forming unit in FIG. 1 applies a polygon scan system using an LD source, according to a fourth embodiment of the present invention.

FIG. 41 is a schematic diagram of the optical system of an image quality measuring apparatus according to the fifth embodiment. In the image quality measuring apparatus of the fifth embodiment, a LD light source of a writing exposure device 7 in the image forming unit 1 (see FIG. 1) for the image forming apparatus equipped with the image quality measuring apparatus is used as the light source for the image quality detection shown in FIG. 6. In the example shown in FIG. 41, the writing exposure device 7, for the image forming apparatus equipped with the image quality measuring apparatus, employs a polygon scanning system using an LD light source. With this structure, in conducting ordinary image forming, the writing exposure device 7 irradiates the image carrier with the laser beam from the LD light source and writes a latent image on the image carrier. Meanwhile, in conducting the image quality detection, the image quality measuring apparatus scans an image pattern 153 formed on the image carrier, with the spotlight irradiated from the LD light source of the exposure device 7, and the photoelectric conversion element 103 receives lights reflected from the image pattern 153. Thus, the image quality measuring apparatus can measure image quality just like the first embodiment.

In the ordinary image forming process, the rotational speed of the polygon mirror 71 is extremely high, and therefore, the photoelectric conversion element 103 and the amplifier circuit 120 may not respond quickly enough to the element 103. To solve this problem, the image quality detection is conducted while the rotational speed of the polygon mirror 71 is low enough.

According to the fifth embodiment, it is possible to detect the image quality only by adding the photoelectric conversion element (light-receiving device) 103 to the ordinary image forming apparatus 6. Although it is not shown in FIG. 41, in an image forming apparatus equipped with an image forming unit that employs a writing exposing method with an LED array, the LED array can double as the light source for the image detection.

In the structure according to the fifth embodiment, only the detection of an analog halftone image pattern formed on the photoreceptor 61 is possible because the light source of the exposure device 7 is used for detection. Therefore, it is impossible to detect the deterioration in the image quality during the transfer process or the deterioration in the image quality of the digital image such as a dotted image. However, it is possible to take advantage of this limitation. That is, the graininess that appears in the analog halftone formed in the process can be identified as deterioration of the developer or deterioration of the photoreceptor, thus issuing a proper instruction to change the image forming conditions become easier.

The analog halftone image for detecting the image quality is formed using the image forming unit 1 shown in FIG. 1 by the following operation. That is, charging bias, transfer bias, and writing exposure are off, a developing potential (difference between the potential of the developing sleeve and the potential of the photoreceptor surface) is set lower than a developing potential when an ordinary solid image is being formed, the developing sleeve is rotated in the same direction as the direction when the ordinary image is formed, and the photoreceptor 61 is rotated in the reverse direction to the direction when the ordinary image is formed. By allowing the image forming unit 1 to work as mentioned above, while the analog halftone image pattern 153 for the detection is formed on the whole area in the width direction of the image carrier, the image pattern 153 can be conveyed to a section for detection of image quality. When the analog halftone image pattern is conveyed to the section, the photoreceptor 61 and developing sleeve are stopped driving. By the above-mentioned process, the forming of the image pattern is completed. Then, as shown in FIG. 41, the image quality detecting apparatus evaluates the graininess of the image by scanning the image pattern 153 for detection formed with the analog halftone image by the polygon mirror 71, and reading the lights reflected from the detection area 153*a* by the light-receiving device 103.

The rest of the units that are not particularly explained in the fifth embodiment are constituted in the same manner as the first and the second embodiments, and each unit functions in the same way as the first and the second embodiments.

It is needless to say that the detection of the image quality is possible not only when the special detection method as shown in FIG. 41 is employed, but also when the pattern images for detection in the first to third embodiments are used as the analog halftone images.

A sixth embodiment of this invention will be explained below.

This embodiment shows another example of the image quality measuring apparatus, and the same reference numerals are assigned to those corresponding to the units in the embodiments, and repeated explanations are omitted.

Each of FIG. 42 to FIG. 44 shows a sensor unit of the image quality measuring apparatus according to the sixth embodiment. Some examples of the structure of optical sensors to detect density of minute areas of the pattern will be explained below.

FIG. 42 is a side view of an example of a reflection type sensor used as an optical sensor to detect an image pattern formed on the image carrier. The reflection type sensor 1300 shown in FIG. 42 includes a sensor head 1301 in which a light-emitting unit 1302 and a light-receiving unit 1303 are integrated into one unit. The sensor 1300 is a regular reflection type optical sensor. The light emitted from the light-emitting unit 1302 of the sensor head 1301 is collected into a spotlight having a diameter of less than 0.5 mm on a medium to be measured (the image carrier 150) that carries a toner image, and the reflected light is detected by the light-receiving unit 1303. In FIG. 42, a regularly reflected light is detected, but it is also possible to detect diffused lights.

FIG. 43 is a side view of another example of a reflection type sensor used as an optical sensor to detect image patterns. The reflection type sensor 1310 shown in FIG. 43 includes a sensor amplifier 1311 accompanied with an optical fiber 1312 and a lens 1313. The sensor amplifier 1311 has a built-in light-emitting/light-receiving unit. The light emitted from the sensor amplifier 1311 passes through the optical fiber 1312 and is stopped down to a spot by the lens 1313, and the spot is collected into less than 0.5 mm in diameter on the medium to be measured (the image carrier 150). The light reflected from the medium is received by the lens 1313, passes through the optical fiber 1312, and is received by the light-receiving unit in the sensor amplifier 1311. In FIG. 43, a regularly reflected light is detected, but it is also possible to detect diffused lights.

FIG. 44 is a side view of an example of a through-beam sensor used as an optical sensor to detect an image pattern. The through-beam sensor 1320 shown in FIG. 44 includes a light-emitting unit 1321 and a light-receiving unit 1322 which are disposed across the transparent medium to be measured (the image carrier 150) from each other. The spotlight emitted from the light-emitting unit 1321 is initially stopped down to 0.5 mm in diameter. The spotlight is irradiated to the medium to be measured and passes through the medium while maintaining the same diameter, and the light having passed through the medium is detected by the light-receiving unit 1322. Therefore, when detected, the light is attenuated by a quantity that is blocked by the toner image (pattern image) on the medium to be measured.

FIGS. 45A to 45D comparatively show an example of the image pattern and also show output graphs when the image pattern is detected by three optical sensors having different detection areas. It is said that the density unevenness in a range of 2 cycle/mm to 3 cycle/mm becomes the most conspicuous to human visual sensitivity. Therefore, the optical sensor for detecting the image quality has to be able to detect the density unevenness in this range. FIG. 45A illustrates a pattern with 0.1 mm-wide longitudinal lines T in every 0.5 mm as typical density unevenness by 2 cycle/mm. FIG. 45B, FIG. 45C, and FIG. 45D are graphs of output patterns when the pattern is detected by spotlights having diameters of 0.5 mm, 0.4 mm, and 0.1 mm, respectively. In the image pattern shown in FIG. 45A, longitudinal lines indicated by alternate long and short dashed lines are additional lines indicating 0.1 mm.

Firstly, in the case the pattern is irradiated with the 0.5 mm-diameter spotlight, one of the 0.1 mm-wide longitudinal lines T is inevitably included within the spotlight when the pattern is scanned from left to right. However, the width of the lines inside the spotlight is always constant, and therefore, the output values are also constant as shown in FIG. 45B. Consequently, it is understood that the density unevenness cannot be measured with the spotlight having a diameter of 0.5 mm.

Secondly, in the case of 0.4 mm, if the image pattern is scanned from left to right likewise the first case, there is timing when the spotlight falls in just between the two longitudinal lines T. This timing refers to the output that becomes 0 in the graph of FIG. 45C. Before and after this timing is a range where the spotlight gradually leaves or rides on the line, and therefore this range is in a transient state in terms of output. As explained above, it is understood that significant output waveforms can be obtained by using the 0.4 mm-diameter spotlight. In the case of FIG. 45C in comparison with the case of FIG. 45B, we can understand that significant output waveforms is presumably obtained by using a spotlight having a diameter of less than 0.5 mm.

Furthermore, in the case of 0.1 mm, output waveforms that are closer to an original pattern in shapes can be obtained as shown in FIG. 45D. In principle, the smaller the spotlight diameter the closer output waveforms to the original pattern are obtained. However, it is technically difficult to make an optical sensor having an extremely small spotlight, and making such a small spotlight affects production cost. Therefore, it is impractical to stop down the diameter of the spotlight excessively.

Consequently, a spotlight having a diameter of less than 0.5 mm is used in the present invention. This spot allows significant information to be obtained from an image of 2 cycle/mm. As explained above, by using the 0.1 mm-diameter spotlight, output waveforms that are closer to the original pattern in shapes can be obtained. Therefore, it is presumed that a secured detection and cost effectiveness are compatible by using an optical sensor of which spotlight diameter is 0.1 mm or larger and smaller than 0.5 mm. In consideration of allowance, the diameter of the spotlight may be 50 μm (0.05 mm) or larger and smaller than 0.5 mm. By this setting, it becomes possible to detect the density unevenness of a minute area which is an area effective in correcting the "image roughness" with low cost and without using an expensive sensor capable of detecting the minute area in microns.

Figure 7:
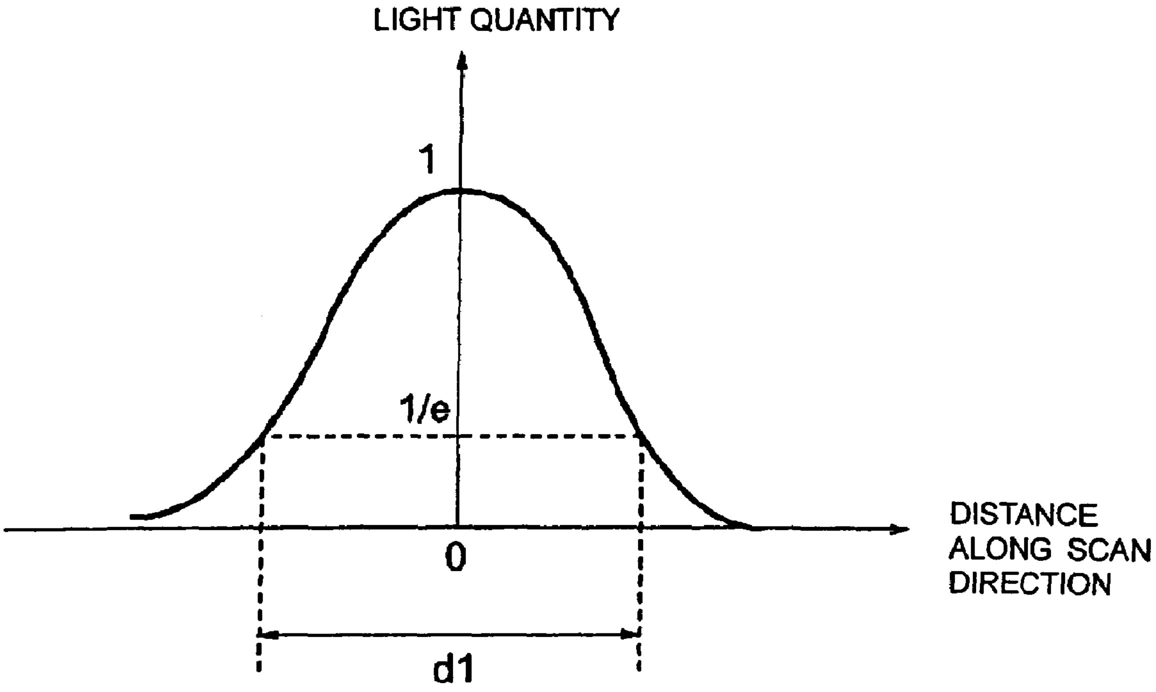
FIG. 7 shows a relationship between a distance (beam diameter) along a scan direction and light quantity.

Concerning the definition of the spotlight diameter, as explained in the first embodiment referring to FIG. 7, the diameter is defined as the "diameter in which the light quantity becomes 1/e of the maximum light quantity" which is a commonly used way of definition of a beam diameter. In order to obtain a precise diameter of a spotlight, it is necessary to measure the optical sensor using an external measuring apparatus such as a beam profiler. However, a simpler unit is conceivable as explained below. The unit is such that a flexible lens such as a fiberscope is used in a real apparatus to take into a personal computer (PC) the information of how the detection light of the optical sensor is collected, and the diameter of the spotlight is calculated using software.

FIG. 46 shows the positions where the optical sensors are disposed in the sixth embodiment. As described above, when the density of a minute area of the image pattern formed on the photoreceptor 61 is detected, an optical sensor is disposed at a position S1 between the developing unit 63 and a primary transfer area (the area where the photoreceptor 61 faces the transfer roller 66). As the optical sensor disposed at the position S1, the optical sensor 1300 shown in FIG. 42 and the optical sensor 1310 shown in FIG. 43 can be used. In the case of the optical sensor 1310, the lens 1313 may be disposed at the position S1. As the color image forming apparatus in the sixth embodiment is equipped with four color-image forming units, it is ideal to arrange the optical sensors on all the drum-shaped photoreceptors 61Y, 61M, 61C, and 61K of the image forming units. In FIG. 46, each triangle S1 indicates a position where the sensor is disposed, and an orientation indicated by the acute angle of the triangle is an orientation of a detecting surface of the sensor. Furthermore, each sensor may have sensitivity to a color used in corresponding image forming unit in which the sensor is disposed.

When the density of a minute area of the image pattern formed on the photoreceptor 61 is to be detected, the detected information of the image (pattern) includes information just after the image is visualized by giving the developer to the electrostatic latent image from the developing apparatus. In other words, it can be considered that the image pattern detected here reflects only influences exerted before the developing process. If there is no problem in the electrostatic latent image and problems concerning the quality of the image pattern are found from the information detected here, it is necessary to implement a counter measure by changing the developing conditions. When the density of a minute area of the image pattern formed on the photoreceptor 61 is detected, it is possible to improve or restore the image quality by controlling parameters of the developing conditions as a controlling object to feedback.

When the density of a minute area of the image pattern formed on the intermediate transfer belt 5 is to be detected, the optical sensor is disposed at a position S2 which is just after the primary transfer area in the image forming unit. As the optical sensor to be disposed at the position S2, the optical sensor 1300 shown in FIG. 42 and the optical sensor 1310 shown in FIG. 43 and the optical sensor 1320 shown in FIG. 44 can be used. The reflection type optical sensors 1300 and 1310 are disposed at positions S2 on the upper surface of the intermediate transfer belt 5 onto which a toner image is transferred in such a manner that the detecting surface of the sensor is directed toward a position indicated by the acute angle of the triangle S2. In the case of the through-beam optical sensor 1320, the intermediate transfer belt 5 is formed of a transparent belt, and the optical sensor 1320 is disposed so that the transparent belt is sandwiched between an upper unit and a lower unit of the optical sensor at the position S2. In this case, it does not matter whether the light-emitting unit 1321 of the optical sensor 1320 is disposed on the upper side or the lower side and the light-receiving 1322 is also disposed on the upper side or the lower side.

The color image forming apparatus of the sixth embodiment is equipped with four color-image forming units, and therefore it is ideal to dispose the optical sensor at a position just after the primary transfer area of each image forming unit. However, it is possible to dispose only one optical sensor at a position just after the primary transfer area of the image forming unit (the image forming unit of 61K in FIG. 46) of the last color (utmost downstream). In this case, one optical sensor has to detect the density unevenness of all colors. In such a constitution, the first (first color) image pattern is influenced by the image patterns of latter-stage colors, and the optical sensor itself needs to be sensitive to each color (to all toner colors). On the other hand, if the optical sensor is disposed correspondingly on each image forming unit, each optical sensor may be sensitive only to the color used in the image forming unit. Thus, it becomes technically easier and advantageously free from the influence of patterns of other colors because the density unevenness is detected before the primary transfer of the latter-stage is performed. On the other hand, the number of optical sensors is increased, which may cause an increase of the cost. Therefore, it is a matter of selection in each individual apparatus whether density unevenness of all colors is detected by one optical sensor detects or an optical sensor is disposed for each image forming unit.

When the density unevenness of a minute area of the image pattern formed on the recording paper 20 as an image carrier is to be detected, the optical sensor is disposed at a position S3 just after the secondary transfer area where a facing roller 51 a and the transfer roller 51 are in contact with each other. As the optical sensor to be disposed at the position S3, the optical sensor 1300 shown in FIG. 42, the optical sensor 1310 shown in FIG. 43, and the optical sensor 1320 shown in FIG. 44 can be used. The triangle S3 indicates the position where the sensor is disposed, and an orientation indicated by the acute angle of the triangle is an orientation of a detecting surface of the sensor.

Incidentally, photoreceptors have different sensitivity characteristics depending on each photoreceptor used in image forming apparatuses. Sensitivity characteristics of two types of photoreceptors are shown in FIG. 47 as a graph. In this graph, the horizontal axis indicates the wavelength (nm) and the vertical axis indicates the sensitivity (arbitrary unit). As explained above, the sensitivity characteristics are different depending on the photoreceptors, so it is common that each apparatus changes (sets) the wavelength of writing light in accordance with the photoreceptor adopted therein. In other words, the photoreceptors mounted on the image forming apparatus are generally used in the area where the sensitivity is high.

In a constitution that detects the density of the image pattern formed on the photoreceptor, if the optical sensor is to measure reflection density using the light within a sensitivity range of the photoreceptor, the light may disperse the electric charge on the photoreceptor. The sensor that detects the image pattern formed on the photoreceptor is disposed at the position S1 as shown in FIG. 46, that is, at the position downstream the position where developing is performed, and therefore it is hard to presume that the light erases the latent electrostatic image, resulting in abnormal image. However, it is conceivable that the light affects the electric charge underneath the developed toner image. In that case, holding power of the toner image decreases and the toner may scatter, resulting in deterioration of the image quality. Therefore, in adopting a constitution that detects the density of the image pattern formed on the photoreceptor, it is preferable to adopt an optical sensor that emits light having a wavelength that is out of the sensitivity range of the photoreceptor.

In FIG. 47, two photoreceptors having different sensitivities are explained, but it seems that the sensitivities of generally used photoreceptors have a tendency to decline toward the region of infrared. Therefore, if the wavelength in the region of infrared is adopted for the optical sensor, it may be considered that the wavelength is out of the sensitivity range of most kinds of photoreceptors. Thus, a sensor that emits light having a wavelength in the infrared region is adopted as the optical sensor used for detecting the density of the image pattern on the photoreceptor. By detecting the density of a minute area of the image pattern formed on the photoreceptor using the optical sensor with light having such a wavelength, it is possible to detect the density unevenness of the image formed on most photoreceptors without deteriorating the image quality.

In many cases, the intermediate transfer belt used for the image forming apparatus is formed by mixing carbon so as to allow the belt to have resistance that can carry the toner image, and is opaque black. It is, of course, possible to make the belt have some color other than black, and form the belt with a transparent material. FIG. 48 illustrates a red image pattern Pt-red formed on the opaque black intermediate transfer belt 5, and how to radiate the Pt-red with a white light or a light that includes red component. The intermediate transfer belt 5 is opaque black at least in the area that carries the image pattern.

As shown in FIG. 48, if the red image pattern Pt-red is irradiated with the white light or the light that includes red component (illustrated by a chain double-dashed line in FIG. 48), the Pt-red pattern reflects light with the red component though the surface of the belt 5 does not reflect the light. If there is density unevenness in the red pattern, it is possible to detect the density unevenness since the output of the optical sensor fluctuates in accordance with fluctuated intensity of the reflected light component. This detection is possible because the red component of the reflected light decreases in the parts where the image density is low due, to the influence of "black" of a base material (belt). Although red is taken up as an example to explain here, the idea explained above can be applied to other colors (when the image pattern of other color is irradiated with the light that includes the same color component as the image pattern or with the white light). In FIG. 48, the explanation is given with the case of detecting a regularly reflected light, but it is also possible to detect diffused lights.

As explained above, when the color of the base material that carries the image pattern is black, the light emitted from the sensor does not reflect, as black absorbs the light. Therefore, if the image pattern is irradiated with the light having a wavelength in the visible region, the quantity of reflected light becomes almost zero. Therefore, for detecting the image pattern formed on the black base material, it is necessary to choose an optical sensor using light having a wavelength such that the light reflected from the image pattern (toner image) can be detected. In other words, if the light having the same wavelength as the image pattern is used, the light reflected from the image pattern will effectively return from the image pattern. Thus, it becomes possible to effectively detect the density unevenness of the image pattern by adopting an optical sensor capable of emitting a light of the same wavelength as the color of the image pattern or a light that includes the same wavelength thereof.

FIG. 49 illustrates a cyan image pattern Pt-cyan formed on the intermediate transfer belt 5 that is opaque white, and illustrates how the image pattern is irradiated with a light including red light that is a complementary color of cyan. The intermediate transfer belt 5 is opaque white at least in the area that carries the image pattern. As shown in FIG. 49, when the cyan image pattern Pt-cyan is irradiated with the light that includes red light, the image pattern Pt-cyan absorbs the light of the red region and only lights of wavelength other than the red region returns, though the surface of the white belt 5 reflects the light of whole wavelength region. The influences of the white belt as the base material differ depending on the density of the image pattern, and therefore, if lightly colored cyan is provided on the image pattern, the red component reflected on the base material returns from the pattern, too. Thus, it is possible to detect the density of the image pattern based on the intensity of the reflected light of the red (a complementary color) component. The detection is possible if the light from the optical sensor includes a complementary color component. However, needless to say, it is the easiest to detect the pattern with a light composed of the complementary color component only. Although the cyan-colored pattern and light that includes a complementary (red) color of cyan are taken up as an example to explain here, the idea explained above can be applied to other colors (when the image pattern of other toner color is irradiated with the light that includes the complementary color of the other toner color). In FIG. 49, the explanation is given with the case of detecting a regularly reflected light, but it is also possible to detect diffused lights.

As explained above, in the case the base material that carries the image pattern is white, lights of all band are reflected if the base material is irradiated with the light in the visible region. As a result, if a light is also reflected from the pattern, it is impossible to distinguish the base material from the pattern. Therefore, the light having a wavelength in a range where light is not reflected from or transmits through toner particles is used so as to be capable of detecting the density of the image pattern based on how the image pattern blocks the light reflected from the base material. In other words, in the case the base material is white; it is possible to detect the density unevenness of the image pattern, by adopting the emission wavelength of a complementary color of the color of the toner image to be measured or the emission wavelength that includes the complementary color.

Meanwhile, as the intermediate transfer belt 5, it is possible to use any material of a particular color other than white or black. In this case, if the image pattern of color that is the same as the color of the belt 5 is formed, detection of the image pattern density becomes naturally difficult. However, it can be said that the color of the intermediate transfer belt 5 will never be identical with one of the three toner colors (cyan, magenta, or yellow). Therefore, when a particular color is used for the intermediate transfer belt 5, it is necessary to use a light with a wavelength that can get enough reflection from the intermediate transfer belt 5 or a light with a wavelength that can get no reflection at all, in order to effectively detect the light reflected from the image pattern formed on the belt. In the former case, any color is determined so that the pattern image formed on the intermediate transfer belt 5 blocks the light reflected from the intermediate transfer belt 5 to reduce the quantity of the light reflected from the intermediate transfer belt 5. In the latter case, the light having a wavelength that does not reflect from the intermediate transfer belt 5 is used, and therefore any color is determined so that the image pattern reflects the light having the wavelength.

The example shown in FIG. 50 is used to explain the constitution of the former case, in which the intermediate transfer belt 5 that is an opaque particular color is used. FIG. 5 is a schematic diagram of how to use an optical sensor with a light having a wavelength in which reflection is obtained from the intermediate transfer belt 5. This intermediate transfer belt 5 is formed in such a way that at least the area that carries the image pattern is an opaque particular color.

As an example of the former case, assuming that the intermediate transfer belt 5 is opaque green, and the image pattern is magenta, the light radiated from an optical sensor (not shown) has a wavelength of green or a wavelength region close to green. The green light radiated from the optical sensor is reflected efficiently on the green intermediate transfer belt 5 and the reflected light quantity becomes the maximum. However, no reflected light is obtained from the magenta-colored pattern Pt-magenta of which color is a complementary color of green. In addition, if the solid density of magenta-colored pattern is high, the light reflected from the intermediate transfer belt 5 is completely blocked, as a result, the reflected light quantity becomes the minimum. If the image pattern becomes lighter in color, the green color as the base material start to influence and the reflected light quantity is getting increased. Thus, if there is a density variation in the image pattern, the detection of the density variation becomes possible. If the color of the pattern is not magenta, the pattern density can be detected for the same reason, though the output of the sensor becomes lower. However, as the green component increases in the pattern color, the possibility of not being able to detect the pattern increases.

The explanation is given here using green set as the particular color of the belt, emission color of the optical sensor set as light having a wavelength in a region of green or closer to green, and also using color of the pattern image set as magenta that is a complementary color of green. The case that the belt is any other particular color can be also coped with in the same way as explained above. In FIG. 50, the explanation is given with the case of detecting a regularly reflected light, but it is also possible to detect diffused lights.

An example shown in FIG. 51 is used to explain the constitution of the latter case, in which the intermediate transfer belt 5 of an opaque particular color is used. FIG. 51 is a schematic diagram of how an optical sensor with a light having a wavelength that does not reflect from the intermediate transfer belt 5 is used. This intermediate transfer belt 5 is formed in such a way that at least an area that carries an image pattern is an opaque particular color. As an example, assume that the intermediate transfer belt 5 is opaque green, and the optical sensor adopts light having the emission wavelength in a region of a complementary color of green or in a region close to the complementary color (in this case magenta). The image pattern is formed with magenta as the complementary color of green. In the example shown in FIG. 51, colors of the belt and the image pattern are the same as those of FIG. 50, but the emission color of the optical sensor is different.

In the example shown in FIG. 51, the magenta light radiated from the optical transfer belt is not reflected on the green intermediate transfer belt 5 at all, and the reflected light quantity becomes the minimum. On the other hand, the magenta light is reflected efficiently on the magenta-colored pattern Pt-magenta of which solid density is high, and the reflected light quantity becomes the maximum. If the image pattern becomes lighter in color, the green color as the base material start to influence gradually and the reflected light quantity is getting decreased. Thus, if there is a density variation in the image pattern, the detection of the pattern becomes possible. In the case the color of the pattern is not magenta, the detection of the pattern density also becomes possible for the same reason, though the output of the sensor becomes lower. However, the possibility that the detection may not be possible is increased as the green component is increased in the pattern color.

The explanation is given here using green set as the particular color of the belt, emission color of the optical sensor set as light having a wavelength in a region of magenta or closer to magenta, and also using color of the pattern image set as magenta that is the complementary color of green. However, the case that the color of the belt is any other particular color can be also coped with in the same way as explained above. In FIG. 51, the explanation is given with the case of detecting a regularly reflected light, but it is also possible to detect diffused lights.

FIG. 52 is a schematic of how the density of the pattern is detected by the through-beam sensor when the intermediate transfer belt 5 is transparent. This intermediate transfer belt 5 is formed in such a way that at least an area that carries the image pattern is transparent. As an example, assume that the color of the image pattern is cyan, and the emission color of the optical sensor includes red which is the complementary color of cyan. As shown in FIG. 52, if the cyan-colored image pattern Pt-cyan is irradiated with a light including red light from the light-emitting unit 321, the light of all wavelength region transmits through the area of transparent belt 5. On the other hand, the light of the red band is absorbed by the area of the cyan-colored pattern, thus, the light cannot pass through the area. Therefore, the light-receiving unit 322 detects only the light of wavelength of other than red. In the case that the pattern is lighter in color, the light in the red band that cannot be absorbed by the pattern is passed through the pattern, and therefore the light-receiving unit 322 can detect some amount of red light. Thus, it is possible to detect the density of the cyan-colored image pattern with intensity of the transmitted light of the red component that is the complementary color of the pattern color. Although it is possible to detect the density of the pattern as far as the light to be emitted includes a complementary color component of the pattern color, it is needless to say that a light composed of only the complementary color is detected most easily. Cyan as the image pattern and red as emission-light color of the optical sensor are taken up for the explanation, but the case that the image pattern is any other color can be also coped with in the same way as explained above.

FIG. 53 is a schematic of how the density unevenness of the image pattern formed on the recording medium is detected. As a recording medium (paper) is usually white, emission wavelength of the reflection type optical sensor includes a region of a complementary color of the pattern image color to be detected or a region closer to the complementary color. The way of thinking is exactly the same as the case of the white (opaque) intermediate transfer belt explained in FIG. 49. As the white-colored recording paper 20 reflects the light in the visible region over the whole region, an emission wavelength of the light that is not reflected on the image pattern to be detected should be chosen from the region. That is, the emission wavelength of a complementary color of an image pattern is chosen for the optical sensor. For example, if the image pattern Pt is cyan-colored, the emission wavelength of the light from the optical sensor should be red. Thus, the reflected light quantity can be controlled to the minimum. If the solid density of the image pattern is high enough, the reflected light quantity from the image pattern becomes the minimum. If the density of the image pattern becomes lighter in color, the light reflected from the recording medium as the base material start to influence and the reflected light quantity is getting increased. Thus, it is possible to detect the density of the image pattern Pt.

Incidentally, concerning the optical sensor that detects the image pattern formed on the recording medium, it is all right to install an exclusive sensor for a pattern of individual toner color may be disposed one by one, or only one optical sensor may be disposed so as to be shared with patterns of toner colors. In the case that only one optical sensor is disposed, it is reasonable to choose the white light as an emission wavelength of the optical sensor because the white light also includes the complementary colors of the toner colors. In FIG. 53, the explanation is given with the case of detecting a regularly reflected light, but it is also possible to detect diffused lights.

According to the sixth embodiment, the unit that detects the density unevenness of the image pattern is the optical sensor of which detection area is less than 0.5 mm in diameter, and therefore it is possible to detect the density unevenness of the minute area with low cost. Thus, it is possible to prevent the roughness of the image from occurring based on the result of the detection.

Other units that are not particularly explained in the sixth embodiment are constituted in the same manner as the first embodiment, and each unit functions in the same way as the first embodiment.

As explained above, if the optical sensor having an emission wavelength that is out of the sensitivity region of the photoreceptor is used, the photoreceptor is not exposed during the detection of the image pattern and the image on the photoreceptor is prevented from being disturbed.

Further, if the optical sensor having an emission wavelength that is an infrared region is used, the photoreceptor is not exposed during the detection of the image pattern and the image on the photoreceptor is prevented from being disturbed.

Moreover, when the intermediate transfer body is opaque black, it is possible to securely detect the density unevenness of the image pattern on the opaque black intermediate transfer body by using the reflection type optical sensor having an emission wavelength in a region of the same color as color of the image pattern, close to the color of the image pattern, or a region including the color of the image pattern.

Furthermore, when the intermediate transfer body is opaque white, it is possible to securely detect the density unevenness of the image pattern on the opaque white intermediate transfer body by using the reflection type optical sensor having an emission wavelength in a region of a complementary color of a color of an image pattern, close to the complementary color, or a region including the complementary color.

When the intermediate transfer body is an opaque particular color, it is possible to securely detect the density unevenness of the image pattern on the opaque particular color intermediate transfer body by using the reflection type optical sensor having an emission wavelength in a region of the same color as the particular color or close to the particular color.

When the intermediate transfer body is an opaque particular color, it is possible to securely detect the density unevenness of the image pattern on the opaque particular color intermediate transfer body by using the reflection type optical sensor having an emission wavelength in a region of a complementary color of the particular color or close to the complementary color of the particular color.

Furthermore, when the intermediate transfer body is transparent, it is possible to securely detect the density unevenness of the image pattern on the transparent intermediate transfer body by using the through-beam type optical sensor having an emission wavelength in a region of a complementary color of a color of an image pattern, close to the complementary color, or a region including the complementary color.

A seventh embodiment of this invention will be explained below.

In the sixth embodiment, the image pattern on one of the next three image carriers is detected, namely, on the drum-shaped photoreceptor 61, on the intermediate transfer belt 5, or on the recording paper 20. In the seventh embodiment, however, image patterns on a plurality of the image carriers are detected. In other words, the image patterns on both the photoreceptor 61 and the intermediate transfer belt 5 are detected, and pieces of detected information are compared to correct image forming conditions.

The detected information for the image pattern from the image pattern formed on the intermediate transfer belt 5 is the information after the primary transfer which is the transfer from the photoreceptor 61 to the intermediate transfer belt 5. Therefore, a disturbance due to the primary transfer process is added to the information. Therefore, it is possible to determine a deterioration quantity caused during the primary transfer process by comparing information detected from the image pattern formed on the intermediate transfer belt 5 with information, as information one step before, detected from the image pattern formed on the photoreceptor 61. In other words, in the seventh embodiment, parameters for the primary transfer conditions are corrected so as to minimize the quantity of image deterioration during the primary transfer process obtained by comparing the information of the image pattern detected from the photoreceptor 61 with the information of the image pattern detected from the intermediate transfer belt 5.

In regard to positions where the optical sensors for detecting the image patterns in the seventh embodiment are disposed, the sensors may be disposed at the same positions as those of S1 and S2 shown in FIG. 46. In the image forming apparatus equipped with a plurality of the image forming units as this example, it is possible to minimize the deterioration quantity due to the primary transfer process in each of the image forming units, by comparing the information for the image pattern detected from the photoreceptor 61 with the information for the image pattern detected from the intermediate transfer belt 5 in each units.

The other units that are not particularly mentioned in the seventh embodiment are constituted in the same manner as the first embodiment, and each unit functions in the same way as the first embodiment.

As explained above, according to the seventh embodiment, the detecting unit compares the detected outputs of the image pattern before and after the primary transfer process, and therefore it is possible to determined the quantity of image deterioration during the primary transfer process. By controlling the image forming conditions so as to minimize the deterioration quantity, it is possible to obtain a high quality output image.

An eighth embodiment of this invention will be explained below.

In the seventh embodiment, the image patterns are detected on the photoreceptor 61 and the intermediate transfer belt 5, and the image forming conditions are corrected by comparing the detected pieces of information. In the eighth embodiment, however, the image patterns are detected on the intermediate transfer belt 5 and the recording medium (recording paper 20), and the image forming conditions are corrected by comparing the detected pieces of information.

The information of the image pattern detected from the image pattern formed on the recording medium, which is the recording paper 20, is the information after the secondary transfer process (the transfer from the intermediate transfer belt 5 to the recording paper 20) is performed. Therefore, a disturbance due to the secondary transfer process is added to the information. Therefore, it is possible to determine the deterioration quantity of the image caused during the secondary transfer process by comparing information detected from the image pattern formed on the recording paper 20 with information, as information one step before, detected from the image pattern formed on the intermediate transfer belt 5. In other words, in the eighth embodiment, parameters for conditions of the secondary transfer process are corrected so as to minimize the deterioration quantity during the secondary transfer process obtained by comparing the information of the image pattern detected from the intermediate transfer belt 5 with the information detected from the recording paper 20.

In regard to positions where the optical sensors for detecting the image patterns in the eighth embodiment are disposed, the sensors may be disposed at the same positions as those of S2 and S3 shown in FIG. 46. In the case of comparing image patterns with each color, each optical sensor is disposed at the position S2 of the plural image forming units, and another sensor that corresponds to a color of each pattern is disposed at the position S3 or one optical sensor for sharing is disposed at the position S3. In the case of comparing image patterns with representative color, an optical sensor may be disposed at the position S2 where one of the plural image forming units is disposed, and an optical sensor corresponding to the color used in the unit may be disposed at the position S3. However, In the case of comparing image patterns with representative color, it is preferable to use the image forming unit disposed at the most downstream position in the units, that is, as close as possible to the secondary transfer position.

Each optical sensor to be used in the eighth embodiment may be selected properly in accordance with the color of the intermediate transfer belt 5 and the color of the image pattern in the same manner as that in the examples explained in FIGS. 48 to 53.

The other units that are not particularly mentioned in the eighth embodiment are constituted in the same manner as the first embodiment, and each unit functions in the same way as the first embodiment.

As explained above, according to the eighth embodiment, the detecting unit compares the detected outputs of the image patterns before and after the secondary transfer process, and deterioration quantity of the image during the secondary transfer process can be determined based on the comparison. Thus, it is possible to obtain a high quality output image by controlling the image forming conditions so as to minimize the deterioration quantity.

A ninth embodiment of this invention will be explained below.

An image forming method including image quality control according to the ninth embodiment will be explained below. FIG. 54 shows a relationship between the average toner adhesion quantity (the average image density) D of an image to be formed and the graininess index (the information on the density unevenness) C, when the image forming method including the image quality control of the ninth embodiment is implemented. As the sensors and the other units that are not particularly mentioned in this embodiment are constituted in the same manner as the first embodiment, repeated explanations are omitted.

In FIG. 54, a grid indicated by broken lines shows, with regard to the image pattern to be detected, how the graininess index C and the average toner adhesion quantity D change when the developing bias potential and the developer toner density are changed, in a state when the apparatus is shipped. As shown in FIG. 54, it is found that the average toner adhesion quantity increases as the developing bias increases, and the graininess also becomes larger at the same time. Further, it is found that the average toner adhesion quantity increases as the toner density increases, but the graininess becomes smaller. In other words, it is possible to control the average toner adhesion quantity and the graininess independently and optionally by properly controlling the developing bias and the toner density.

For example, in this image forming apparatus MFP, the developing bias is set to 325V and the toner density is set to 3.25 wt % when the apparatus is shipped. It is assumed that it is detected that the graininess index and the average toner adhesion quantity become "state $\alpha$1" shown in FIG. 54 as the result of the deterioration of the developer because the apparatus MFP is continuously used if the settings of the developing bias of 325V and the toner density of 3.25 wt % are maintained as they are. In the ninth embodiment, the focus is put on the fact that the average toner adhesion quantity and the graininess can be controlled independently and optionally by controlling the developing bias and the toner density properly. When the deterioration of the image quality is detected as mentioned above, the control circuit CON controls (process a1) the image forming conditions to increase the developing bias since the average toner adhesion quantity has decreased and moves the state to the "state β1". At this stage, the developing bias is changed from 325V to 360V. At the next step, the control circuit CON controls to change the toner density from 3.25% to 5.0% (process b1), thus the condition can be restored to the state when the apparatus is shipped. As explained above, by properly controlling both the developing bias and the toner density, it is possible to restore the graininess and the average toner adhesion quantity that have fluctuated due to the deterioration of the developer to the state when the apparatus is shipped.

A tenth embodiment of this invention will be explained below.

FIG. 55 shows a relationship between the average toner adhesion quantity D and the graininess index C, when the image forming method including the image quality control according to the tenth embodiment is implemented. As the sensors and the other units that are not particularly mentioned in this embodiment are constituted in the same manner as the first embodiment, repeated explanations are omitted.

In FIG. 55, a grid indicated by broken lines shows, with regard to the image pattern to be detected, how the graininess index C and the average toner adhesion quantity D change when the developing bias potential and the developing gap are changed in the state when the apparatus is shipped. As shown in FIG. 55, it is found that the average toner adhesion quantity increases as the development bias increases and the graininess also becomes larger at the same time. Further, it is found that the average toner adhesion quantity increases as the developing gap narrows but the graininess becomes smaller. In other words, by properly controlling the developing bias and the developing gap, it is possible to control the average toner adhesion quantity and the graininess independently and optionally.

For example, in this image forming apparatus MFP, the developing bias is set to 325V and the developing gap is set to 0.475 mm when the apparatus is shipped. It is assumed that it is detected that the graininess index and the average toner adhesion quantity have become "state α1" shown in FIG. 55 as the result of the deterioration of the developer because the apparatus is continuously used if settings of the developing bias of 325V and the developing gap of 0.475 mm are maintained as they are. In the tenth embodiment, the focus is put on the fact that the average toner adhesion quantity and the graininess can be controlled independently and optionally by controlling the developing bias and the developing gap properly. When the deterioration of the image quality is detected as mentioned above, the control circuit CON controls (process a1) the image forming conditions to increase the developing bias since the average toner adhesion quantity has decreased and moves the state to the "state β1". At this stage, the developing bias is changed from 325V to 360V. At the next step, the control circuit CON controls to change the developing gap from 0.475 mm to 0.4 mm (process b1), thus the condition is restored to the state when the apparatus is shipped. As explained above, by properly controlling both the developing bias and the developing gap, it is possible to restore the graininess and the average toner adhesion quantity that have fluctuated due to the deterioration of the developer to the conditions when the apparatus is shipped.

An eleventh embodiment of this invention will be explained below.

FIG. 56 shows a relationship between the average toner adhesion quantity D and the graininess index C, when the image forming method including the image quality control according to the eleventh embodiment is implemented. As the sensors and the other units that are not particularly mentioned in this embodiment are constituted in the same manner as the first embodiment, repeated explanations are omitted.

In FIG. 56, a grid indicated by broken lines shows, with regard to the image pattern to be detected, how the graininess index C and the average toner adhesion quantity D change when the developing bias potential and the adhesion quantity of the developer on the developing roller per unit area (hereinafter, "pump-up quantity") are changed in the state when the apparatus is shipped. As shown in FIG. 56, it is found that the average toner adhesion quantity increases as the developing bias increases, and the graininess also becomes larger at the same time. Further, it is found that the average toner adhesion quantity increases as the pump-up quantity increases, but the graininess becomes smaller. In other words, by properly controlling the developing bias and the pump-up quantity, it is possible to control the average toner adhesion quantity and the graininess independently and optionally.

For example, in this image forming apparatus MFP, the developing bias is set to 325V and the pump-up quantity is set to 61.5 mg/cm$^2$ when the apparatus is shipped. It is assumed that it is detected that the graininess index and the average toner adhesion quantity have become "state α1" shown in FIG. 56 as the result of the deterioration of the developer because the apparatus is continuously used if the settings of the developing bias 325V and the pump-up quantity 61.5 mg/cm$^2$ are maintained as they are. In the eleventh embodiment, the focus is put on the fact that the average toner adhesion quantity and the graininess can be controlled independently and optionally by controlling the developing bias and the pump-up quantity properly. When the deterioration of the image quality is detected as mentioned above, the control circuit CON controls (process a1) the image forming conditions to increase the developing bias since the average toner adhesion quantity has decreased and moves the state to the "state β1". At this stage, the developing bias is changed from 325V to 360V. At the next step, the control circuit CON controls to change the pump-up quantity from 61.5 mg/cm$^2$ to 70 mg/cm$^2$ (process b1), thus the condition is restored to the state when the apparatus is shipped. As explained above, by properly controlling both the developing bias and the pump-up quantity, it is possible to restore the graininess and the average toner adhesion quantity that have fluctuated due to the deterioration of the developer to the conditions when the apparatus is shipped.

A twelfth embodiment of this invention will be explained below.

FIG. 57 shows a relationship between the average toner adhesion quantity D and the graininess index C, when the image forming method including the image quality control according to the twelfth embodiment is implemented. As the sensors and the other units that are not particularly mentioned in this embodiment are constituted in the same manner as the first embodiment, repeated explanations are omitted.

In FIG. 57, a grid indicated by broken lines shows, with regard to the image pattern to be detected, how the graininess index C and the average toner adhesion quantity D change when the developing bias potential and the developing bias alternating component are changed in the state when the apparatus is shipped. As shown in FIG. 57, it is found that the average toner adhesion quantity increases as the development bias increases, and the graininess also becomes larger at the same time. Further, it is found that the average toner adhesion quantity increases as the developing bias alternating components increases, but the graininess becomes smaller. In other words, by properly controlling the developing bias and the developing bias alternating component, it is possible to control the average toner adhesion quantity and the graininess independently and optionally.

For example, in this image forming apparatus MFP, the developing bias is set to 325V and the developing bias alternating component is set to 1.15 kVp-p when the apparatus is shipped. It is assumed that it is detected that the graininess index and the average toner adhesion quantity have become "state α1" shown in FIG. 57 as the result of the deterioration of the developer because the apparatus is continuously used when the settings of the developing bias of 325V and the developing bias alternating component of 1.15 kVp-p are maintained as they are. In the twelfth embodiment, the focus is put on the fact that the average toner adhesion quantity and the graininess can be controlled independently and optionally by controlling the developing bias and the developing bias alternating component properly. When the deterioration of the image quality is detected as mentioned above, the control circuit CON controls (process al) the image forming conditions to increase the developing bias since the average toner adhesion quantity has decreased and moves the state to the "state β". At this stage, the developing bias is changed from 325V to 360V. At the next step, the control circuit CON controls to change the developing bias alternating components from 1.15 kVp-p to 2.0 kVp-p (process b1), thus the condition is restored to the state when the apparatus is shipped. As explained above, by properly controlling both the developing bias and the developing bias alternating component, it is possible to restore the graininess and the average toner adhesion quantity that have fluctuated due to the deterioration of the developer to the conditions when the apparatus is shipped.

A thirteenth embodiment of this invention will be explained below.

An image forming method including the image quality control according to the thirteenth embodiment will be explained. The image forming method employs both controls in the process b1 by the increase of linear velocity of the developing roller and the increase of the toner density in the first embodiment shown in FIG. 21 and in the ninth embodiment shown in FIG. 54. It is assumed that the condition is in "state x1" when the apparatus is shipped under the conditions of the developing bias 325V, the linear velocity ratio of developing roller 1.25, and the toner density 3.25, but the condition is changed to "state α1" as the result of the deterioration of the developer because the apparatus is continuously used. It is possible to restore the state to the "state x1" if the control circuit CON controls so as to change the conditions as follows, that is, the developing bias: 360V, the linear velocity ratio of developing roller: 1.6, and the toner density: 5.0. As explained above, by combining a plurality of control units having similar functions (increasing the linear velocity ratio of developing roller and increasing the toner density here), it is possible to reduce the amount of change in the control units, which is advantageous.

It is needless to say that not only the combination of the increasing of the linear velocity ratio of the developing roller and the increasing of the toner density but also every conceivable combination become effective. As the sensors and the other units that are not particularly mentioned in this embodiment are constituted in the same manner as the first embodiment, repeated explanations are omitted.

A fourteenth embodiment of this invention will be explained below.

FIG. 58 shows a relationship between the average toner adhesion quantity D and the graininess index C, when the image forming method including the image quality control according to the fourteenth embodiment is implemented. As the sensors and the other units that are not particularly mentioned in this embodiment are constituted in the same manner as the first embodiment, repeated explanations are omitted.

In FIG. 58, a grid indicated by broken lines shows, with regard to the image pattern to be detected, how the graininess index C and the average toner adhesion quantity D change when the potential of the electrostatic latent imaging unit and the ratio of the linear velocity of the developing roller to the linear velocity of the photoreceptor are changed in the state when the apparatus is shipped. As shown in FIG. 58, it is found that the average toner adhesion quantity increases as the potential of the imaging unit decreases, and the graininess also becomes larger at the same time. Further, it is found that the average toner adhesion quantity increases as the linear velocity of the developing roller increases, but the graininess becomes smaller. In other words, it is possible to control the average toner adhesion quantity and the graininess independently and optionally by properly controlling the potential of the imaging unit and the linear velocity of the developing roller.

For example, in this image forming apparatus MFP, the potential of the imaging unit is set to 85V and the linear velocity of the developing roller is set to 1.3 when the apparatus is shipped. It is assumed that it is detected that the graininess index and the average toner adhesion quantity is changed to "state α0" shown in FIG. 58 as the result of the deterioration of the developer because the apparatus is continuously used if the settings of the potential of the imaging unit of 85V and the linear velocity of the developing roller of 1.3 are maintained as they are.

In the fourteenth embodiment, the focus is put on the fact that the average toner adhesion quantity and the graininess can be controlled independently and optionally by properly controlling the potential of the imaging unit and the linear velocity of the developing roller. At first, the control circuit CON controls so as to increase the potential of the imaging unit (process a0) and moves the state to the "state β0". At this stage, the potential of the imaging unit is changed from 85V to 100V. At the next step, the control circuit CON changes the linear velocity ratio of the developing roller from 1.3 to 1.6 (process b0), and thereby enables restoration of the deteriorated state to the state when the apparatus is shipped. As explained above, by properly controlling both the potential of the latent imaging unit and the linear velocity ratio of the developing roller, it is possible to restore the graininess and the average toner adhesion quantity that have fluctuated due to the deterioration of the developer to the conditions when the apparatus is shipped.

A fifteenth embodiment of this invention will be explained below.

FIG. 59 is a schematic diagram of an image forming unit in an image forming apparatus according to the fifteenth embodiment. This embodiment is an example which employs one-component developing process in which the developing roller contacts the photoreceptor. The same reference numerals are assigned to those equivalent to the units shown in FIG. 1 and FIG. 8 in which the two-component developing process is employed, and repeated explanations are omitted.

In the fifteenth embodiment, only the developing unit 63 is different from the example of FIG. 1 or FIG. 8, and the other units are constituted the same as the example shown in FIG. 8. In FIG. 59, Y, M, C, and K indicate stations of the individual color, and reference numerals are assigned to only the Y station. Although not shown, the same reference numerals are assigned to the other stations. In FIG. 59, the developing unit 63 is a general constitution of the one-component developing process, and includes a toner charging roller 63*b* and a developing roller 63*c* in a toner tank 63*a*, and a metering blade 63*d* is disposed on the outer circumference of the developing roller 63*c* so as to be in contact with the developing roller 63*c* through a toner layer.

Assume that, in the image forming apparatus that develops an image through one-component developing process in which the developing roller 63*c* is in contact with the photoreceptor 1, the state of the initial image shown in FIG. 3 has changed to the state of the image shown in FIG. 4 due to the deterioration of the toner. As changes of the image forming conditions in order to restore the image shown in FIG. 4 to the image shown in FIG. 3, changes of the following control conditions mentioned in the first embodiment will be effective to improve the unevenness of the image density. For example, the developing condition includes:

(2) To increase a rotational speed of the developing roller.
(5) To increase the amplitude of voltage and frequency of vibration of an alternating bias component applied on the developing roller (Only when the alternating bias is superposed).
(8) To polish the surfaces of the photoreceptors.
(9) To consume the deteriorated toner and supply new toner.

In addition, as controlling factors peculiar to the contact one-component developing process, (10) to lower the contact pressure of the metering blade (to increase the toner adhesion quantity on the developing roller) is effective.

Although the image density unevenness is improved if the change of the developing conditions such as (2), (5), (8), (9), and (10) are implemented, the average image density increases at the same time. If this occurs, by using the controls of the developing potential such as a) to change the absolute value of the average developing bias
b) to change the absolute value of the potential of the imaging unit on the photoreceptor, it is possible to restore the conditions to the target average image density and image density unevenness, which is the same manner as that in the first embodiment, the automatic control in the first embodiment, the twelfth embodiment, and the fourteenth embodiment. Assuming that, in the eleventh embodiment, the "adhesion quantity of the developer on the developing roller" in the eleventh embodiment is the "adhesion quantity of the toner", it is possible to constitute from the two-component developing process as the one-component developing process. Therefore, it is possible to apply the eleventh embodiment to the case of the contact one-component developing process. Furthermore, in order to decrease the contact pressure of the metering blade of (10), a unit for moving the metering blade relative to the developing roller may be provided and the metering blade may be moved by this unit.

The other units that are not particularly mentioned in this embodiment are constituted in the same manner as the first embodiment, so repeated explanations are omitted.

When the process of "consuming the deteriorated toner and supplying new toner" in (9) mentioned above is implemented, the developer storage unit 330 and the disposed developer storage unit 390 shown in FIG. 25 may be omitted because the process is the one-component type, and the toner may be supplied from the toner storage unit 350. The disposed toner is stored in an ordinary disposed toner tank. In this case, in the processing shown in FIG. 27, the processing at step 25 and step 26 are omitted from the routine.

A sixteenth embodiment of this invention will be explained below.

FIG. 60 is a schematic diagram of an image forming unit in an image forming apparatus according to the sixteenth embodiment. This embodiment is an example which employs a so-called non-contact one-component developing process in which the developing roller does not contact the photoreceptor. In the sixteenth embodiment, the units are constituted the same as the example shown in FIG. 59 except that the developing roller 63 does not contact the photoreceptor 61. Therefore, the same reference numerals are assigned to those equivalent to the units shown in FIG. 59, and the repeated explanation is omitted.

In the image forming apparatus that develops an image through the one-component developing process in the state where the developing roller 63 does not contact the photoreceptor 61, the state of the initial image shown in FIG. 3 has changed to the state of the image shown in FIG. 4 due to the deterioration of the toner. As changes of the image forming conditions in order to restore the image shown in FIG. 4 to the image shown in FIG. 3, the following control factors mentioned in the first embodiment will be effective to improve the unevenness of the image density. For example, the developing condition includes:

(2) To increase a rotational speed of the developing roller.
(3) To reduce a gap between the developing roller and the photoreceptor.
(5) To increase the alternating component of the developing bias.
(8) To polish the surfaces of the photoreceptors.
(9) To consume the deteriorated toner and supply new toner.

In addition, as controlling factors peculiar to the apparatus which is equipped with the image forming unit shown in FIG. 60, that is to say, to the apparatus that employs the non-contact one-component developing process, (10) to lower the contact pressure of the metering blade (to increase the toner adhesion quantity on the developing roller) is also effective. Although the image density unevenness can be recovered if the change of the developing conditions such as (2), (3), (5), (8), (9), and (10) are implemented, the average image density increases at the same time. If this occurs, by using the controls of the developing potential such as a) to change the absolute value of the average developing bias,
b) to change the absolute value of the potential of the imaging unit on the photoreceptor, it is possible to restore the conditions to the target average image density and image density unevenness, which is the same manner as that in the first embodiment, the automatic control in the first embodiment, the twelfth embodiment, and the fourteenth embodiment. Assuming that the "adhesion quantity of the developer on the developing roller" in the eleventh embodiment is the "adhesion quantity of the toner on the developing roller", it is possible to constitute from the two-component developing process as the one-component developing process, which is just the same manner as the fifteenth embodiment. Therefore, the eleventh embodiment is also applicable to the image forming apparatus that employs the non-contact one-component developing process.

The other units that are not particularly mentioned in this embodiment are constituted in the same manner as the first embodiment, so repeated explanations are omitted.

A seventeenth embodiment of this invention will be explained below.

FIG. 61 shows a sensor unit of an image quality apparatus for an image forming apparatus according to the seventeenth embodiment. As shown in FIG. 6 related to the first embodiment, an emitted spot is stopped down to small enough by the collective lens 102 to be radiated on an image, and the image density unevenness is detected by the sensor including the photoelectric conversion element 103 that detects light reflected from the image. In the seventeenth embodiment, LED 101 is used as the light source of which light can be radiated on a wide area. However, the light that is emitted from the LED 101 to be radiated on an image pattern 151, reflected from the image pattern 151, and enters the photoelectric conversion element 103 may be radiated on a minute area.

As such an example, the lights reflected from the minute areas on the image pattern 151 widely radiated as shown in FIG. 62 are allowed to enter so-called an array-like light-receiving device 161 (for example, an array of pixels from dozens to several hundreds of CMOS with 300 dpi, such as CMOS linear sensor array manufactured by TAOS Co., Ltd.) which includes an array of light-receiving devices through an equal magnification image forming element 160 (for example, SELFOC lens array manufactured by Nippon Ita Glass Co., Ltd.). Based on this structure, it is possible to take in information of a two-dimensional image without scanning by the spotlight. It is advantageous in a point that extremely precise image density unevenness information can be obtained from the two-dimensional image information as compared to the one-dimensional image information.

Furthermore, it is needless to say that it is possible to obtain the two-dimensional image information in the constitution shown in FIG. 6, also by scanning the image pattern with the spotlight along the direction which intersects the moving direction of the image carrier, using a driving mirror (not shown).

The other units that are not particularly mentioned in this embodiment are constituted in the same manner as the first embodiment or the fifteenth embodiment, so repeated explanation is omitted.

An eighteenth embodiment of this invention will be explained below.

FIG. 63 and FIG. 64 are schematic diagrams of an image forming unit in an image forming apparatus according to the eighteenth embodiment. In the first embodiment, the apparatus is constituted so as to detect quality of the image formed on the photoreceptor, but it is also possible to constitute the apparatus so that quality of the image formed on the intermediate transfer belt 5 is detected. FIG. 63 shows an example that the light reflection type sensor 10 is provided opposite to the intermediate transfer belt 5 in the image forming unit shown in FIG. 1. FIG. 64 shows an example that the light reflection type sensor 10 is provided opposite to the intermediate transfer belt 5 in the image forming unit shown in FIG. 8. As shown in FIG. 63, provision of the light reflection type sensor 10 so as to detect the quality of the image formed on the intermediate transfer belt 5 is effective in the case where it is impossible to dispose the sensor at a place adjacent to the photoreceptor 61 due to miniaturization of the photoreceptor 61 in diameter. Especially, in the case where the sensor is disposed so as to detect the quality of the image formed on the intermediate transfer belt 5, it is possible to use the image quality measuring apparatus 100 as a detection sensor to detect misalignment of each color of images that are superposed on each other on the intermediate transfer belt 5.

Furthermore, as shown in FIG. 64, if the image quality sensors 10Y, 10M, 10C, 10K, and 10 are disposed on both the photoreceptors 61Y, 61M, 61C, 61K, and the intermediate transfer belt 5, it is also possible to determine whether the image deterioration is due to the conditions when images are formed on the photoreceptor 61, or the transferring conditions when the image is transferred from the photoreceptor 61 to the intermediate transfer belt 5. If it is determined that the image deterioration occurs in the transferring process, restoration of the image quality may be possible in some cases by optimizing the transfer bias, or optimizing a small speed difference between the photoreceptor 61 and the intermediate transfer belt 5.

The embodiments of this invention have been explained referring to the drawings. However, the present invention is not limited to the embodiments. This invention can be applied to all kinds of image forming apparatus that output images, such as copiers, printers, facsimiles, and printing machines. In addition, the locations of the optical sensors disposed in the image forming apparatus are merely some of examples, so the sensors may be disposed at appropriate positions. The present invention can be applied not only to the color image forming apparatus but also to monochrome or a multi-color (two or three colors) apparatuses. It is needless to say that the constitutions of the image forming apparatus and the transfer apparatus are not limited. The photoreceptor in the electrophotographic device is not limited to drum-shaped, but may be belt-shaped as well. Further, the intermediate transfer body is not limited to belt-shaped, but may be drum-shaped as well. Furthermore, the present invention can be applied to the color image forming apparatus equipped with a plurality of developing units for one photoreceptor.

As explained above, according to the present invention, it is possible to provide the image quality detecting apparatus that can detect the deterioration of the graininess that is a factor of the image quality deterioration, and as a result, it is possible to control the image forming conditions in which priority is given to the quality of the image.

Furthermore, it is possible to provide the image forming apparatus capable of controlling appropriate image forming conditions if the deterioration of the image quality is confirmed after the deterioration of the image quality is detected. Thus, it is possible to use consumable items without shortening their useful lift while the quality of the items are maintained. As a result, it is possible to substantially delay the replacement timings of the developer and the photoreceptors as compared to the conventional technology. Further, it is possible to realize the image forming apparatus capable of reducing quantities of disposed developer and the photoreceptor, thus the image forming apparatus is excellent from an environmental point of view.

Moreover, it is possible to provide the image quality controlling unit and the image quality controlling method capable of controlling appropriate image forming conditions if the deterioration of the image quality is confirmed after the deterioration of the image quality is detected. As a result, it is possible to substantially delay the replacement timings of the developer and the photoreceptors as compared to the conventional technology. Further, it is possible to reduce quantities of disposed developer and the photoreceptor, thus the apparatus and the method are excellent from an environmental point of view.

Furthermore, the latent image formed on the image carrier is toner developed when the image is formed by the electrophotographic method. The information for the image density unevenness in the spatial frequency region including the spatial frequency in which human eyesight is the most sensitive and the information for the average image density are obtained from the toner-developed image. Further, the image forming conditions on the image density unevenness are changed based on the obtained information. Therefore, it is possible to form the image by giving priority to the quality of the image based on the information of the graininess that largely influences the image quality.

The present document incorporates by reference the entire contents of Japanese priority documents, 2002-160013 filed in Japan on May 31, 2002, and 2002-211502 filed in Japan on Jul. 19, 2002, and 2002-259131 filed in Japan on Sep. 4, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image quality detecting apparatus for detecting quality of images through measurement of graininess of the images based on an image pattern formed on an image carrier, the apparatus comprising:

a light-emitting unit configured to radiate a spotlight on the image pattern and the image carrier;

a scanning unit configured to scan the image pattern with the spotlight;

a light-receiving unit configured to detect a quantity of either of light reflected from the image pattern and the image carrier and light transmitted through the image pattern and the image carrier during the scanning; and a control unit configured to improve image graininess by changing an image forming condition based on information detected by the light-receiving unit, wherein the change to an image forming condition is based on a difference between a preset graininess index and a graininess index determined from the information detected by the light-receiving unit.

2. The image detecting apparatus according to claim 1, further comprising:

an arithmetic unit configured to perform an analysis on the light received from the light-receiving unit.

3. The image detecting apparatus according to claim 1, further comprising:

a signal generating unit configured to generate signals to change an image forming condition.

4. The image detecting apparatus according to claim 1, wherein the light-emitting unit and the light-receiving unit are part of a reflecting sensor.

5. The image quality detecting apparatus according to claim 1, wherein the scanning unit is configured to move the light emitting unit to scan the image pattern with the spotlight.

6. The image quality detecting apparatus according to claim 1, wherein the light-emitting unit includes a plurality of light sources.

7. The image quality detecting apparatus according to claim 6, wherein the scanning unit sequentially turns on and off the light sources when scanning.

8. The image quality detecting apparatus according to claim 1, further comprising an optical fiber through which optical transmission is performed from the light-emitting unit to each scanning direction.

9. The image quality detecting apparatus according to claim 1, further comprising an optical fiber through which optical transmission is performed from each scanning position to the light-receiving unit.

10. The image quality detecting apparatus according to claim 2, wherein the arithmetic unit is configured to calculate a spatial frequency response of an image.

11. The image quality detecting apparatus of claim 1, wherein the image carrier is photoreceptor.

12. An image quality detecting apparatus for detecting quality of images through measurement of graininess of the images based on an image pattern formed on an image carrier, the apparatus comprising:

a light-emitting unit configured to radiate a spotlight on the image pattern and the image carrier;

a scanning unit configured to scan the image pattern with the spotlight; and a light-receiving unit configured to detect a quantity of either of light reflected from the image pattern and the image carrier and light transmitted through the image pattern and the image carrier during the scanning, wherein the light-emitting unit includes a plurality of light sources.

13. The image detecting apparatus according to claim 12, further comprising:

an arithmetic unit configured to perform an analysis on the light received from the light-receiving unit.

14. The image detecting apparatus according to claim 12, further comprising:

a signal generating unit configured to generate signals to change an image forming condition.

15. The image detecting apparatus according to claim 12, wherein the light-emitting unit and the light-receiving unit are part of a reflecting sensor.

16. The image quality detecting apparatus according to claim 12, wherein the scanning unit is configured to move the light emitting unit to scan the image pattern with the spotlight.

17. The image quality detecting apparatus according to claim 12, wherein the scanning unit sequentially turns on and off the light sources when scanning.

18. The image quality detecting apparatus according to claim 12, further comprising an optical fiber through which optical transmission is performed from the light-emitting unit to each scanning direction.

19. The image quality detecting apparatus according to claim 12, further comprising an optical fiber through which optical transmission is performed from each scanning position to the light-receiving unit.

20. The image quality detecting apparatus according to claim 13, wherein the arithmetic unit is configured to calculate a spatial frequency response of an image.

21. The image quality detecting apparatus of claim 12, wherein the image carrier is photoreceptor.

* * * * *